(12) United States Patent
Konno

(10) Patent No.: US 7,546,056 B2
(45) Date of Patent: Jun. 9, 2009

(54) PRINTING APPARATUS AND METHOD PERFORMING EITHER AUTOMATIC OR MANUAL DUPLEX PRINTING BASED ON COPY MEDIA ATTRIBUTES

(75) Inventor: Shigeki Konno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 11/313,484

(22) Filed: Dec. 20, 2005

(65) Prior Publication Data

US 2006/0133844 A1    Jun. 22, 2006

(30) Foreign Application Priority Data

Dec. 22, 2004    (JP) ............... 2004-371434

(51) Int. Cl.
*G03G 15/00* (2006.01)
(52) U.S. Cl. ........................................ 399/82
(58) Field of Classification Search ............ 399/82, 399/85
See application file for complete search history.

(56) References Cited

U.S. PATENT DOCUMENTS 5,946,527 A * 8/1999 Salgado et al. ............. 399/82
6,069,704 A   5/2000 Verhaag
7,248,378 B2 * 7/2007 Shiraishi ................. 358/1.13
2005/0073696 A1 * 4/2005 Mackenzie et al. .......... 358/1.6
2007/0053711 A1 * 3/2007 Litwiller ..................... 399/82

FOREIGN PATENT DOCUMENTS

| JP | 5-11529 A | 1/1993 |
| JP | 10-336375 A | 12/1998 |
| JP | 2001-232902 A | 8/2001 |
| JP | 2004-279449 A | 10/2004 |
| KR | 10-2005-0054092 | * 6/2005 |

* cited by examiner

Primary Examiner—David M Gray
Assistant Examiner—Joseph S Wong
(74) Attorney, Agent, or Firm—Canon U.S.A., Inc. I.P. Division

(57) ABSTRACT

A multi-function printing apparatus for executing a duplex print job for printing on both surfaces of a sheet is provided. The multi-function printing apparatus includes a network controller for inputting the duplex print job, a hard disk drive for storing the duplex print job, a printing unit for printing on both surfaces of a sheet on the basis of the duplex print job, and an output bin for stacking the printed sheet. The multi-function printing apparatus further includes an operation unit for selecting a predetermined print job to be printed from among a plurality of print jobs and a control unit. When a user selects the duplex print job including a sheet with the first surface printed via the operation unit, the control unit controls the printing apparatus to print on a second surface of the sheet with the first surface printed and outputs the sheet to the output bin.

13 Claims, 67 Drawing Sheets

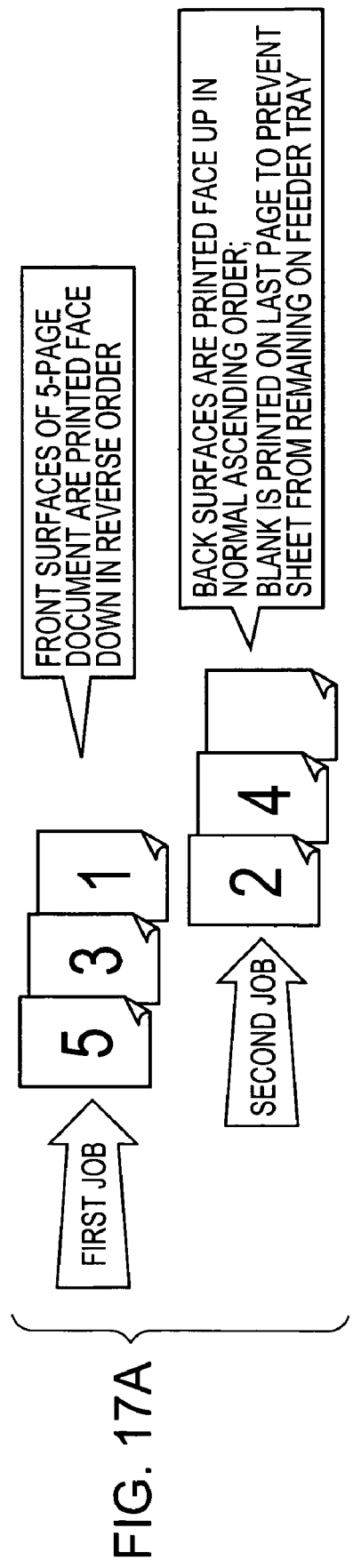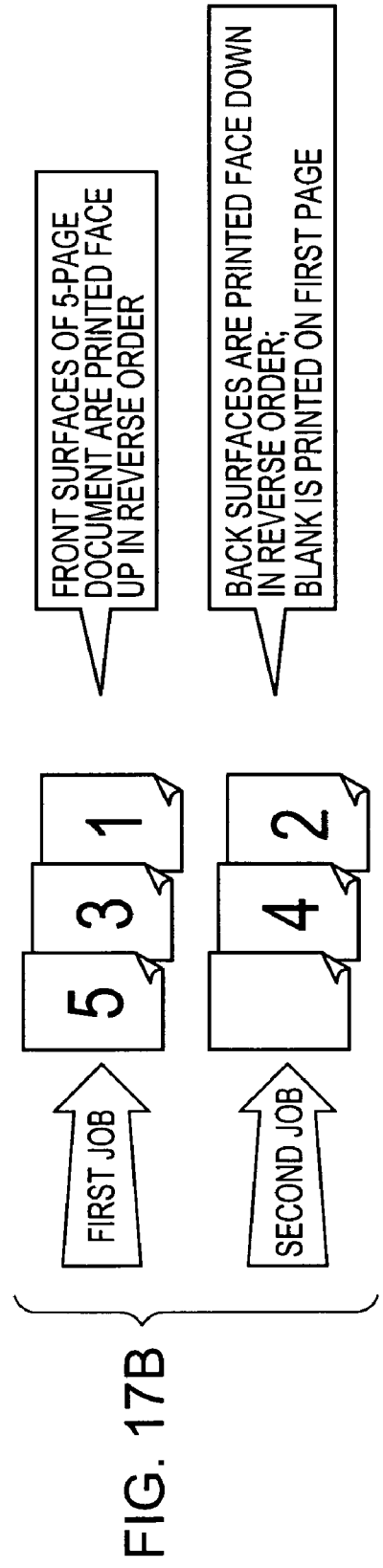

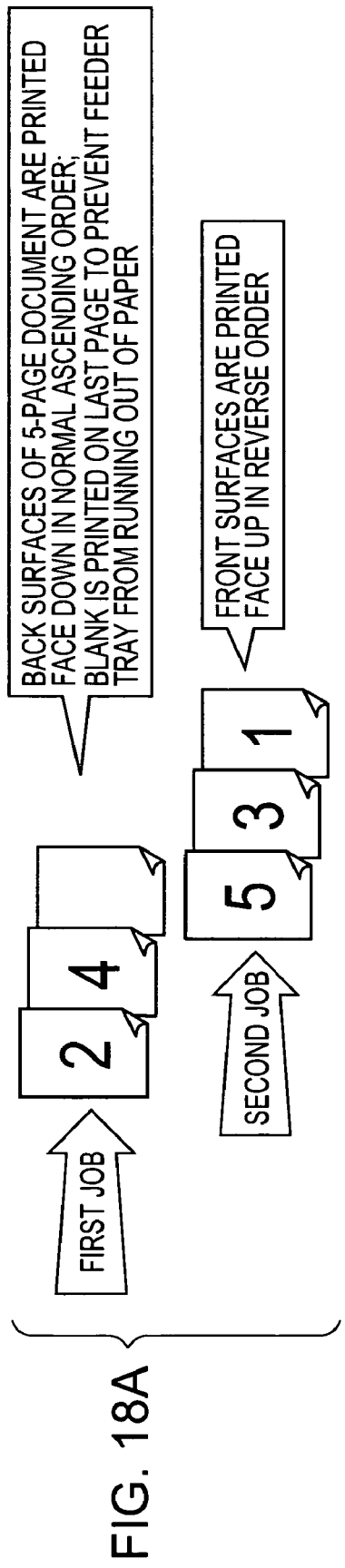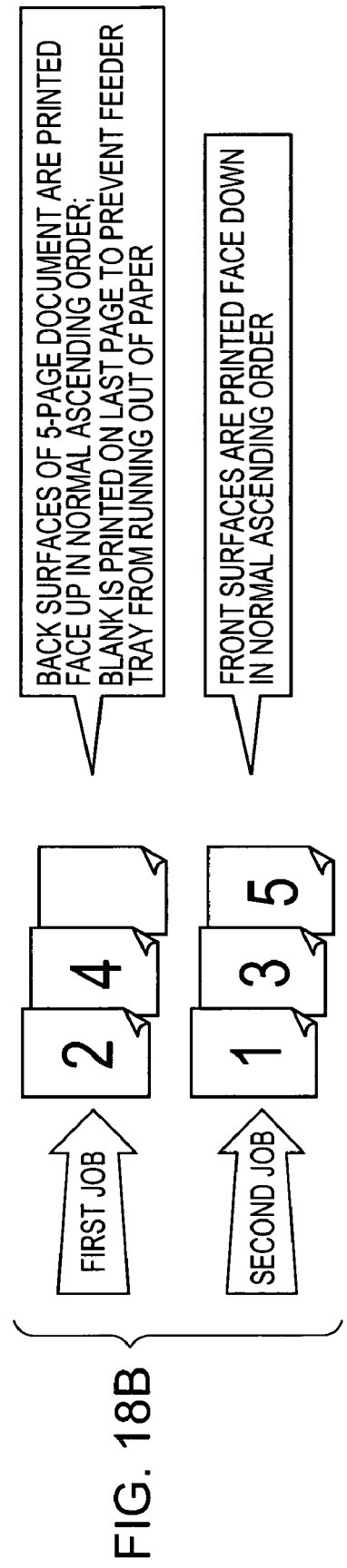
FIG. 18A
FIG. 18B

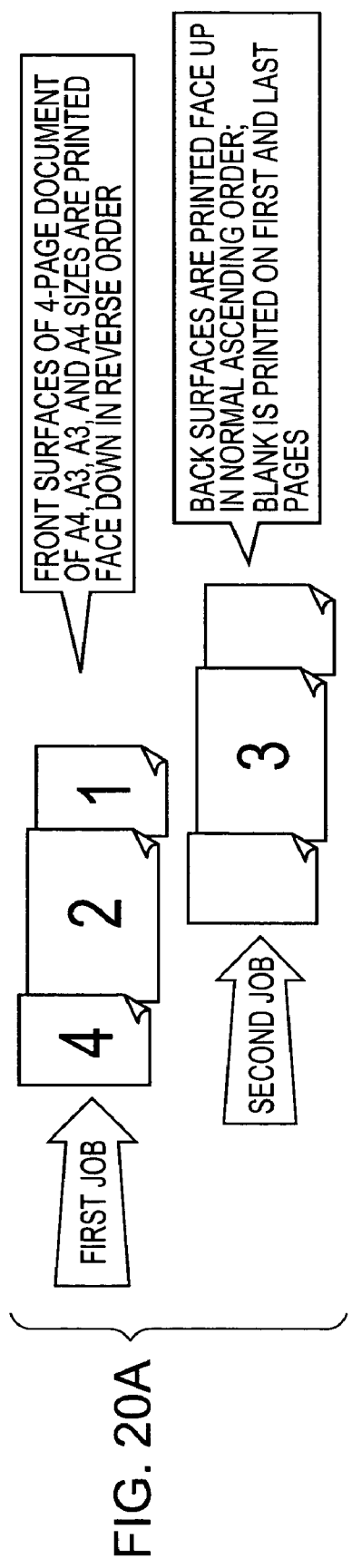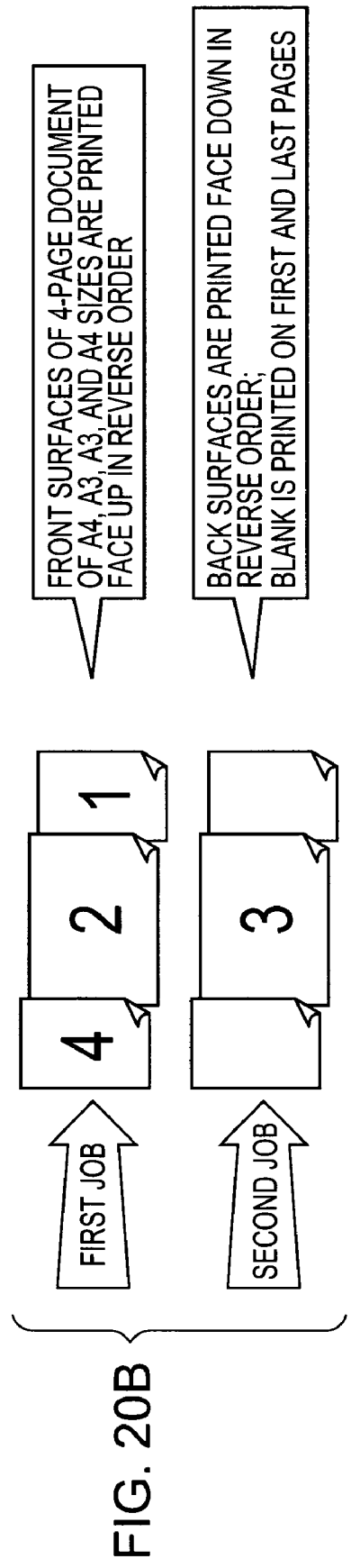

FIG. 56

PRINT STATUS

| RECEPTION NUMBER | JOB TYPE / NAME | STATUS |
|---|---|---|
| 0001 | PDL / BROCHURE SAMPLE | DUPLEX PRINTING |
| 0002 | COPY | WAITING FOR PRINTING |

CANCEL    BACK-SURFACE PRINT

CLOSE

FIG. 57

| PAPER SIZE & ORIENTATION | PRINT DIRECTION SETTING | BINDING DIRECTION | GUIDE IMAGE ORIENTATION | IMAGE OF INVERTED OUTPUT (WITH IMAGE-FORMED SURFACE DOWNWARDS) |
|---|---|---|---|---|
| X>Y A4, LTR, etc. | PORTRAIT | LONG SIDE | STANDARD | |
| | | SHORT SIDE | ROTATED 180° | |
| | LANDSCAPE | LONG SIDE | STANDARD | |
| | | SHORT SIDE | ROTATED 180° | |
| X<Y A4-R, LTR-R, A3, 11×17, etc. | PORTRAIT | LONG SIDE | ROTATED 180° | |
| | | SHORT SIDE | STANDARD | |
| | LANDSCAPE | LONG SIDE | ROTATED 180° | |
| | | SHORT SIDE | STANDARD | |

FIG. 58
PAPER SIZE & ORIENTATION
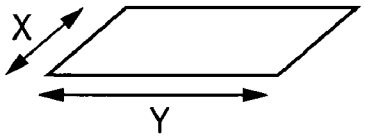
IMAGE FORMING STANDARD
UPPER SIDE OF IMAGE IS POSITIONED TOWARDS PAPER INPUT PORT OF IMAGE FORMING APPARATUS OR TOWARDS PAPER OUTPUT PORT.
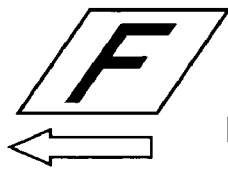 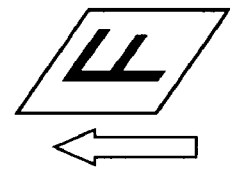
PAPER FEED DIRECTION
FIG. 59
GUIDE IMAGE
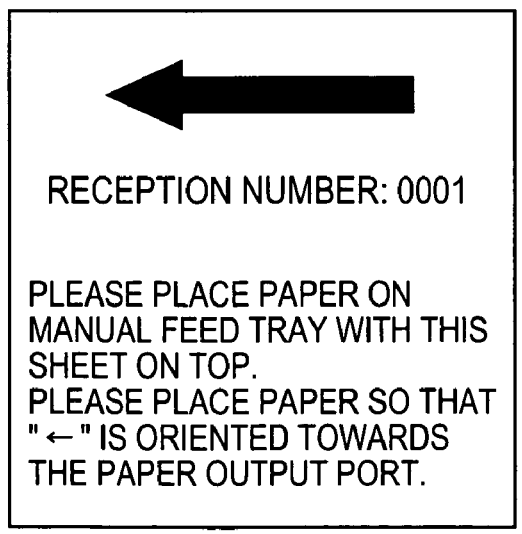
PAPER FEED DIRECTION

FIG. 60

| PRINT STATUS | | | |
|---|---|---|---|
| RECEPTION NUMBER | JOB TYPE / NAME | | STATUS |
| 0001 | PDL / BROCHURE SAMPLE | | FRONT-SURFACE PRINTING |
| 0002 | COPY | | WAITING FOR PRINTING |

CANCEL    BACK-SURFACE PRINT

CLOSE

FIG. 63

| PRINT STATUS | | |
|---|---|---|
| RECEPTION NUMBER | JOB TYPE / NAME | STATUS |
| 0001 | PDL / BROCHURE SAMPLE | BACK-SURFACE PRINTING |
| 0002 | COPY | WAITING FOR PRINTING |

CANCEL  BACK-SURFACE PRINT

CLOSE

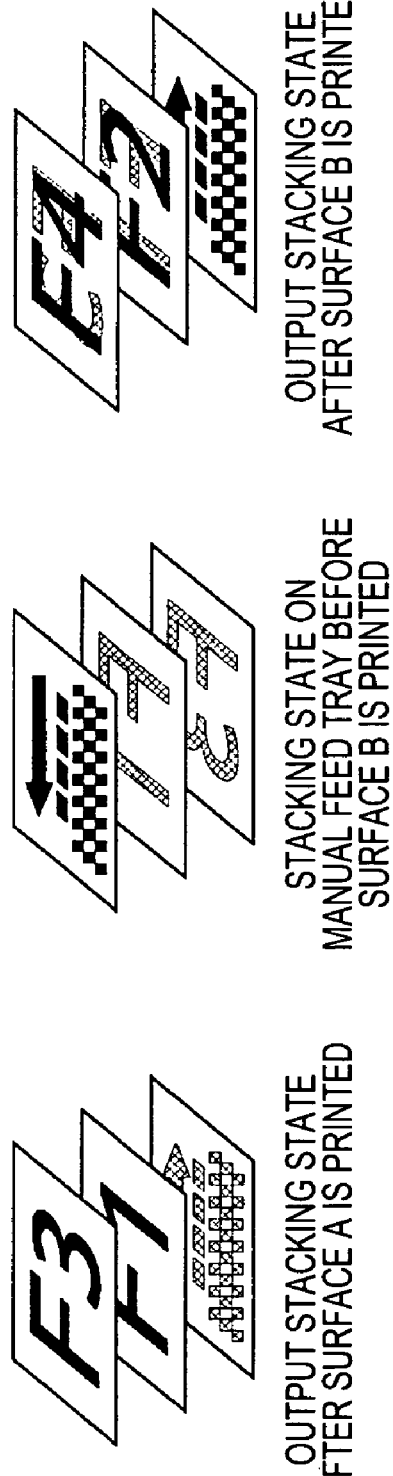
FIG. 64A PAPER SIZE = A4, PRINT DIRECTION = PORTRAIT, BINDING DIRECTION = LONG SIDE
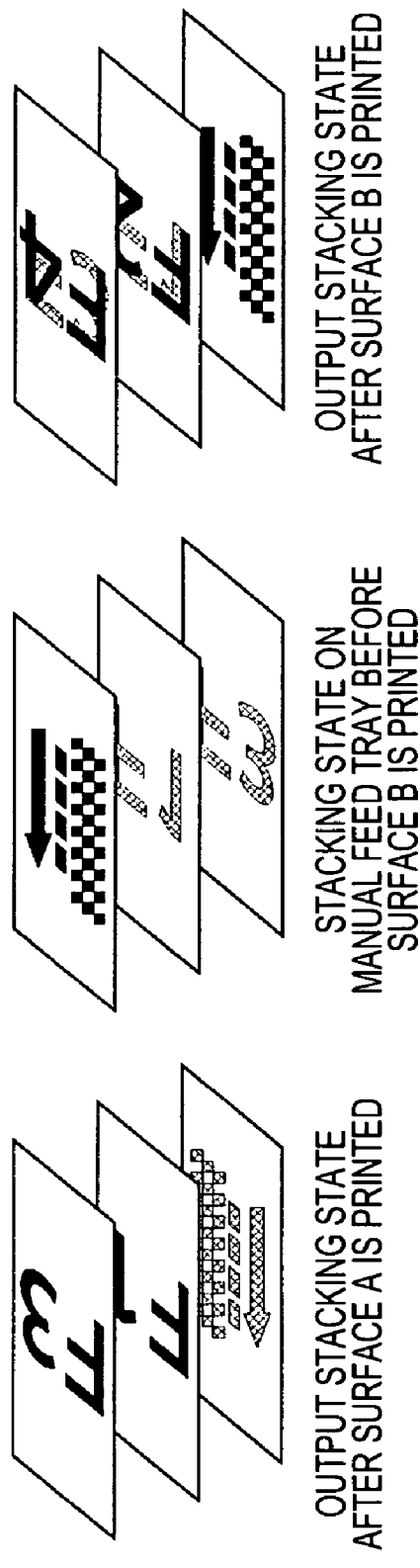
FIG. 64B PAPER SIZE = A4R, PRINT DIRECTION = PORTRAIT, BINDING DIRECTION = LONG SIDE

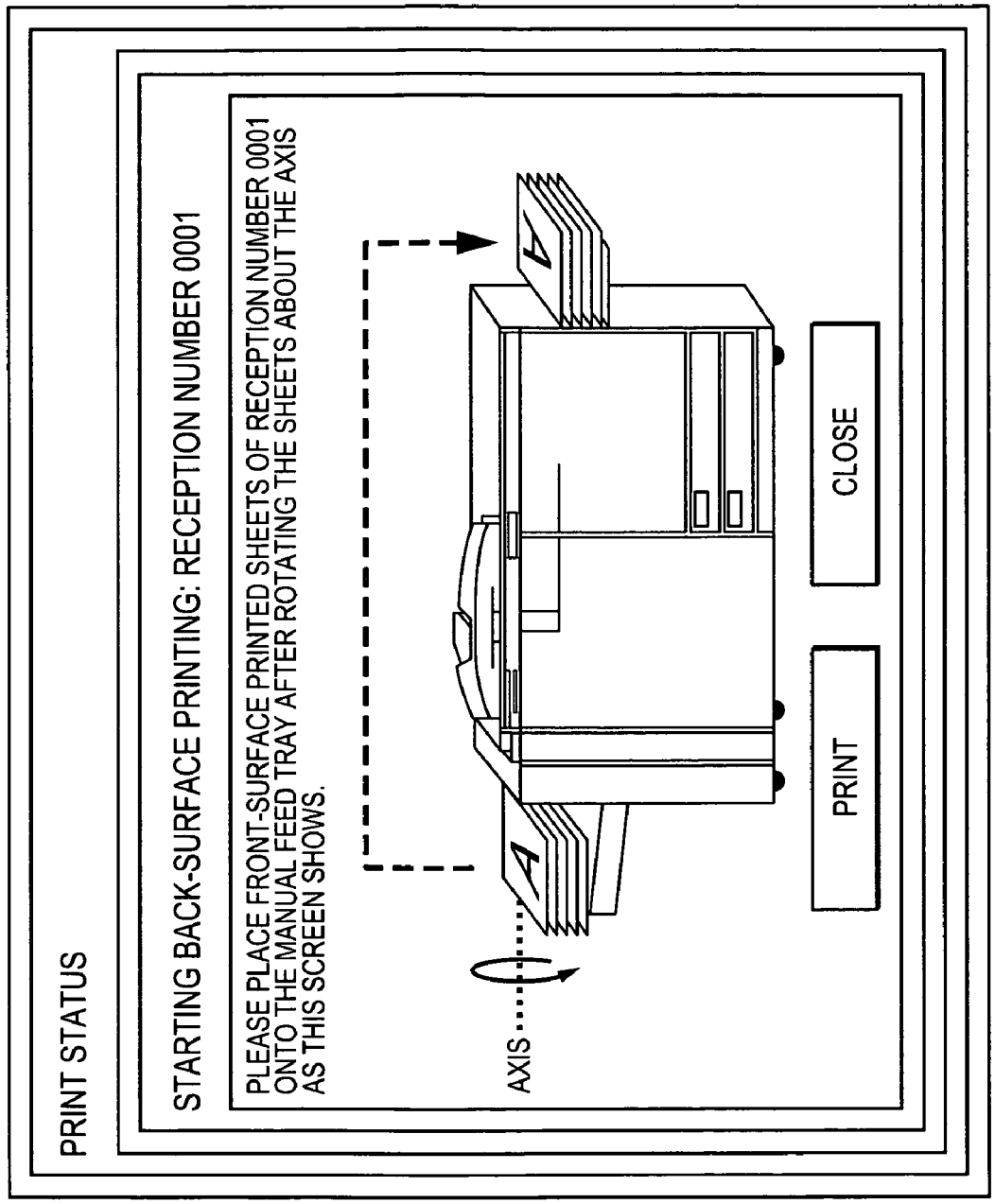

FIG. 67

| PAPER SIZE & ORIENTATION | PRINT DIRECTION SETTING | BINDING DIRECTION | GUIDE IMAGE ORIENTATION | IMAGE FORMING DIRECTION ON SURFACE B (RELATIVE TO SURFACE A) |
|---|---|---|---|---|
| X>Y A4, LTR, etc. | PORTRAIT | LONG SIDE | | THE SAME |
| | | SHORT SIDE | | ROTATED 180° |
| | LANDSCAPE | LONG SIDE | | THE SAME |
| | | SHORT SIDE | | ROTATED 180° |
| X<Y A4-R, LTR-R, A3, 11×17, etc. | PORTRAIT | LONG SIDE | | ROTATED 180° |
| | | SHORT SIDE | | THE SAME |
| | LANDSCAPE | LONG SIDE | | ROTATED 180° |
| | | SHORT SIDE | | THE SAME |

FIG. 71

| PAPER SIZE & ORIENTATION | PRINT DIRECTION SETTING | DUPLEX DETAIL SETTINGS | GUIDE IMAGE ORIENTATION | IMAGE OF INVERTED OUTPUT (WITH IMAGE-FORMED SURFACE DOWNWARDS) |
|---|---|---|---|---|
| X>Y A4, LTR, etc. | PORTRAIT | VERTICALLY-STITCHED | STANDARD | |
| | | HORIZONTALLY-STITCHED | ROTATED 180° | |
| | LANDSCAPE | VERTICALLY-STITCHED | ROTATED 180° | |
| | | HORIZONTALLY-STITCHED | STANDARD | |
| X<Y A4-R, LTR-R, A3, 11×17, etc. | PORTRAIT | VERTICALLY-STITCHED | ROTATED 180° | |
| | | HORIZONTALLY-STITCHED | STANDARD | |
| | LANDSCAPE | VERTICALLY-STITCHED | STANDARD | |
| | | HORIZONTALLY-STITCHED | ROTATED 180° | |

PRINTING APPARATUS AND METHOD PERFORMING EITHER AUTOMATIC OR MANUAL DUPLEX PRINTING BASED ON COPY MEDIA ATTRIBUTES

BACKGROUND OF THE INVENTION

1. Field of the Invention

The present invention relates to a printing apparatus and a printing method.

2. Description of the Related Art

Recently, printing apparatuses which receive image data, such as page description language (PDL)-based data, from a host computer and perform a printing operation have been made available. Also, printing apparatuses capable of duplex printing and having a function to spool image data received from a host computer and manage the spooled image data have been made available (refer to, for example, Japanese Patent Laid-Open No. 2001-232902).

In general, to perform duplex printing, the printing apparatus performs printing on a first surface of a recording paper sheet, turns over the recording paper sheet, and performs printing on a second surface of the recording paper sheet (hereinafter referred to as "automatic duplex printing"). However, even a printing apparatus having such an automatic duplex printing function cannot perform the automatic duplex printing function if the paper sheet is of a thickness or a material that cannot pass through a paper transport path for turning over the paper sheet. When performing the duplex printing on such a recording paper sheet, data is printed on one of the front and back surfaces (a first surface) of a recording paper sheet and the recording paper sheet is output. Thereafter, the recording paper sheet whose one surface was printed is manually set on a manual paper tray. The remaining data is then printed on the other of the front and back surfaces (a second surface) to realize duplex printing (refer to, for example, Japanese Patent Laid-Open No. 5-11529). Hereinafter, this type of duplex printing is referred to as "manual duplex printing".

However, when performing manual duplex printing, the known printing apparatus needs to perform the following procedures. First, a user instructs a host computer to transfer image data for one surface of a recording paper sheet to the printing apparatus via a printer driver. Upon receiving the image data for the one surface of a recording sheet, the printing apparatus performs printing on the one surface. Subsequently, the user sets the recording sheet whose one surface was printed on a manual paper tray. The user then instructs the host computer to transfer the remaining image data for the other surface of the recording paper sheet to the printing apparatus via a printer driver. Upon receiving the remaining image data for the other surface of the recording paper sheet, the printing apparatus performs printing on the other surface. Thus, in the known manual duplex printing operation, a user needs to physically carry out a manual step operation, which tends to be troublesome.

In addition, recently, some printing apparatus allow a printing job that includes image data for a plurality of pages to specify a different paper size or a different paper type for each page. However, if a print job specifies both a paper type that is allowed for automatic duplex printing (e.g., plain paper) and a paper type that is not allowed for automatic duplex printing (e.g., thick paper), a problem occurs. More specifically, the known printing apparatus cannot appropriately determine whether it performs automatic duplex printing or manual duplex printing for that printing job.

SUMMARY OF THE INVENTION

The present invention provides a printing apparatus and a printing method which overcomes the above-described problems.

The present invention also provides a printing apparatus and a printing method capable of performing manual duplex printing without requiring a user of the printing apparatus to carry out a troublesome operation, such as an operation of an external unit.

The present invention also provides a printing apparatus and a printing method capable of appropriately performing duplex printing even when recording sheets used for a duplex printing job have different attributes.

According to an embodiment of the present invention, a printing apparatus executes a duplex print job for printing on both surfaces of a sheet. The printing apparatus includes an input unit adapted to input the duplex print job, a storage unit adapted to store the duplex print job input by the input unit, a printing unit adapted to print on both surfaces of the sheet on the basis of the duplex print job stored in the storage unit, a sheet output unit adapted to stack the sheet printed by the printing unit, a selection unit adapted to select a predetermined print job to be printed from among a plurality of print jobs stored in the storage unit, and a control unit adapted to control, when the selection unit selects the duplex print job including a sheet with the first surface printed as the predetermined print job, the printing apparatus to print on a second surface of the sheet with the first surface printed and output the sheet to the sheet output unit.

According to another embodiment of the present invention, a printing apparatus executes a duplex print job for printing on both surfaces of a sheet. The printing apparatus includes an input unit adapted to input the duplex print job, a printing unit adapted to print on both surfaces of the sheet on the basis of the duplex print job input by the input unit, an inversion transport unit adapted to turn over the sheet printed by the printing unit and re-transport the sheet to the printing unit, a feeder unit adapted to feed the sheet to the printing unit, a sheet output unit adapted to stack the sheet subjected to the print process by the printing unit, and a control unit adapted to control the printing apparatus to perform printing in either one of an automatic duplex print mode and a manual duplex print mode. The automatic duplex print mode is a mode in which printing is performed on a first surface of a sheet, the sheet is turned over by the inversion transport unit, and printing is performed on a second surface of the sheet. The manual duplex print mode is a mode in which printing is performed on a first surface of a sheet, the sheet is output to the sheet output unit, the output sheet is fed from the feeder unit, and printing is performed on a second surface of the sheet. When all of the pages of the duplex print job are to be printed on sheets of a first attribute, the control unit executes printing in the automatic duplex print mode, and, when the duplex print job contains pages to be printed on sheets of a second attribute different from the first attribute, the control unit executes printing in the manual duplex print mode.

According to another embodiment of the present invention, a printing method in a printing apparatus for executing a duplex print job for printing on both surfaces of a sheet is provided. The method includes an inputting step of inputting the duplex print job, a storing step of storing the input duplex print job in a storage unit of the printing apparatus, a first printing step of printing on a first surface of a sheet on the basis of the duplex print job and outputting the sheet to a sheet output unit of the printing apparatus, a selecting step of selecting a predetermined print job to be printed from among a plurality of print jobs stored in the storage unit, and a second printing step of printing, when the selection unit selects the duplex print job including a sheet with the first surface printed in the first printing step as the predetermined print job, on a second surface of the sheet with the first surface printed in the first printing step and outputting the sheet to the sheet output unit.

According to another embodiment of the present invention, a printing method in a printing apparatus for executing a duplex print job for printing on both surfaces of a sheet is provided. The method includes an inputting step of inputting the duplex print job; a first printing step of printing on both surfaces of the sheet on the basis of the duplex print job input in the inputting step in an automatic duplex print mode in which a first surface of the sheet is printed, the sheet is turned over, and a second surface of the sheet is printed; a second printing step of printing on both surfaces of the sheet on the basis of the duplex print job input in the inputting step in a manual duplex print mode in which a first surface of the sheet is printed, the sheet is output to a sheet output unit of the printing apparatus, the output sheet is fed from a feed unit of the printing apparatus, and a second surface of the sheet is printed; and a controlling step of controlling the printing apparatus to print the duplex job by the first printing step when all of the pages of the duplex print job are to be printed on sheets of a first attribute and controlling the printing apparatus to print the duplex job by the second printing step when the duplex print job contains pages to be printed on sheets of a second attribute different from the first attribute.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments of the invention, and, together with the description, serve to explain the principles of the invention.

FIGS. 17A-B illustrate a continuation of the procedure of FIG. 16B.

FIGS. 18A-B illustrate a continuation of the procedure of FIG. 17B.

FIGS. 19A-B and 20A-B illustrate an exemplary procedure of duplex printing of a 4-page document including A4, A3, A3, and A4 pages from the first page.

FIG. 56 illustrates an exemplary print status screen.

FIG. 57 illustrates a table representing the orientation of a guide image determined on the basis of a combination of the size and orientation of a sheet, a print direction setting, and a binding direction setting.

FIG. 58 is a diagram illustrating the size and the orientation of a sheet and an image forming standard.

FIG. 59 illustrates an exemplary guide image.

FIG. 60 illustrates an exemplary print status screen in which a message "Front-surface printing" is displayed.

FIG. 63 illustrates an exemplary print status screen in which a message "Back-surface printing" is displayed.

FIGS. 64A-B illustrate the consistency between guide print and a binding direction when manual duplex printing is performed.

FIG. 65 illustrates the back-surface printing start screen 5701 that indicates a direction to turn over the sheets.

FIG. 67 illustrates a table representing an image forming direction on a surface B.

FIG. 71 illustrates a table representing the orientation of a guide image.

DESCRIPTION OF THE EMBODIMENTS

Figure 1:
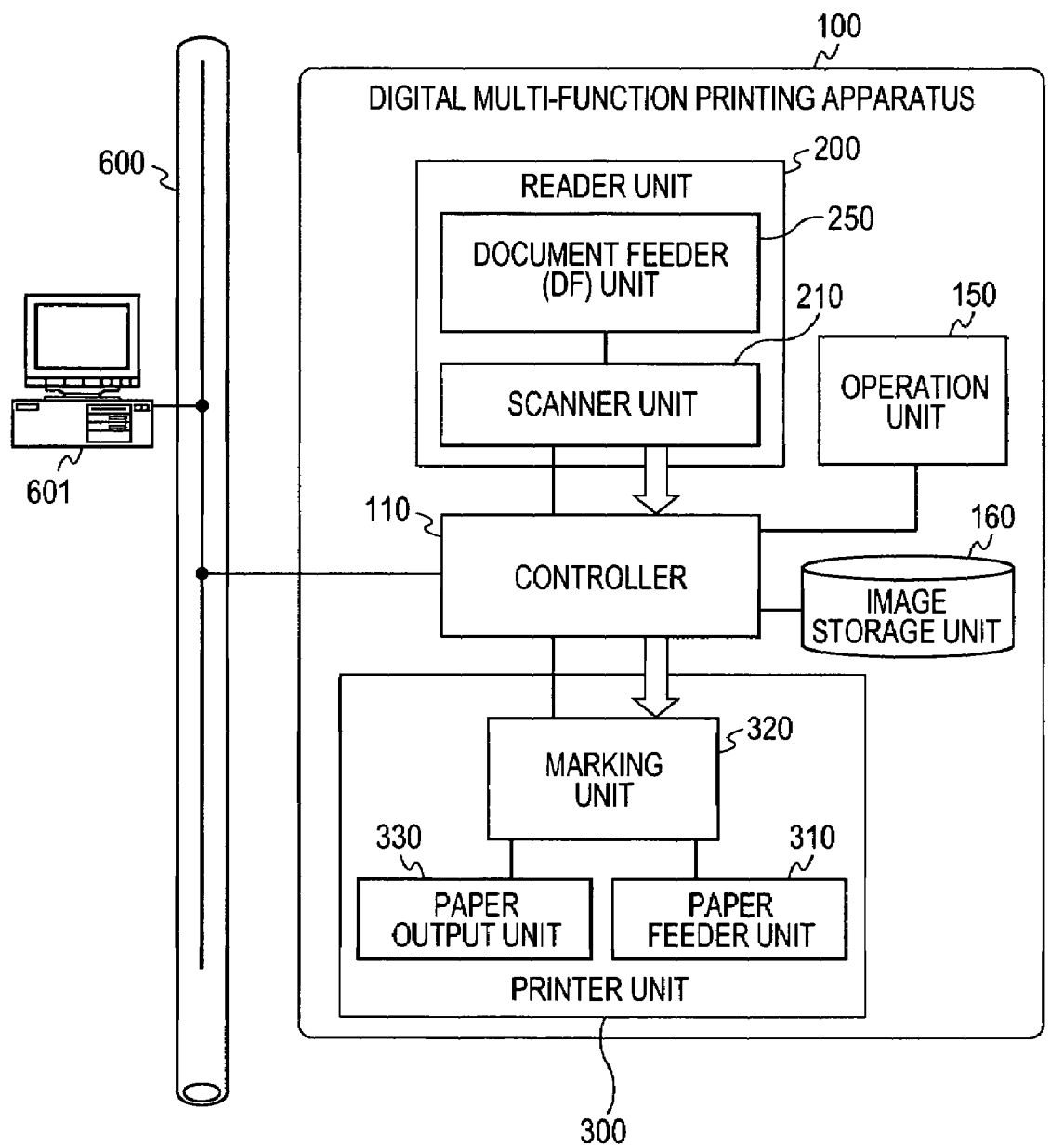
FIG. 1 illustrates an exemplary basic architecture of a digital multi-function printing apparatus according to a first embodiment of the present invention.

The present invention will now be described in detail with reference to the drawings showing a numerous embodiments, aspects and features thereof. In the drawings, elements and parts which are similar throughout the views are designated by the same reference numerals, and therefore, duplicate description thereof is omitted.

Printing apparatuses and printing methods according to embodiments of the present invention are now described below with reference to the accompanying drawings. In these embodiments, a digital multi-function printing apparatus is used as an exemplary printing apparatus.

First Exemplary Embodiment

FIG. 1 illustrates an exemplary architecture of a digital multi-function printing apparatus according to a first embodiment of the present invention. A digital multi-function printing apparatus 100 includes a reader unit 200 for scanning an original document image to generate image data and a printer unit 300 for recording the image data on a recording paper sheet. An operation unit 150 includes a display panel (e.g., a liquid crystal display (LCD)) and a keyboard for displaying image data and a functional menu and setting various functions. An image storage unit 160 stores the image data read out of the reader unit 200 or image data generated from code data (e.g., PDL data or compressed image data) received from a client personal computer (PC) 601 or another digital multi-function printing apparatus via a network 600 (e.g., a local area network (LAN)). A controller 110 is connected to each unit to control the unit.

The reader unit 200 includes a document feeder unit 250 for transporting an original document and a scanner unit 210 for optically scanning the original document and converting it to image data (electric signal). The printer unit 300 includes a paper feeder unit 310 having a plurality of paper feeder cassettes containing recording paper sheets and a marking unit 320 for printing the image data on a recording paper sheet. The digital multi-function printing apparatus 100 further includes a paper output unit 330 for performing a sorting operation and a stapling operation on the printed recording paper sheets and externally outputting the printed recording paper sheets.

The function of the controller 110 is described next. The controller 110 includes a network interface (I/F) for performing communication via the network 600 and a communication function for processing a variety of network protocols. The controller 110 further includes code data expanding function for converting code data (e.g., PDL data or compressed image data) received from the client 601 (e.g., PC or terminal) or another digital multi-function printing apparatus via the communication function to image data. By controlling these functions and the above-described units, the controller 110 realizes a copy function, a PDL (code data) printing function, an image storing function, and a stored image printing function.

Figure 2:
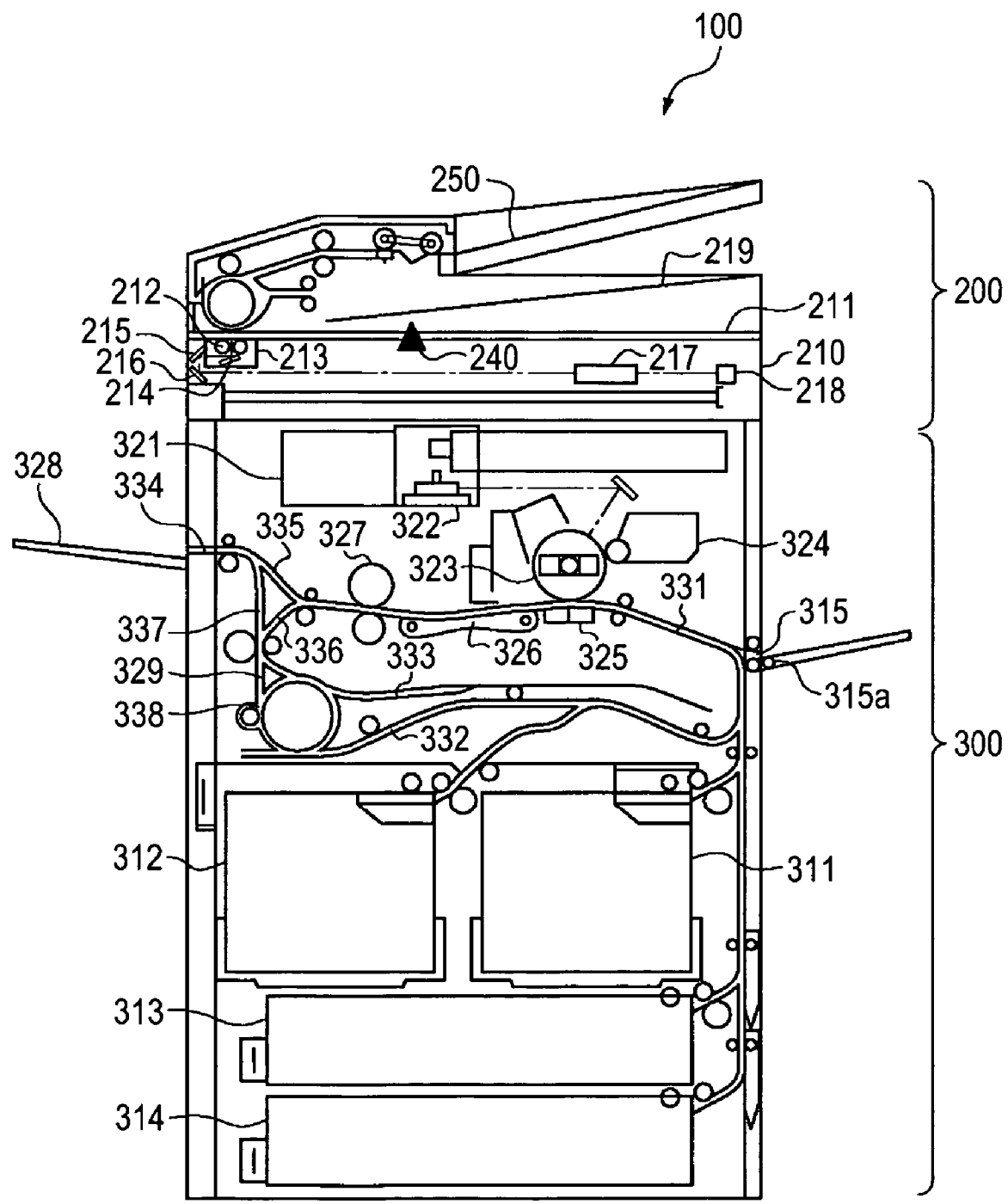
FIG. 2 is an exemplary longitudinal section of a reader unit and a printer unit.

FIG. 2 is a longitudinal section of an exemplary reader unit 200 and the printer unit 300 for illustrating the internal structures thereof of the digital multi-function printing apparatus 100. The reader unit 200 picks up one of original document sheets stacked on the document feeder unit 250 from the top and feeds the document sheet to a platen glass 211. After the scanner unit 210 performs a predetermined readout operation of the fed document sheet, the reader unit 200 outputs the document sheet to an output tray 219. During the readout operation, upon receiving the original document sheet on the platen glass 211, the scanner unit 210 illuminates a lamp 212 and starts moving an optical unit 213 so as to scan the document sheet while illuminating the document sheet from the bottom. Reflected light from the document sheet is led to a CCD image sensor (hereinafter simply referred to as "CCD")

218 through mirrors 214 to 216 and a lens 217. Thus, a scanned image of the document sheet is read out by the CCD 218. The image data read out by the CCD 218 undergoes a predetermined processing and is transferred to the controller 110.

When the document feeder unit 250 has a flow scan mode, one of the document sheets stacked on the document feeder unit 250 passes through a document flow scan position 240 at a constant speed. In this case, the optical unit 213 moves to the document flow scan position 240 and the lamp 212 illuminates the document sheet transported at the constant speed. After reflected light from the document sheet is appropriately read out by the CCD 218, image data is generated. After the image data undergoes a predetermined processing, the image data is transferred to the controller 110 (see FIG. 1).

The printer unit 300 emits a laser beam corresponding to the image data output from the controller 110 from a laser output unit 322, which is driven by a laser driver 321. The laser beam is received by a photoconductor drum 323 and an electrostatic latent image corresponding to the laser beam is formed on the photoconductor drum 323. A developer 324 transfers a developer material to the latent image.

In synchronization with the start of emitting a laser beam, a recording paper sheet is fed from any one of cassettes 313-314, paper bins 311-312, or manual feed tray 315 and is transported to a transfer unit 325 via a transport path 331. The manual feed tray 315 includes a sheet detection sensor 315a for detecting the presence of a sheet on the manual feed tray 315. The transfer unit 325 transfers the developer material deposited to the photoconductor drum 323 to the recording paper sheet, which are transported to a fuser unit 327 by a transport belt 326. The fuser unit 327 fixes the developer material to the recording paper sheet by heating and applying pressure to them. The recording paper sheet to which the developer material is fixed is output to an output paper bin 328 via transport paths 335 and 334. To output the recording paper sheet to the output paper bin 328 while turning over the printed surface, the recording paper sheet is led to the transport paths 336 and 338 and subsequently is transported in the opposite direction. The recording paper sheet is then output to the output paper bin 328 via the transport paths 337 and 334. Instead of installing the output paper bin 328, an output paper unit may be installed. In this case, the output paper unit can staple output recording paper sheets or can create a fold along the center of an output recording paper sheet while stapling along a fold line so as to produce a booklet.

To record image data on both surfaces of a recording paper sheet, the printer unit 300 leads the recording paper sheet, which passed through the fuser unit 327, from a transport path 336 to a transport path 333 using a flapper 329. Subsequently, the printer unit 300 transports the recording paper sheet in the opposite direction and leads the recording paper sheet from a transport path 338 and a re-feed transport path 332 using the flapper 329. To perform a transferring and fusing process on the recording paper sheet led to the re-feed transport path 332, the recording paper sheet is transported to the transfer unit 325 via the transport path 331 again and is processed in the same manner.

Here, when recording image data on both surfaces of a recording paper sheet, the recording paper sheet is processed using the above-described transport paths in steps in the following order: (1) The sheet is fed from a paper feeder cassette; (2) The sheet undergoes a transferring and fusing process; (3) The sheet is fed from a re-feed transport path again; (4) The sheet undergoes a transferring and fusing process.

When continuously recording image data on both surfaces of a recording paper sheet, in order to increase productivity of printing, a plurality of sheets, including as many sheets as possible, whose one side is processed by transferring and fusing are stored in the transport path 333 and the re-feed transport path 332 so that the distance between the sheets in these paths is reduced.

For example, a recording paper sheet is processed in steps in the following order: (1) A first sheet is fed from a paper feeder cassette or bin; (2) The first sheet undergoes a transferring and fusing process; (3) A second sheet is fed from the paper feeder cassette or bin; (4) The second sheet undergoes a transferring and fusing process; (5) The first sheet is fed from a re-feed transport path again; and (6) The first sheet undergoes a transferring and fusing process. Subsequently, a recording paper sheet is processed in the following order: (7) A series of steps of feeding, transferring and fusing, re-feeding, and transferring and fusing is repeated in the same manner as described above; and (8) Finally, re-feeding, transferring and fusing, re-feeding, and transferring and fusing are performed. The image data corresponding to the sheet are output from the controller 110 in synchronization with the above-described order.

Figure 3:
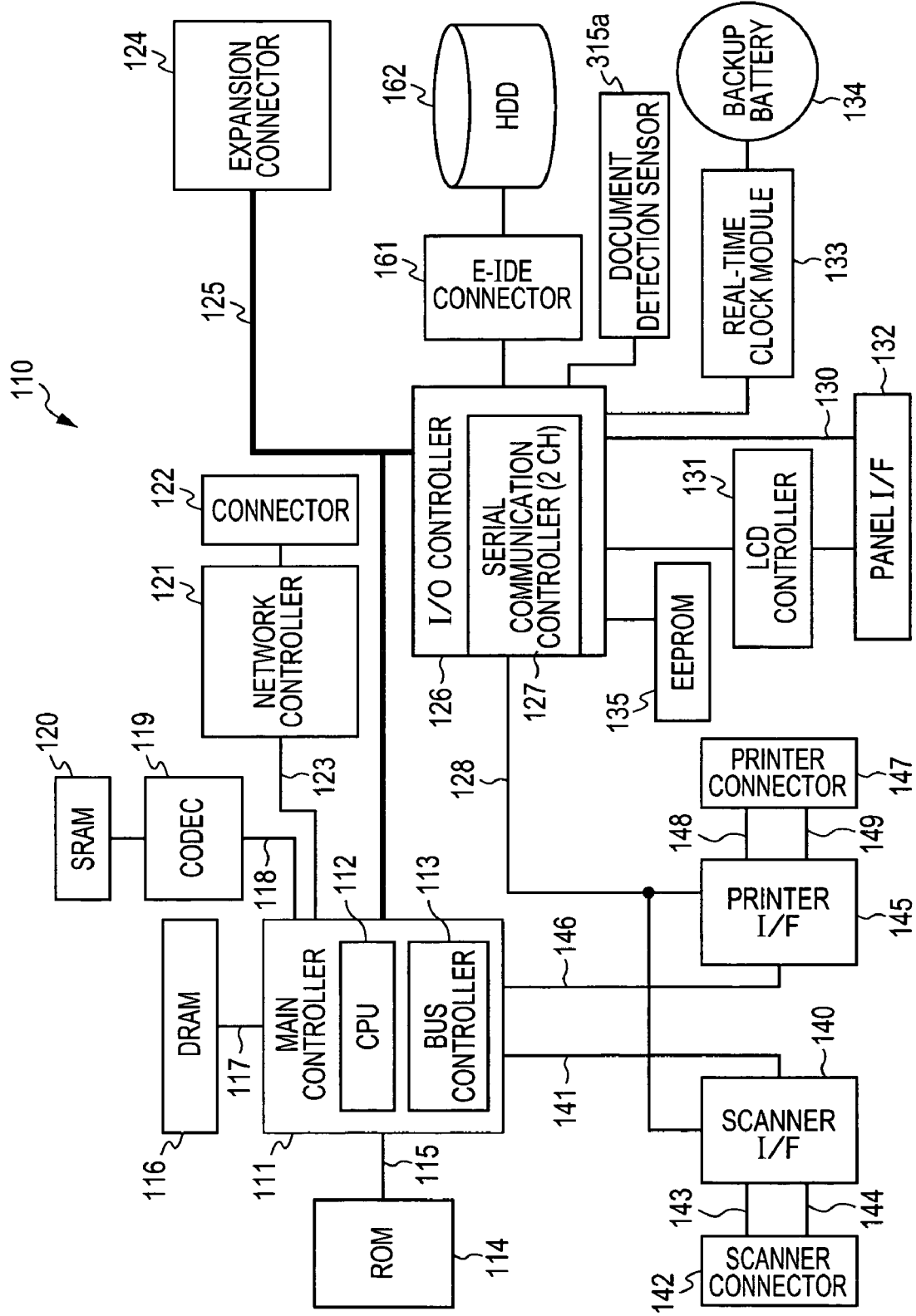
FIG. 3 is a block diagram of an exemplary controller.

FIG. 3 is a block diagram of an exemplary controller 110. The controller 110 includes a main controller 111 which incorporates a central processing unit (CPU) 112, a bus controller 113, and a functional block including a variety of controller circuits, which are described below. The main controller 111 is connected to a read only memory (ROM) 114 via a ROM interface (I/F) 115 and is connected to a dynamic random access memory (DRAM) 116 via a DRAM I/F 117. The main controller 111 is also connected to a codec 119 via a codec I/F 118. Furthermore, the main controller 111 is connected to a network controller 121 via a network I/F 123. The main controller 111 performs a predetermined control of the LAN 600 via a connector 122 connected to the network controller 121. The main controller 111 is adapted to support the widely used Ethernet® or the like. The main controller 111 is also connected to a scanner I/F 140 via a scanner bus 141. The main controller 111 is also connected to a printer I/F 145 via a printer bus 146. Still furthermore, the main controller 111 is connected to an expansion connector 124 and an input and output (I/O) controller 126 via a general-purpose high-speed bus 125 (e.g., a PCI bus).

The ROM 114 stores a variety of control programs executed by the CPU 112 and the operation data. The DRAM 116 is used as a working area of the CPU 112 and an area for storing image data. The codec 119 compresses raster image data stored in the DRAM 116 by a known compression method (e.g., MH, MR, MMR, or JBIG) and decompresses the compressed data to a raster image. A static random access memory (SRAM) 120 is connected to the codec 119. The SRAM 120 is used as a temporary working area of the codec 119.

The I/O controller 126 includes an asynchronous serial communication controller 127 of two channels for communicating control commands with the reader unit 200 and the printer unit 300. The serial communication controller 127 is connected to the scanner I/F 140 and the printer I/F 145 via an I/O bus 128.

The scanner I/F 140 is connected to a scanner connector 142 via a first asynchronous serial I/F 143 and a first video I/F 144. The scanner connector 142 is connected to the scanner unit 210 of the reader unit 200 (see FIG. 1). The scanner I/F 140 performs desired binary processing and variable zooming in a main scanning direction and/or sub scanning direction on image data received from the scanner unit 210. The scanner I/F 140 also generates a control signal on the basis of a video signal from the scanner unit 210 and transmits image data to the main controller 111 via the scanner bus 141.

The printer I/F 145 is connected to a printer connector 147 via a second asynchronous serial I/F 148 and a second video I/F 149. The printer connector 147 is connected to the marking unit 320 of the printer unit 300 (see FIG. 1). The printer I/F 145 performs smoothing processing on image data output from the main controller 111 and outputs the image data subjected to the smoothing processing to the marking unit 320. The printer I/F 145 further generates a control signal on the basis of a video signal from the marking unit 320 and outputs the control signal to the printer bus 146.

The CPU 112 executes a control program loaded from the ROM 114 via the ROM I/F 115. For example, the CPU 112 analyzes PDL data received from the client PC 601 and expands it into raster image data.

The bus controller 113 controls data transfer from and to the scanner I/F 140, the printer I/F 145, and external devices connected to the expansion connector 124 so that arbitration in the case of bus contention and direct memory access (DMA) data transfer are controlled. For example, the data transfer between the DRAM 116 and the codec 119, the data transfer from the scanner unit 210 to the DRAM 116, and the data transfer from the DRAM 116 to the marking unit 320 are controlled by the bus controller 113 using the DMA data transfer.

The I/O controller 126 is connected to a panel I/F 132 via a display (e.g., such as an LCD) controller 131 and a key input I/F 130. The operation unit 150 is connected to the panel I/F 132. The I/O controller 126 is also connected to an electrically erasable programmable read-only memory (EEPROM) 135, which is a nonvolatile memory. The I/O controller 126 is also connected to a hard disk drive (HDD) 162 from which image data can be read and to which image data can be written via an enhanced integrated drive electronics (E-IDE) connector 161. The I/O controller 126 is further connected to a real-time clock module 133 which updates and stores date and time managed by the apparatus. The real-time clock module 133 is connected to a backup battery 134 so that the real-time clock module 133 is backed up by the backup battery 134. The sheet detection sensor 315a, which detects the presence of a sheet on the manual feed tray 315, is connected to the I/O controller 126.

Figure 4:
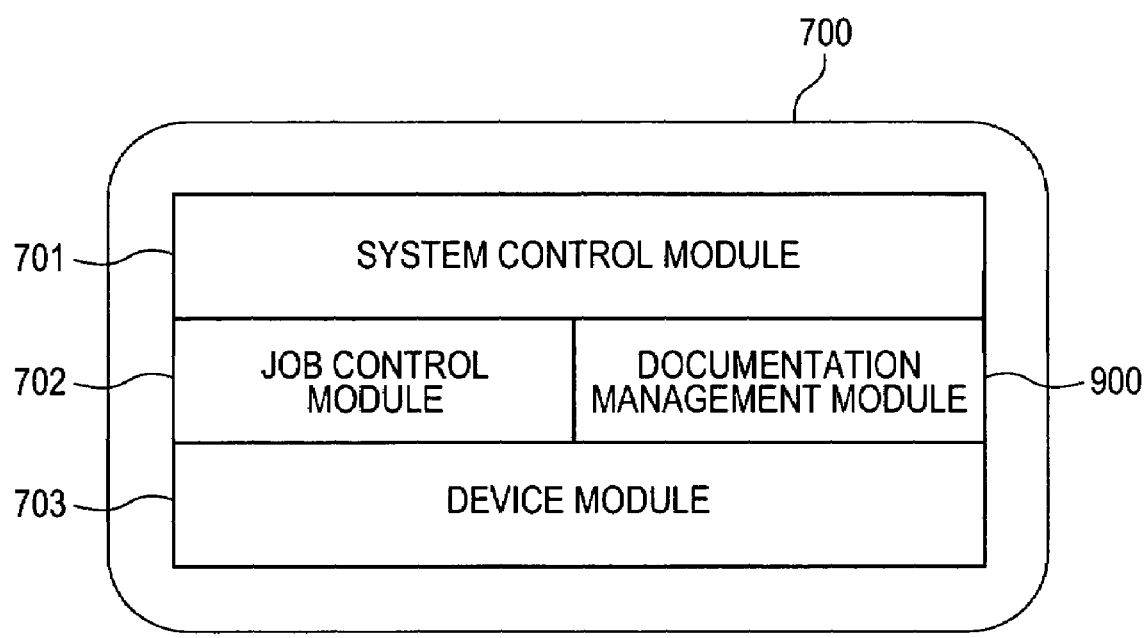
FIG. 4 illustrates an exemplary configuration of software for the controller.

FIG. 4 illustrates an exemplary configuration of software for the controller 110. Software 700 in the controller 110 includes a system control module 701, a job control module 702, a device module 703, and a documentation management module 900.

The system control module 701 analyzes a command (protocol) sent from the client PC 601, another multi-function apparatus, or the operation unit 150 via the corresponding interface. The system control module 701 then requests the job control module 702 to execute the job so as to realize a copy function, a PDL (code data) printing function, an image storing function, or a stored image printing function. The job control module 702 executes a variety of jobs in response to the request from the system control module 701. The device module 703 includes driver software that controls each unit of the digital multi-function printing apparatus 100 and is used when the job control module 702 executes a job. The documentation management module 900 controls the image storage unit 160 to manage image data in a hierarchical fashion and is used by the system control module 701 and the job control module 702.

Figure 5:
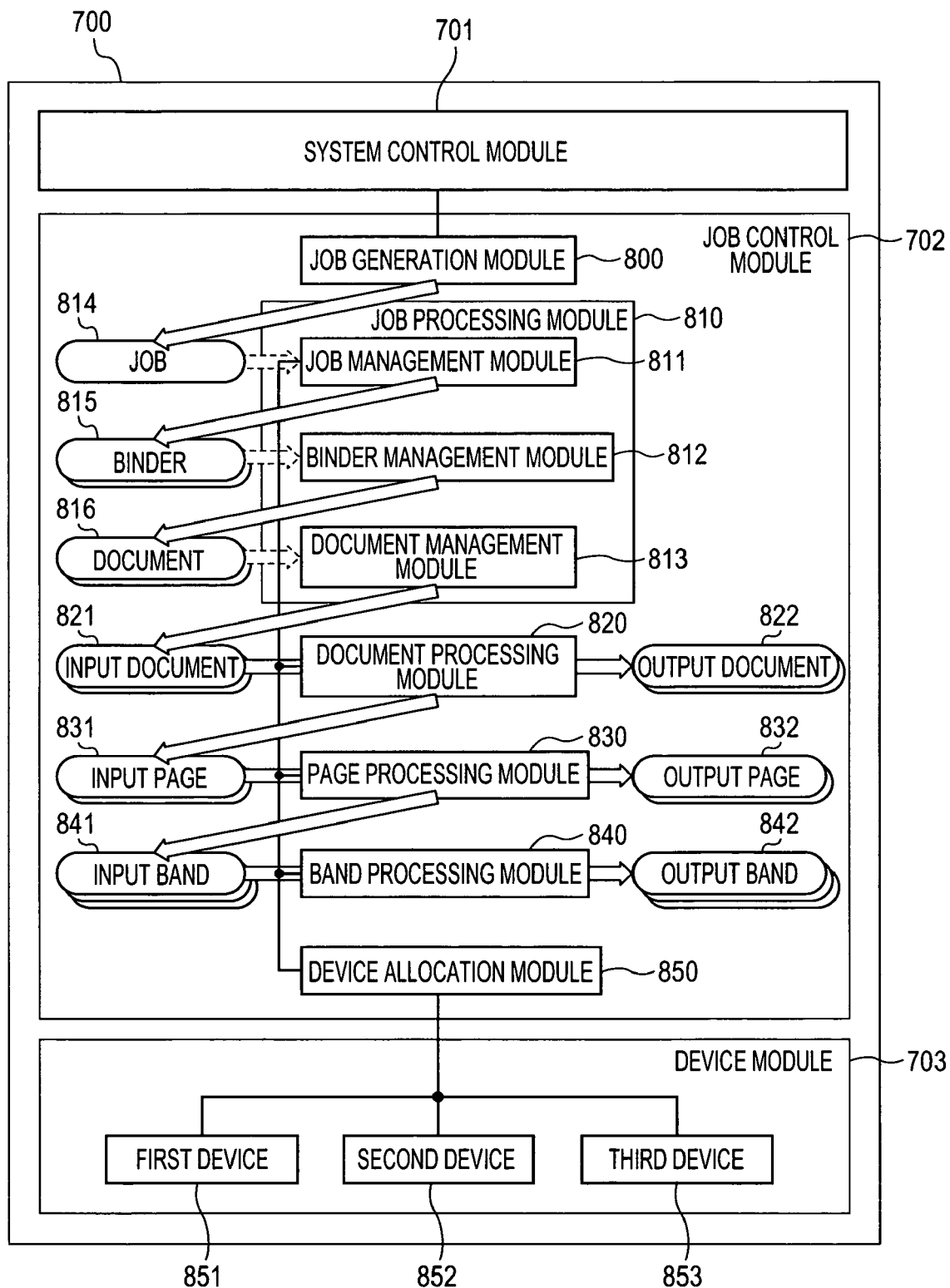
FIG. 5 illustrates an exemplary architecture of a job control module.

FIG. 5 illustrates an exemplary configuration of the job control module 702. The job control module 702 includes a job generation module 800, a job processing module 810, a document processing module 820, a page processing module 830, a band processing module 840, and a device allocation module 850. The job processing module 810 includes a job management module 811, a binder management module 812, and a document management module 813. The device module 703 includes a plurality of devices, such as a first device 851, a second device 852, and a third device 853.

A series of operation requests sent from the client PC 601 or the operation unit 150 are received by the job control module 702 via the corresponding interface as a command (protocol). The received command is analyzed by the system control module 701 and is delivered to the job control module 702. At that time, the command is changed to a format that the job control module 702 can recognize. The job generation module 800 generates a job 814. The types of the job 814 include a copy job, a readout image storing job, a code data printing job, a code data expanding and storing job, and a stored image printing job. By combining some of these jobs, the system control module 701 realizes a copy function, a PDL (code data) printing function, an image storing function, and a stored image printing function.

The command (protocol) analyzed and converted by the system control module 701 is described next. For example, a code data expanding and storing job includes a variety of setting information (e.g., the document name, the number of print copies, the type of recording paper, and the feeder cassette of the recording paper) and code data (e.g., PDL data or compressed image data).

The job 814 is delivered to the job processing module 810 to be processed. The job processing module 810 includes the job management module 811, the binder management module 812, and the document management module 813 to set up and process the job 814. The job management module 811 sets up the environment of the job 814, such as the output order of a plurality of binders of the job 814. The binder management module 812 sets up the environment of the binder, such as the output order of a plurality of documents of the binder. The document management module 813 sets up the environment of the document, such as the output order of a plurality of pages of the document. In addition to setting up and processing the job 814, the job processing module 810 divides the job 814 into binders 815, which are smaller tasks of the job 814. In addition to setting up and processing the binders 815, the job processing module 810 divides each of the binders 815 into documents 816, which are smaller tasks of each of the binders 815.

The document 816 has a one-to-one correspondence with an input document 821. The input document 821 is converted to an output document 822 by the document processing module 820. For example, in a scan job in which the pile of a document is scanned by a scanner into a plurality of image data items, the input document 821 describes the setting of the document pile and the operation procedure whereas the output document 822 describes the settings of the plurality of image data items and the operation procedure.

The document processing module 820 converts a pile of document paper sheets into a plurality of image data items. The document processing module 820 converts the input document 821 to the output document 822 on a document basis. In addition to setting up and processing a document, the document processing module 820 divides the document into input pages 831, which are smaller tasks of the document, and requests the page processing module 830 to process the input pages 831. This is because the job processing module 810 is dedicated to the process on a job basis and generates the binders 815 and the documents 816 for smaller tasks. More specifically, the setting and operation on a document basis is related to a sequence of pages, such as a change in the order of pages, a specification of duplex printing, addition of a cover, and overhead projector (OHP) sheet insertion.

The page processing module 830 converts an input page 831 to an output page 832 on a page basis. For example, in a scan job, the input page 831 includes a variety of settings and procedures, such as a scanning resolution and a scanning direction (landscape/portrait) whereas the output page 832 includes settings and procedures such as the storing position of image data. Furthermore, when the page processing module 830 processes the job 814 using a memory (band memory) for several lines, the page processing module 830 divides a page into bands, which are smaller processed units. The operations of an input band 841, the band processing module 840, and an output band 842 are similar to those for a page.

To execute a process, the job processing module 810, the document processing module 820, the page processing module 830, and the band processing module 840 use various physical devices of the digital multi-function printing apparatus 100. When a plurality of processing units concurrently execute task, sometimes device conflicts occur. Accordingly, the device allocation module 850 arbitrates the device conflict. For example, the first device 851 to the third device 853 are logical devices assigned to the above-described processing units by the device allocation module 850. Examples of the first device 851 to the third device 853 include a page memory, a band memory, the document feeder unit 250, the marking unit 320, an engine, and the scanner unit 210.

Figure 6:
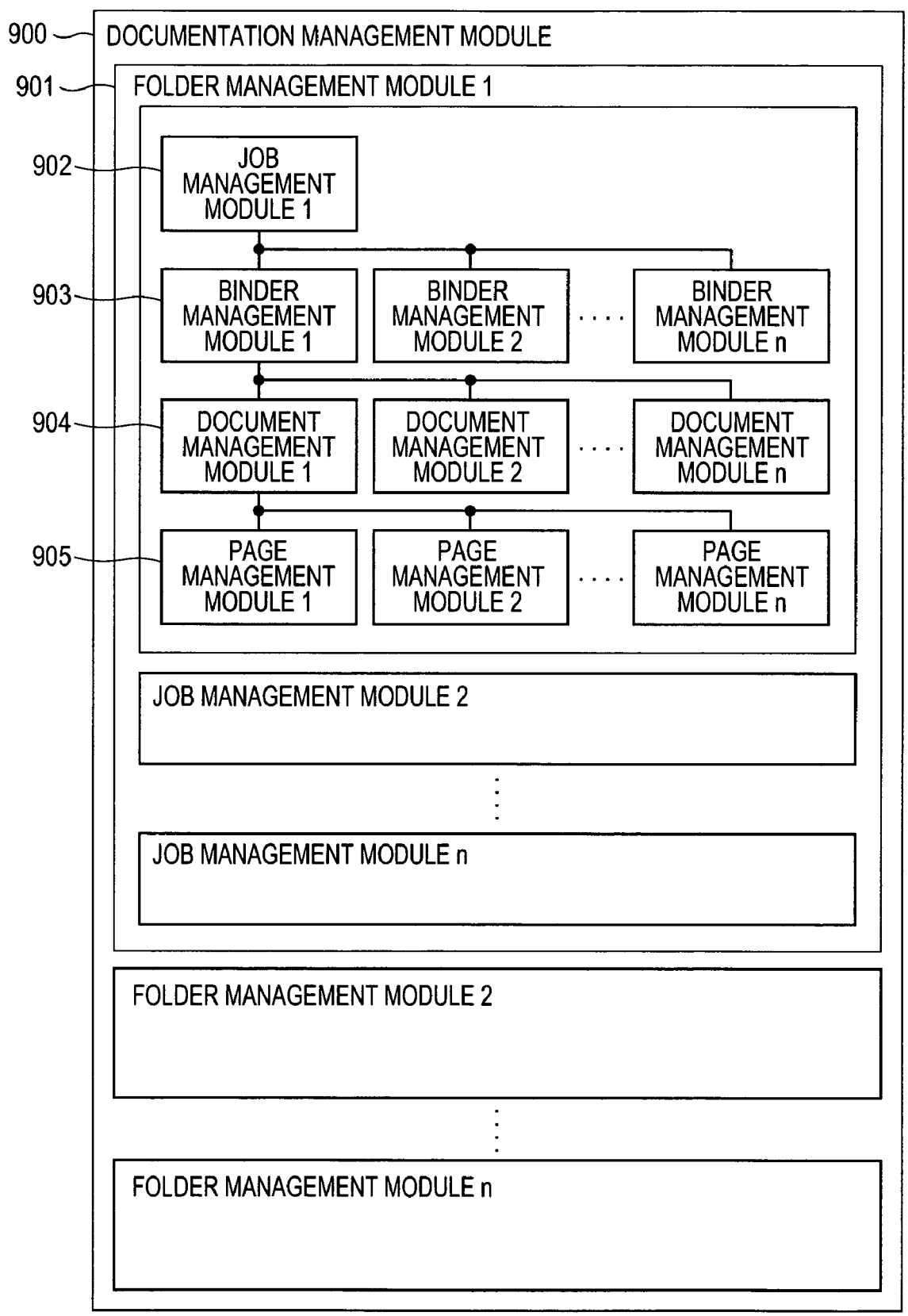
FIG. 6 schematically illustrates an exemplary management structure of a documentation management module.

FIG. 6 illustrates an exemplary management structure of the documentation management module 900. The documentation management module 900 includes one or more (1 to n) folder management modules 901. Each of the folder management modules 901 includes one or more job management modules 902. Each of the folder management modules 901 stores the folder name (box name) specified by a user. Each of the job management modules 902 includes one or more binder management modules 903. Each of the job management modules 902 can store and restore information which is required for the operation of the jobs 814 processed by the job control module 702 and which is stored in the job management module 811 of the job control module 702.

Additionally, each of the binder management modules 903 includes one or more document management modules 904. Each of the binder management modules 903 can store and restore information which is required for the operation of the binder 815 processed by the job control module 702 and which is stored in the binder management module 812 of the job control module 702.

And still further, each of the document management modules 904 includes one or more page management modules 905. Each of the document management modules 904 can store and restore information which is required for the operation of the documents 816 processed by the job control module 702 and which is stored in the document management module 813 of the job control module 702. Each of the document management modules 904 also restores attribute values of the input document 821 processed by the document processing module 820 and stores attribute values of the output document 822.

Each of the page management modules 905 corresponds to an image data item recorded in the image storage unit 160 (see FIG. 1). For example, each page management module 905 corresponds to an image data item for one page scanned by the scanner, an image data item for one page expanded from PDL data transferred from a host computer, or an image data item for one page received by a facsimile (FAX). Each page management module 905 also restores attribute values of the input page 831 processed by the page processing module 830 of the job control module 702 and stores attribute values of the output page 832. These modules hold management information required for the operation of the documentation management module 900 and processing information required for the operation of the job control module 702.

Thus, the job 814 (from FIG. 5) submitted at image storing time can be reproduced from the information stored in the documentation management module 900 and the image data stored in the image storage unit 160 (from FIG. 1). Additionally, by setting the stored image again, an operation different from the setting at job submission time can be provided.

[Exemplary Code-data Expanding and Storing Job]

Figure 7:
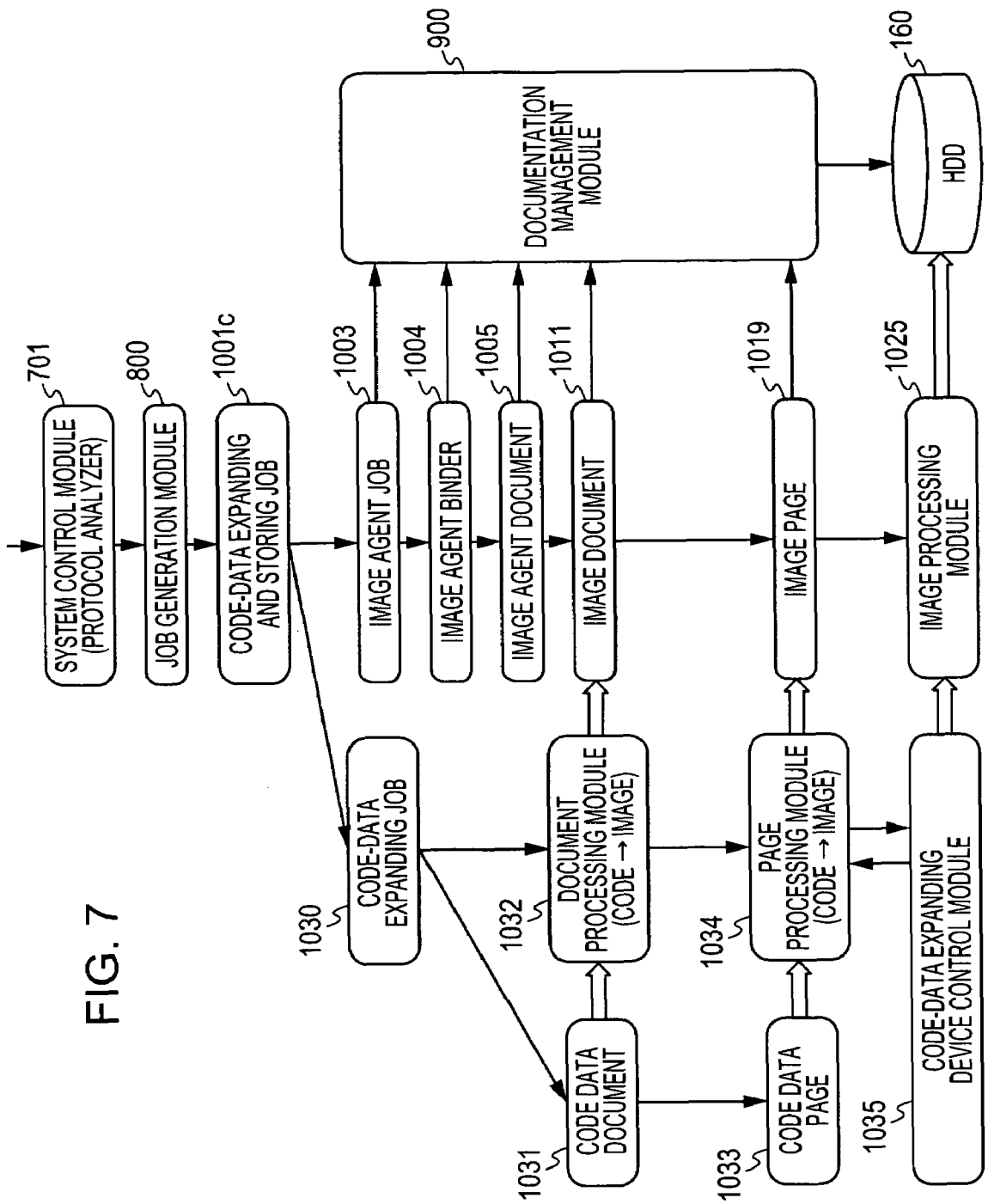
FIG. 7 illustrates the structure of an exemplary code data expanding and storing job, which is a job executed by the controller.

FIG. 7 illustrates the structure of an exemplary code-data expanding and storing job, which is one of the jobs 814 executed by the controller 110. A series of operation requests is transmitted from the client PC 601 or the operation unit 150 to the controller 110 via the corresponding interfaces in the form of command data. The received command data is analyzed by the system control module 701 (command analyzer from FIG. 4) and is transmitted to the job control module 702. Simultaneously, the command data is converted to a format recognizable by the job control module 702. The job generation module 800 analyzes the received command data to generate a code-data expanding and storing job 1001c.

The code-data expanding and storing job 1001c expands code data received from the system control module 701 into an image and stores the image in the image storage unit 160. The code-data expanding and storing job 1001c also generates a code-data expanding job 1030 and an image agent job 1003. The image agent job 1003 generates an image agent binder 1004, which in turn generates an image agent document 1005. The image agent document 1005 is a unit of a binder. The image agent document 1005 then generates an image document 1011, which is an output document. The generated image document 1011 is transferred to the code-data expanding job 1030 via the image agent document 1005, the image agent binder 1004, the image agent job 1003, and the code-data expanding and storing job 1001c.

The code-data expanding job 1030 corresponds to the job processing module 810, which sets up and processes the code-data expanding job 1030 and a binder. The code-data expanding job 1030 generates a code data document 1031 first and subsequently generates a document processing module (code to image) 1032. Thereafter, the code-data expanding job 1030 notifies the document processing module 1032 of the code data document 1031, which is an input document, and the image document 1011, which is an output document so as to control the document processing module (code to image) 1032.

The code data document 1031, which is an input document for the code data expansion processing, is converted to the image document 1011, which is an output document, by the document processing module (code to image) 1032. The document processing module (code to image) 1032 performs a process on a document basis. Smaller tasks are performed by a code data page 1033, a page processing module (code to image) 1034, and an image page 1019.

The code data document 1031 specifies code data to be expanded to a page image from code data received via the code-data expanding and storing job 1001c and the code-data expanding job 1030. The code data document 1031 then generates a code data page 1033 corresponding to the received code data for one page. The code data page 1033 is converted to the image page 1019 by the page processing module (code to image) 1034. The page processing module (code to image) 1034 can process the sequence to convert code data to image data. The page processing module 1034 submits a control command stored in a code-data expanding device control module 1035. Thus, the page processing module (code to image) 1034 executes an image expansion process to covert the code data page 1033 to the image page 1019. The expanded image data of the image page 1019 is stored in the image storage unit 160 via an image processing module 1025 depending on the conditions, such as an image storing mode. The image processing module 1025 performs resolution conversion and code conversion.

The entity of the code-data expanding device control module 1035 is a control program executed by the CPU 112. The code-data expanding device control module 1035 receives code data for one page corresponding to the code data page 1033 via the page processing module (code to image) 1034. The code-data expanding device control module 1035 analyzes the received code data as, for example, PDL data depending on the type of the received code data and expands the code data into raster image data.

The documentation management module 900 manages image data stored in the image storage unit 160 by the folder management modules 901 (from FIG. 6), the job management modules 902, the binder management modules 903, the document management modules 904, and the page management modules 905. The documentation management module 900 stores the setting (attribute) values used in the job management module 811 (from FIG. 5), the binder management module 812, the document management module 813, the attribute values of the image document 1011 converted by the document processing module (code to image) 1032, and the attribute values of the image page 1019 converted by the page processing module (code to image) 1034. These values are stored in the image agent job 1003, the image agent binder 1004, the image document 1011, and the image page 1019, respectively.

[Exemplary Stored Image Printing Job]

Figure 8:
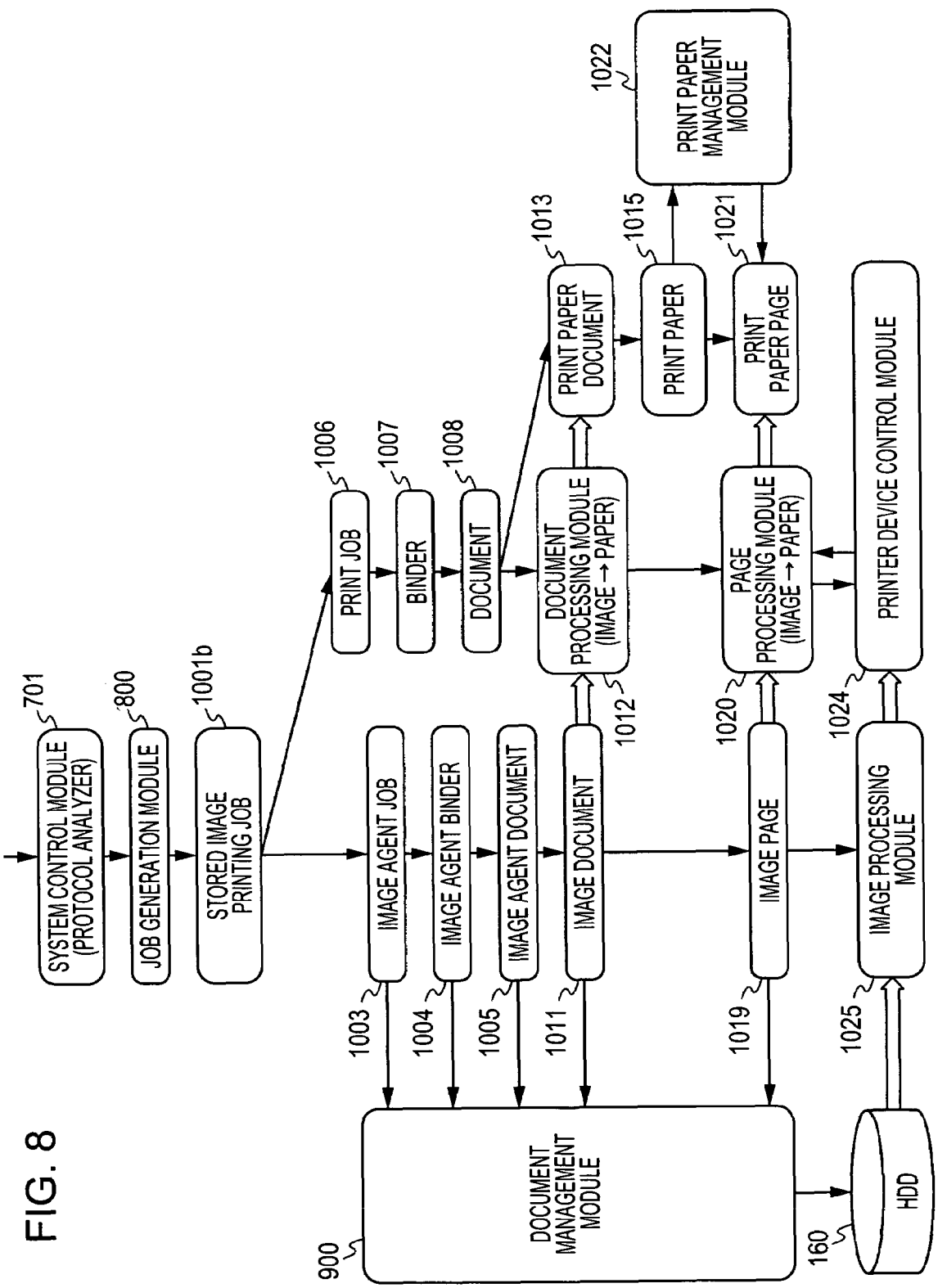
FIG. 8 illustrates the structure of an exemplary stored image printing job, which is another job executed by the controller.

FIG. 8 illustrates the structure of an exemplary stored image printing job, which is one of the jobs 814 executed by the controller 110. A series of operation requests is transmitted from the client PC 601 or the operation unit 150 to the controller 110 via the corresponding interfaces in the form of command data. The received command data is analyzed by the system control module 701 and is transmitted to the job control module 702. Simultaneously, the command data is converted to a format recognizable by the job control module 702. The job generation module 800 analyzes the received command data to generate a stored image printing job 100b. The stored image printing job 1001b is managed by the documentation management module 900. The stored image printing job 1001b is a job for printing image data stored in the image storage unit 160. The stored image printing job 1001b generates the image agent job 1003 and a print job 1006.

The image agent job 1003 generates the image agent binder 1004, which is an element of a job. The image agent binder 1004 generates the image agent document 1005 which is an element of a binder. The image agent document 1005 generates the image document 1011 which is an input document. The generated image document 1011 is transferred to the print job 1006 via the image agent document 1005, the image agent binder 1004, the image agent job 1003, and the stored image printing job 1001b.

The print job 1006 sets up and processes the job, and divides the job into binders 1007, which are smaller tasks. The print job 1006 then sets up and processes the binder, and divides the binder into documents 1008, which are further smaller tasks. Simultaneously, the image document 1011, which is an input document, is also transferred.

Upon receiving the image document 1011 (i.e., input document), the document 1008 generates a print paper document 1013 (i.e., an output document) and subsequently generates a document processing module (image to paper) 1012. Thereafter, the document 1008 notifies the document processing module (image to paper) 1012 of the image document 1011 (i.e., input document) and the print paper document 1013 (i.e., an output document) to control the document processing module (image to paper) 1012.

The image document 1011, which is an input document for print processing, is converted to the print paper document 1013, which is an output document, by the document processing module (image to paper) 1012. The document processing module (image to paper) 1012 performs processing on a document basis. Smaller tasks are performed by the image page 1019, a page processing module (image to paper) 1020, and a print paper page 1021.

The print paper document 1013 generates a print paper 1015 corresponding to each page of a sheet on which the image is printed. The generated print paper 1015 is registered to a print paper management module 1022 together with an identifier so that the print paper page 1021 is generated. The print paper management module 1022 determines the processing order of the print paper page 1021 on the basis of the identifier assigned to the print paper 1015, the print settings, and the specification of the device. For example, the print paper management module 1022 determines the processing order of the duplex printing described in relation to the printer unit 300 shown in FIG. 2 on the basis of the number of cyclic pages and print settings of duplex recording of the device.

The image page 1019 is converted to the print paper page 1021 by the page processing module (image to paper) 1020. The page processing module (image to paper) 1020 can process the sequence to control the printer device. The page processing module (image to paper) 1020 submits a control command stored in a printer device control module 1024. Thus, the page processing module (image to paper) 1020 executes a print process to convert the image page 1019 to the print paper page 1021. The image page 1019 retrieves image data stored and managed in the documentation management module 900 from the image storage unit 160 via the image processing module 1025 depending on the print settings. The image processing module 1025 converts the resolution and the code of an image as well as combining images.

Still referring to FIG. 8, the documentation management module 900 manages image data stored in the image storage unit 160 by the folder management modules 901 (from FIG. 6), the job management modules 902, the binder management modules 903, the document management modules 904, and the page management modules 905. These modules store attribute values when the image is stored. The specified image data is identified by the image agent job 1003, the image agent binder 1004, the image document 1011, and the image page 1019 so that the image data is retrieved from the image storage unit 160 together with the attribute values.

[Exemplary Code-data Printing Job]

Figure 9:
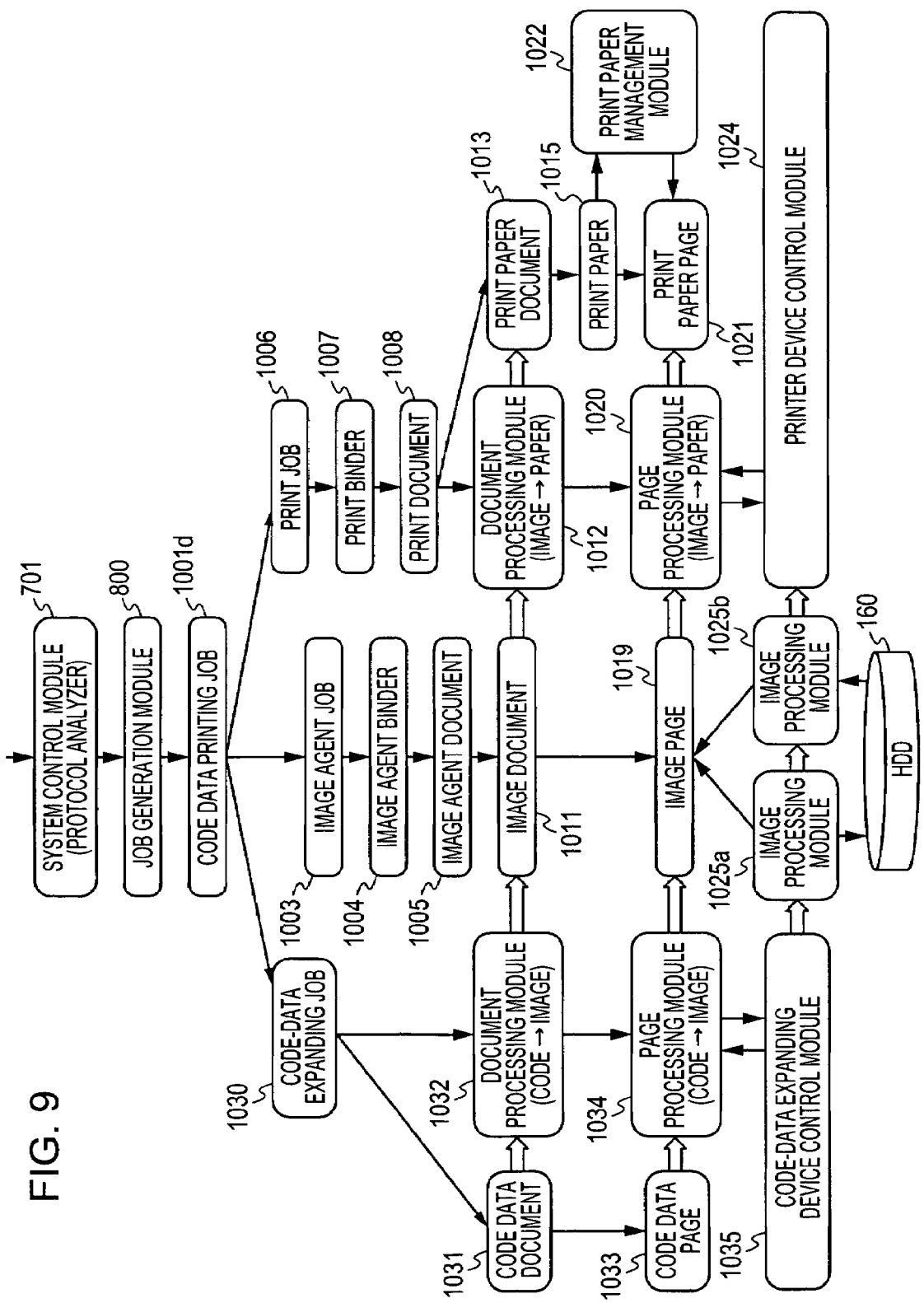
FIG. 9 illustrates the structure of yet another exemplary code data printing job, which is one of the jobs executed by the controller.

FIG. 9 illustrates the structure of an exemplary code-data printing job 1001d, which is one of the jobs 814 (from FIG. 5) executed by the controller 110. The received command data is analyzed by the system control module 701 and is transmitted to the job generation module 800. Like the code data expanding and storing job and the stored image printing job, upon receiving a command, the job generation module 800 analyzes the received command to generate the code data printing job 1001*d*. The job generation module 800 then transfers the control to the code data printing job 1001*d*.

The code data printing job 1001*d* expands code data transferred from the system control module 701 into image data and prints the image data. The code data printing job 1001*d* generates the code-data expanding job 1030, the image agent job 1003, and the print job 1006 and controls these jobs. The image agent job 1003 generates and controls the image agent binder 1004, which is an element of a job. The image agent binder 1004 generates the image agent document 1005, which is an element of a binder, and controls it.

The image agent document 1005 is an output document from the code-data expanding job 1030. The image agent document 1005 generates the image document 1011, which is an input document for the print job 1006, and controls it. The generated image document 1011 is transferred to the code-data expanding job 1030 and the print job 1006. At that time, the generated image document 1011 passes through the image agent document 1005, the image agent binder 1004, the image agent job 1003, and the code data printing job 1001*d*. Since the operations under the control of the code-data expanding job 1030 and the print job 1006 are similar to those shown in FIGS. 7 and 8, the descriptions are not repeated.

The image agent job 1003, the image agent binder 1004, the image document 1011, and the image page 1019 do not store the attributes which they manage in the documentation management module 900, and therefore they do not read the attributes from the documentation management module 900. The image page 1019 uses the image storage unit 160 to temporarily spool image data. Since the image page 1019 does not store the attributes in the documentation management module 900, the image page 1019 cannot print image data generated by the code data printing job 1001*d* by using the stored image printing job 1001*b*.

[Exemplary Operation of MFP Apparatus]

Figure 10:
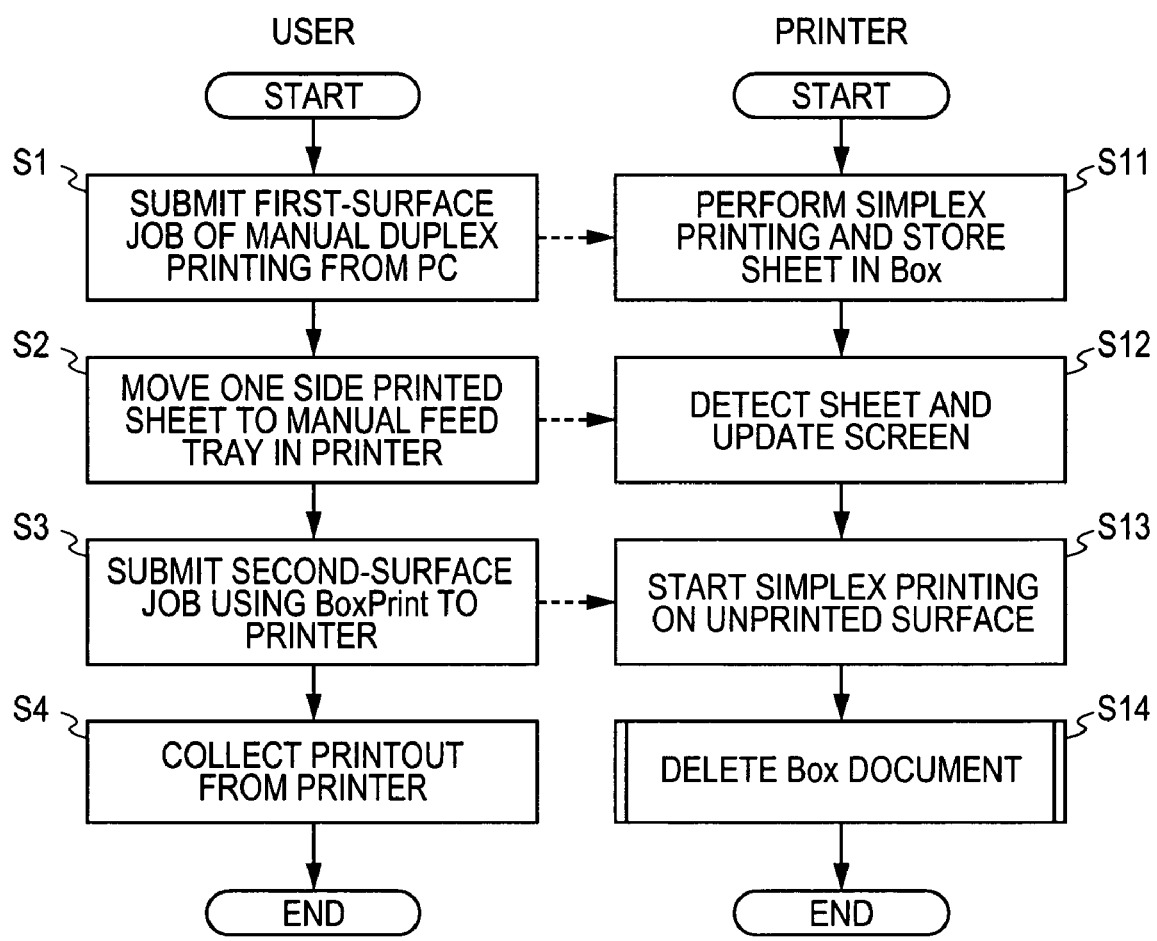
FIG. 10 is a flow chart illustrating an exemplary schematic process of the digital multi-function printing apparatus and a user operation when manual duplex printing is performed in the digital multi-function printing apparatus.

Exemplary operation of a digital multi-function printing apparatus having such a configuration is described next. FIG. 10 is a flow chart illustrating an exemplary process of the digital multi-function printing apparatus 100 and a user operation when manual duplex printing is performed in the digital multi-function printing apparatus 100. As stated above, the processing program in the digital multi-function printing apparatus (printer) 100 is stored in the ROM 114 and is executed by the CPU 112. As used herein, the term "manual duplex printing" refers to a function for realizing duplex recording even when a recording paper sheet, for example, cannot pass through the transport paths 336, 333, 338, and 332 for duplex recording shown in FIG. 2 due to the thickness and material of the recording paper sheet. In the manual duplex printing function, to realize duplex recording, an image is printed on either one of a front surface and a back surface of the recording paper sheet (a first surface) and is output. Subsequently, an image is printed on the other surface of the recording paper sheet (a second surface) with the first surface printed.

Initially, a user sets up manual duplex printing as a recording method from the client PC 601 and submits a print job (step S1). When the print job is submitted, the digital multi-function printing apparatus 100 receives code data and stores all pages of image data generated from the received code data in the documentation management module 900 (Box).

At the same time, the documentation management module 900 performs one-side recording (step S11). There are two types of one-side recording. When duplex printing is performed, only image data recorded on the front surfaces of recording paper sheets are one-side recorded. This is called duplex-front surface recording. Alternatively, when duplex printing is performed, only image data recorded on the back surfaces of recording paper sheets are one-side recorded. This is called duplex-back surface recording. In the case of duplex-front surface recording, for example, odd-numbered pages are one-side recorded in normal ascending order (1, 3, 5, . . . ). In this case, a recording paper sheet is fed from the manual feed tray 315 (from FIG. 2). Each recording paper sheet passes through the transport paper paths 331, 335, and 334 and is output onto the output paper tray 328 face up.

When the digital multi-function printing apparatus 100 completes one-sided printing, the user moves one side printed recording paper sheets stacked on the output paper tray 328 onto the manual feed tray 315 face down (step S2). The digital multi-function printing apparatus 100 detects the recording paper sheets loaded on the manual feed tray 315 by the sheet detection sensor 315*a* and displays a screen prompting the user for the next operation on the operation unit 150 (step S12).

Subsequently, after the user moves the one side printed recording paper sheets onto the manual feed tray 315, the user selects a job stored in the documentation management module 900 via the operation unit 150 of the digital multi-function printing apparatus 100 and starts one-sided printing for unprinted surfaces of the recording paper sheets (step S3). At that time, in the case of duplex-front surface printing at step S11, the digital multi-function printing apparatus 100 performs duplex-back surface printing. For example, the digital multi-function printing apparatus 100 performs one side recording of even-numbered image data items in normal ascending order (2, 4, 6, . . . ) and outputs the recording paper sheets face up (step S13). After the one side recording is completed at step S13, the user obtains (collects) the two-side recorded printouts (step S4). Thereafter, the digital multi-function printing apparatus 100 deletes the image data items printed by the manual duplex printing from the documentation management module 900 (step S14). Thus, the duplex printing is completed.

According to the first embodiment, in response to submission of a print job from an external device, the control unit of the digital multi-function printing apparatus 100 performs a print process for pages of the print job to be printed on first surfaces of sheets on the first surfaces of the sheets. Simultaneously, the control unit of the digital multi-function printing apparatus 100 stores pages of the print job to be printed on second surfaces of the sheets in a memory unit of the digital multi-function printing apparatus 100, such as a hard disk. At that time, the control unit of the digital multi-function printing apparatus 100 does not perform a print process for the data of the print job to be printed on the second surfaces of the sheets. The digital multi-function printing apparatus 100 is an example of image forming apparatuses that can receive a plurality of print jobs including a print job transmitted from an external device including an information processing apparatus (e.g., a host computer).

Subsequently, the control unit of the digital multi-function printing apparatus 100 controls a variety of units including a printer unit and a memory unit to perform a print process of the print job for data to be printed on the second surfaces of the sheet on the second surfaces of the sheets whose first surfaces are printed. Here, the control unit of the digital multi-function printing apparatus 100 does not receive a new print start instruction from, for example, the external device via a printer driver. In response to an instruction from the operation unit 150, the control unit of the digital multi-function printing apparatus 100 performs a print process for the data to be printed on the second surfaces of the sheets of the print job stored in the memory unit. The operation unit 150 is an example of user interface units used for the digital multi-function printing apparatus 100. Thus, known problems are solved.

The above-described control, for example, provides the following sequence to process a print job. For example, the controller 110 of the digital multi-function printing apparatus 100 receives, from the client PC 601, a job having image data for six pages and print conditions that specifies a print mode of "duplex", an output paper size of "A4", and the type of paper of "thick paper". In this case, the controller 110 of the digital multi-function printing apparatus 100 sequentially stores the image data for six pages in a storage area (box) of the image storage unit 160.

Concurrently, the controller 110 causes a feeder unit (the manual feed tray 315 in this example) of the digital multi-function printing apparatus 100 to feed three thick recording paper sheets of an A4 size. Subsequently, images for the first page, third page, and fifth page of the print job are sequentially printed on the first surfaces of the recording paper sheets. At the same time, the controller 110 inhibits to transport these recording paper sheets into the re-feed transport path 332 and controls these recording paper sheets to be output to the output paper tray 328. The controller 110 also holds the image data (for six pages) of the print job in the storage area (box) of the image storage unit 160, since the print job is not yet completed. The controller 110 then performs control to print the remaining pages (second, fourth, and sixth pages) of the image data in response to a user instruction from the operation unit 150 of the digital multi-function printing apparatus 100. When a user selects the print job and instructs the controller 110 to print the remaining pages, the controller 110 performs control to start printing the remaining pages (second, fourth, and sixth pages).

The next recording is performed on the above-described three recording paper sheets whose first surfaces are printed with the images of the first, third, and fifth pages. These recording paper sheets are set on a predetermined feeder unit (the manual feed tray 315 in this example) with the printed surfaces downward (face down). Although the order of feeding the recording paper sheets and the order of printing are not limited to certain orders, the image for the second page is printed on the second surface of the recording paper sheet whose first surface is printed with the image of the first page, the image for the fourth page is printed on the second surface of the recording paper sheet whose first surface is printed with the image of the third page, and the image for the sixth page is printed on the second surface of the recording paper sheet whose first surface is printed with the image of the fifth page.

Additionally, the controller 110 performs control so that the final output pages are duplex output pages having the proper page order. Furthermore, according to the first embodiment, the controller 110 can provide the following control (hereinafter also referred to as a "second sequence (auto duplex print mode)") in addition to the above-described control (hereinafter also referred to as a "first sequence (manual duplex print mode)").

For example, when the controller 110 of the digital multi-function printing apparatus 100 receives, from the client PC 601, a job having image data for six pages and print conditions that specify a print mode of "duplex", an output paper size of "A4", and the type of paper of "plain paper". In this case, the controller 110 of the digital multi-function printing apparatus 100 performs control so that the print job is not processed with the first sequence. The controller 110 of the digital multi-function printing apparatus 100 sequentially stores the image data for six pages in a storage area (box) of the image storage unit 160 and sequentially transports three recording paper sheets. The controller 110 performs control to carry out duplex printing in which a first page and a second page are respectively printed on the first and second surfaces of the first recording paper sheet, a third page and a fourth page are respectively printed on the first and second surfaces of the second recording paper sheet, and a fifth page and a sixth page are respectively printed on the first and second surfaces of the third recording paper sheet.

Upon receiving the last page of the job, the controller 110 starts the duplex printing for all pages. That is, in the second sequence, the controller 110 need not receive a user instruction to start printing via the operation unit 150 of the digital multi-function printing apparatus 100 once the controller 110 started the print operation. The controller 110 performs control on the recording paper sheets whose first surfaces are printed to be fed to the printer unit 300 again via the duplex transport path so that printing can be performed on the second surfaces of the recording paper sheets. Thus, the duplex printing is completed.

The second sequence can prevent the decrease in productivity due to the duplex printing waiting for a user operation. In the first embodiment, the first sequence and the second sequence are selectively performed for duplex printing. For example, the digital multi-function printing apparatus 100 is controlled by the controller 110 so that a sequence is selected from the two types of sequence depending on information about a recording paper sheet used for a duplex printing job (e.g., paper type and/or paper size). Thus, the problem for known technology can advantageously be solved. Furthermore, the occurrence of another problem caused by the prevention of the known problem is prevented. That is, this embodiment can provide an advantage in that the problem in known technology can be prevented while maintaining the high productivity.

Figure 11:
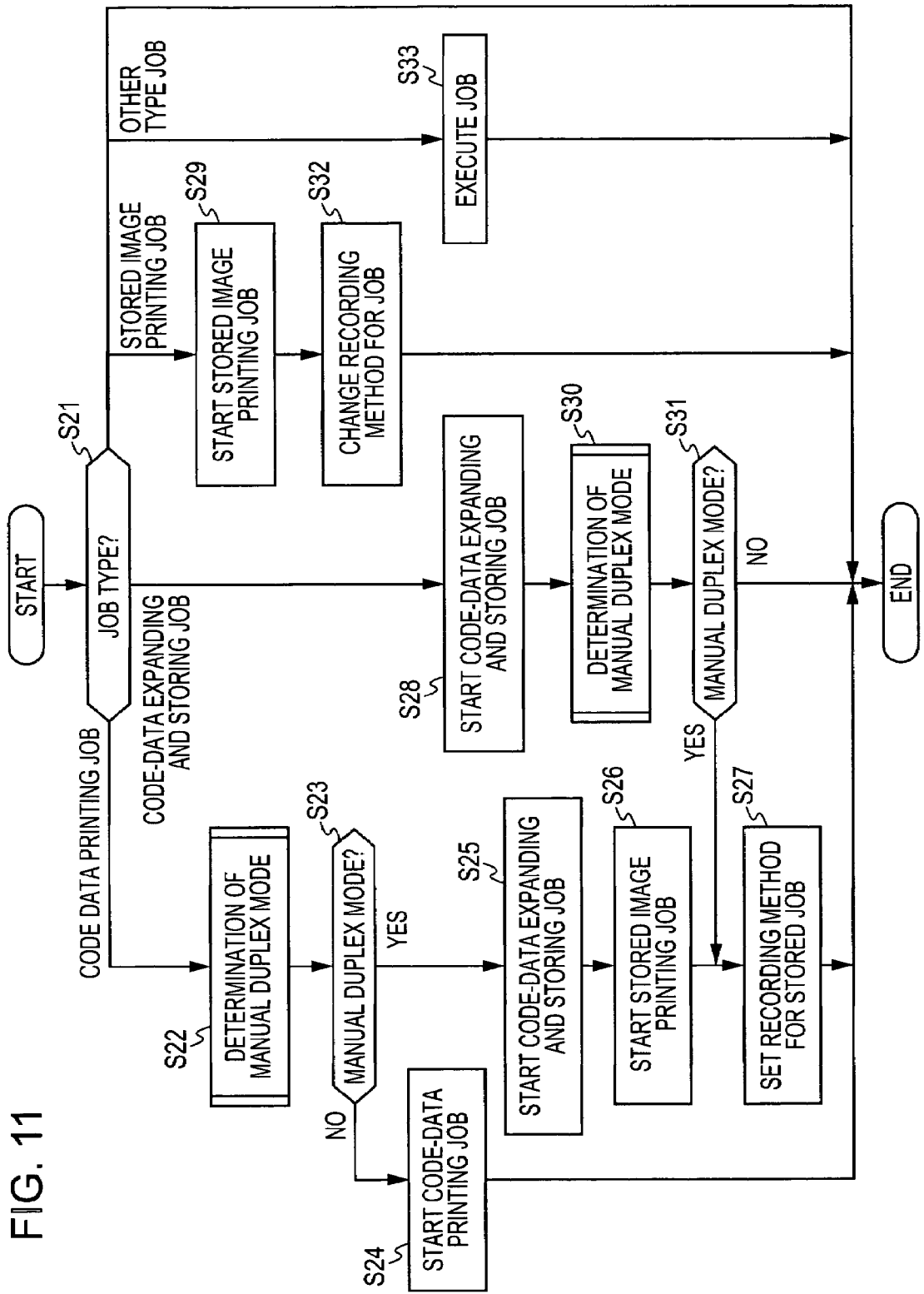
FIG. 11 is a flow chart of an exemplary processing procedure when a system control module instructs a job control module to execute a job.

The duplex printing process of the digital multi-function printing apparatus 100 at steps S11 to S14 from FIG. 10 is now herein described in detail. FIG. 11 is a flow chart of the processing procedure when the system control module 701 instructs the job control module 702 to execute a job. The system control module 701 analyzes command data sent from the client PC 601 or the operation unit 150 to determine the type of the job (step S21). If the system control module 701 determines that it needs to request the job control module 702 to execute the job, more specifically, when the type of the job is a code data printing job, the process proceeds to step S22. If the type of the job is a code data expanding and storing job, the process proceeds to step S28. If the type of the job is a stored image printing job, the process proceeds to step S29. If the type of the job is one of the other types, the job is executed at step S33 and the process is completed. In contrast, if the system control module 701 determines that it need not request the job control module 702 to execute the job, the process is immediately completed.

If, at step S21, it is determined that the received code data needs to be expanded into image data for printing (i.e., code data printing job), the system control module 701 further analyzes the command data to determine whether the operation in a manual duplex print mode is required or not (step S22). It is then determined at step S23 whether it is in a manual duplex print mode on the basis of the determined result at step S22. If it is not in a manual duplex print mode, the system control module 701 instructs the job control module 702 to generate and start the code data printing job 1001*d* (step S24). Thereafter, the process is completed. In contrast, if it is in a manual duplex print mode, the system control module 701 instructs the job control module 702 to generate and start the code-data expanding and storing job 1001*c* (step S25). Next, the code-data expanding and storing job 1001*c* specifies image data stored in the documentation management module 900 and instructs the job control module 702 to generate and start the stored image printing job 1001*b* (step S26). The system control module 701 then instructs the stored image printing job 1001*b* to execute front-surface recording or back-surface printing.

After step 26, the code-data expanding and storing job 1001*c* started at step S25 sets up the job management modules 902 corresponding to the image data stored in the documentation management module 900 as follows. The code-data expanding and storing job 1001*c* sets up a recording method (i.e., print setting) for recording data on the second surface opposite to the first surface which was recorded by the stored image printing job 1001*b* started at step S26 (step S27). The set recording method is referenced by the stored image printing job 1001*b* at its start-up and is used to determine the printing method. The process is then completed. The above-described steps S25 through S27 correspond to step S11 shown in FIG. 10.

In contrast, if, at step S21, it is determined that the received code data need to be expanded into an image and need to be stored in the image storage unit 160 (i.e., code-data expanding and storing job), the following process is executed. The system control module 701 instructs the job control module 702 to generate and start the code-data expanding and storing job 1001*c* (step S28). The system control module 701 further analyzes the command data to determine whether the operation in a manual duplex print mode is required or not at printing time (step S30). It is then determined whether a manual duplex print mode is required on the basis of the determined result at step S30 (step S31). If a manual duplex print mode is required, the system control module 701 sets a recording method of the job management modules 902 corresponding to the image data stored at step S27 to a front-surface recording or a back-surface recording. Thereafter, the process is completed. If a manual duplex print mode is not required at step S31, the process is then completed.

If, at step S21, the image data managed by the documentation management module 900 and stored in the image storage unit 160 need to be printed (the stored image printing job 1001*b*), the following process is executed. The system control module 701 instructs the job control module 702 to generate and start the stored image printing job 1001*b* (step S29). The system control module 701 changes the recording method (print setting) of the job management modules 902 for printing the image data of the stored image printing job started at step S29 to a recording method for printing data on a surface opposite to the surface one-side printed by the stored image printing job started at step S29 (step S32). Thereafter, the process is completed. The stored image printing job started at step S29 determines a printing method by referencing the recording method of the job management module set at step S27. However, if the user instructs a front-surface recording or a back-surface recording from the operation unit 150 of the digital multi-function printing apparatus 100, a recording method is determined in accordance with the recording method instructed from the operation unit 150. The processes at steps 29 and 30 correspond to the process at step S13 shown in FIG. 10.

Figure 12:
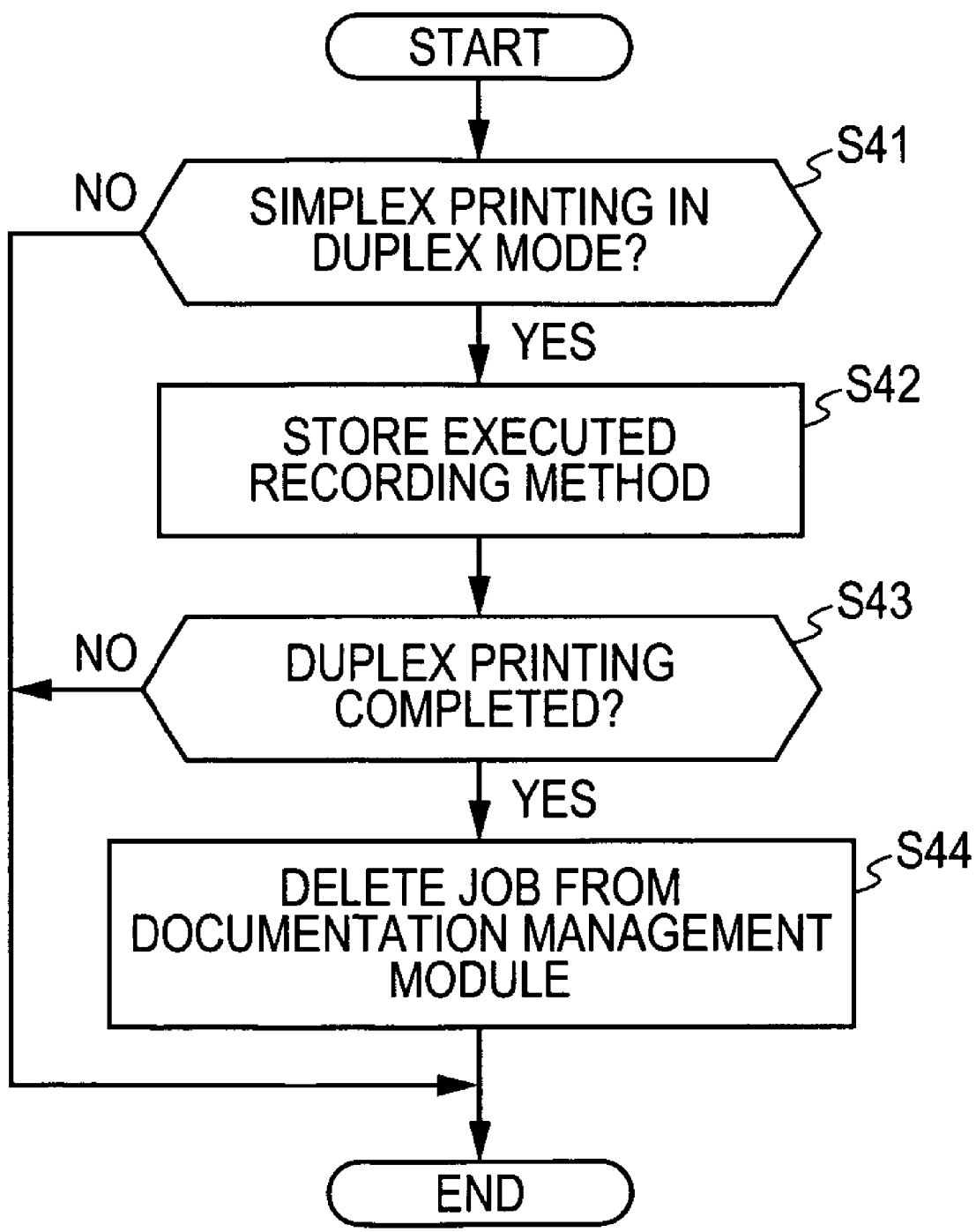
FIG. 12 is a flow chart of an exemplary operation procedure when the system control module detects the termination of a job which the system control module instructed the job control module to execute.

FIG. 12 is a flow chart of an exemplary operation procedure when the system control module 701 detects the termination of a job which the system control module 701 instructed the job control module 702 to execute. First, the system control module 701 determines whether the terminated job is a stored image printing job that executed a front-surface recording or a back-surface recording (step S41). If the terminated job is not a stored image printing job that executed a front-surface recording or a back-surface recording, the process is completed. However, if the terminated job is a stored image printing job, the system control module 701 adds and sets the executed recording method, as the executed recording method, to the job management module corresponding to the image data printed by the stored image printing job (step S42). The system control module 701 then checks the job management module corresponding to the image data printed by the terminated stored image printing job (step S43). If both front-surface recording and back-surface recording are set as an executed recording method, it is determined that the duplex printing for the manual duplex printing is completed and the system control module 701 deletes the printed image data from the documentation management module 900 (step S44). In contrast, if the duplex printing is not completed, this process is immediately completed. The above-described steps S41 through S44 correspond to step S14 in FIG. 10.

Figure 13:
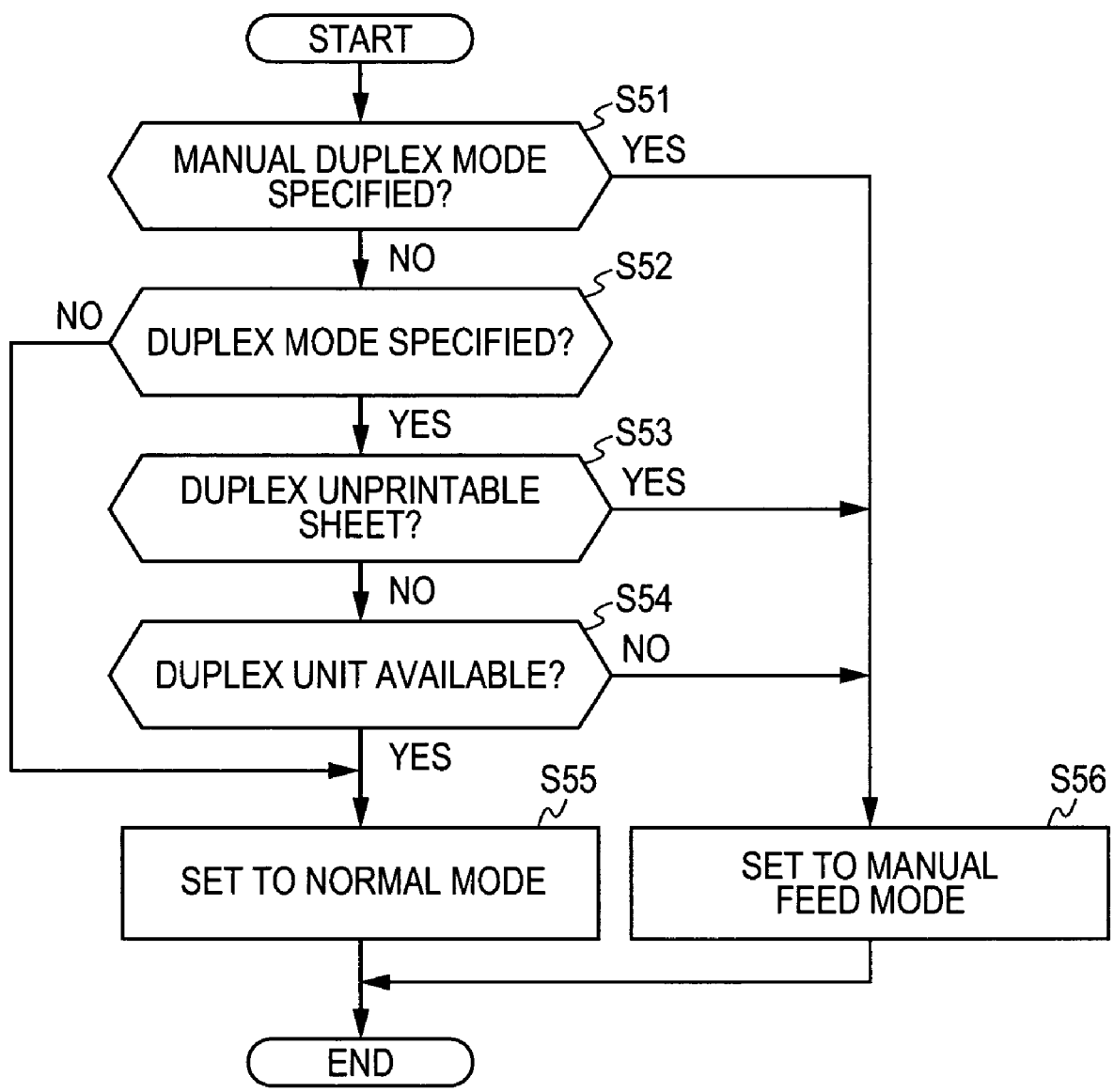
FIG. 13 is a flow chart of an exemplary procedure of the determination process of a manual duplex print mode.

FIG. 13 is a flow chart of an exemplary procedure of the determination process of a manual duplex print mode at steps S22 and S30. First, it is determined whether a manual duplex print mode is explicitly specified in the print setting of the code data (step S51). If a manual duplex print mode is specified, a manual duplex print mode is set (step S56) and the process is completed. However, if a manual duplex print mode is not specified, it is determined whether duplex recording is specified in the print setting of the code data (step S52). If duplex recording is not specified, a normal mode is set (a simplex mode in this example) (step S55) and the process is completed.

If, at step S52, duplex recording is specified, it is then determined whether a recording paper sheet that cannot pass through the transport paths 336, 333, 338, and 332 (hereinafter referred to as an "untransportable sheet") is specified in the print setting of the code data (step S53). If an untransportable sheet is specified, a manual duplex recording mode is set (step S56) and the process is completed. If an untransportable sheet is not specified, it is then determined whether the transport paths 336, 333, 338, and 332 for duplex recording (hereinafter referred to as a "duplex unit") normally operate and are usable (step S54). If the duplex unit is usable, a normal mode is set (an auto duplex mode in this example) at step S55. In contrast, if the duplex unit is not usable, a manual duplex print mode is set at step S56. The process is then completed.

As described above, a manual duplex print mode is set in the following cases: (1) A manual duplex print mode is explicitly specified; (2) Duplex printing is specified and a recording paper sheet that cannot pass through the duplex transport paths is specified; and (3) Duplex printing is specified and the duplex transport paths are not usable. In other cases, for example, if a duplex mode is specified and a recording sheet that can pass through the transport paths 336, 333, 338, and 332 is specified, a normal mode is set. Thereafter, the controller 110 perform controls so that a variety of controls (e.g., an image data storing control, an image forming control of image data, and a recording paper sheet transport control) are performed in accordance with the set mode.

In the first embodiment, examples of recording paper that cannot pass through the transport paths 336, 333, 338, and 332 include a thick paper sheet, an OHP sheet, a tab sheet, and a post card, which are predetermined types of paper sheets different from plain paper. In contrast, examples of recording paper that can pass through the transport paths 336, 333, 338, and 332 include predetermined types of paper sheet of a plain paper sheet, a color sheet, a recycled paper sheet.

In the above-described example, the CPU selects different sequences by distinguishing between an untransportable sheet and a transportable sheet on the basis of the type of a recording paper sheet used for a duplex printing job. Alternatively, the following control scheme can be selected.

For example, a very small sized recording paper sheet, such as a post card, may be regarded as a sheet that cannot pass through the transport paths 336, 333, 338, and 332, whereas a normal sized recording paper sheet may be regarded as a sheet that can pass through the transport paths. Thus, the CPU may select different sequences by distinguishing between an untransportable sheet and a transportable sheet on the basis of the size of a recording paper sheet used for a job of duplex printing.

In addition, the CPU may select a control sequence depending on both the type and the size of a recording paper sheet used for a duplex printing job. Furthermore, a user may specify the type or the size of a recording paper sheet used for a duplex printing job via the printer driver of the client PC 601. The controller 110 of the digital multi-function printing apparatus 100 acquires information about the type or the size of a recording paper sheet of the job from print condition information set via the printer driver of the client PC 601 and transmitted from the printer driver together with print data. The controller 110 makes a decision on the basis of the information when carrying out the process shown by the flow chart of the first embodiment. Additionally, when a copy function of the digital multi-function printing apparatus 100 is used, the user can specify the type or the size of a recording paper sheet as a parameter contained in the print conditions. The controller 110 then makes a decision on the basis of the information when carrying out the process shown by the flow chart of the first embodiment.

Figure 14:
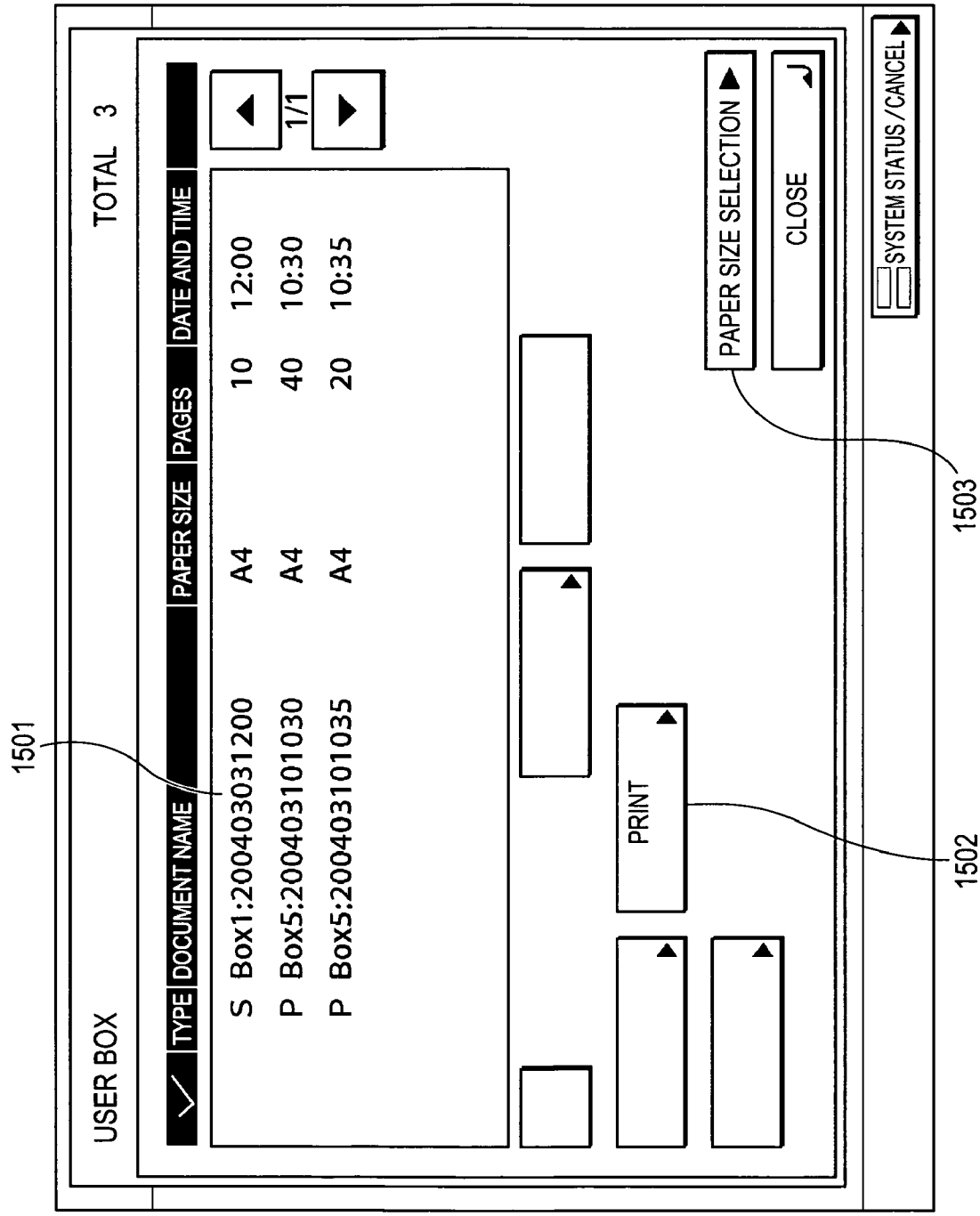
FIG. 14 illustrates an exemplary user box screen used to start manual duplex printing.
Figure 15:
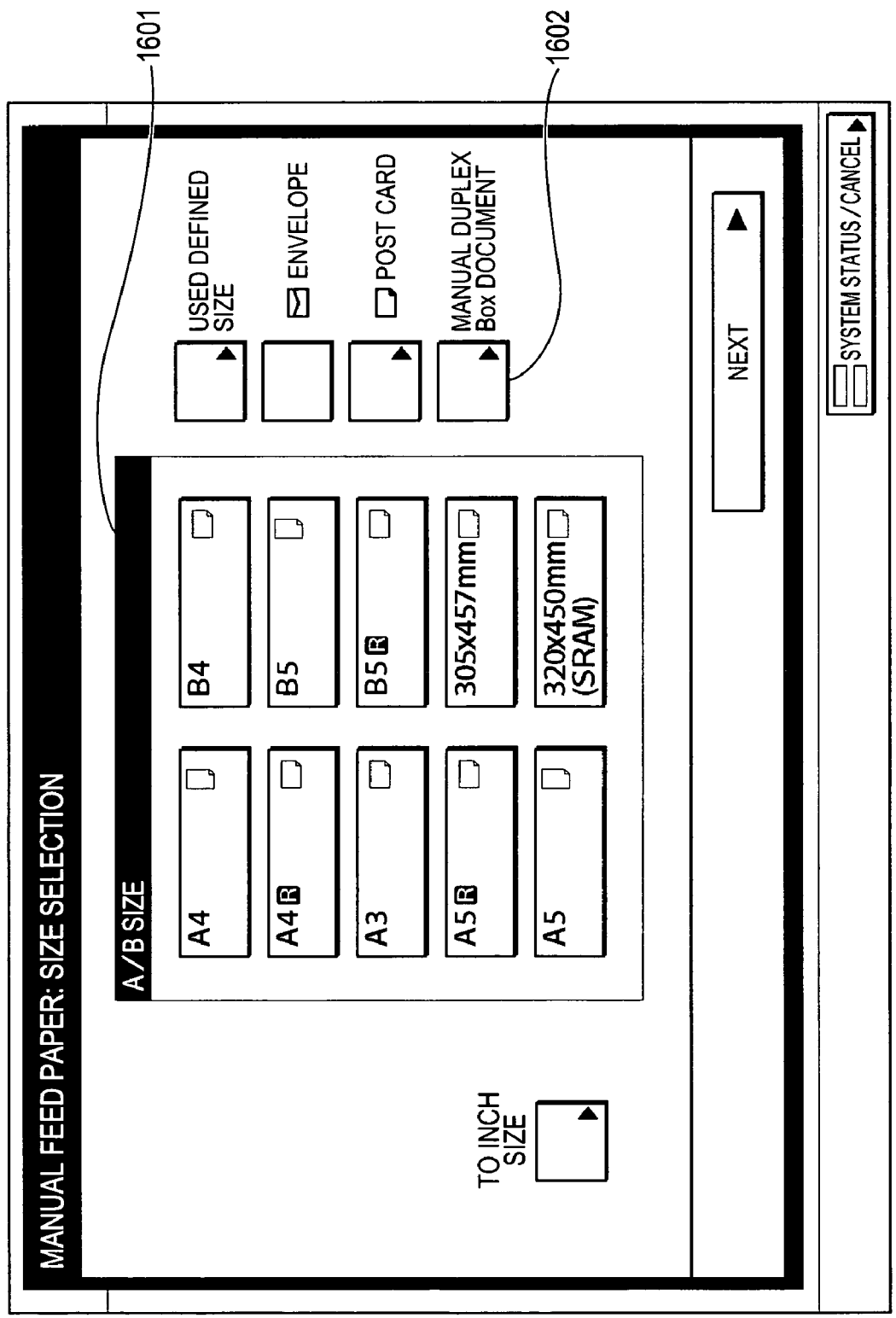
FIG. 15 illustrates an exemplary manual feed paper specification screen used to specify the size of a recording paper sheet loaded on a manual feed tray.

An exemplary screen displayed on the display panel of the operation unit 150 is described next when the controller 110 detects a recording paper sheet loaded on the manual feed tray 315 at step S12. FIG. 14 illustrates an exemplary user box screen used to immediately start manual duplex printing. While, FIG. 15 illustrates an exemplary manual feed paper specification screen used to specify the size of a recording paper sheet loaded on the manual feed tray 315. A switch button for switching one screen to the other screen is provided in each of the two screens (i.e., a paper size selection button 1503 or a manual duplex Box document button 1602). Consequently, either screen may be displayed first when a recording paper sheet loaded on the manual feed tray 315 is detected.

Now referring to FIG. 14, in a list display field 1501 of the user box screen, image data items stored in the documentation management module 900 and having a recording method of either a front-surface recording or a back-surface recording are displayed. In each line of the list display field 1501, the type of input (scan (S), PDL (p), or code data (C)), the document name, the paper size, the number of pages, and a date and time are displayed. The user selects a desired image data item from among image data items displayed in the list display field 1501 using a touch panel and presses a print button 1502 so as to start printing the selected image data item. The recording method used for printing the image data item is that set to the job management modules 902 at step S27, that is, a front-surface recording or a back-surface printing. Additionally, the size of a recording paper sheet loaded on the manual feed tray 315 is determined to be the size of a recording paper sheet for the selected image data item. When the paper size selection button 1503 is pressed, a manual duplex printing is not started, but the user box screen is changed to the manual feed paper specification screen used to specify the size of a recording paper sheet loaded on the manual feed tray 315.

Now referring to FIG. 15, in the manual feed paper specification screen, size setting buttons 1601 are used for selecting the size of a recording paper sheet loaded on the manual feed tray 315. A paper size is displayed on each of the size setting buttons 1601. The manual duplex box document button 1602 switches the manual feed paper specification screen to the user box screen used to start manual duplex printing.

[Exemplary Front-surface and Back-surface Recording]

The front-surface recording and the back-surface recording are described in detail. Here, it is described on which surface of a recording paper sheet each image data item is recorded in the manual duplex printing. FIGS. 16A through 18B illustrate the procedure of duplex printing of a 5-page document including only A4 pages. More specifically, FIGS. 16A-B and 17A-B illustrate the case where a first job adopts a front-surface recording and a second job adopts a back-surface recording. FIGS. 18A-B illustrate the case where a first job adopts a duplex back-surface recording and a second job adopts a front-surface recording. In the duplex back-surface recording, simplex printing is performed for image data items of a first page, a third page, and a fifth page. In the back-surface recording, simplex printing is performed for image data items of a second page and a fourth page.

Figure 16A:
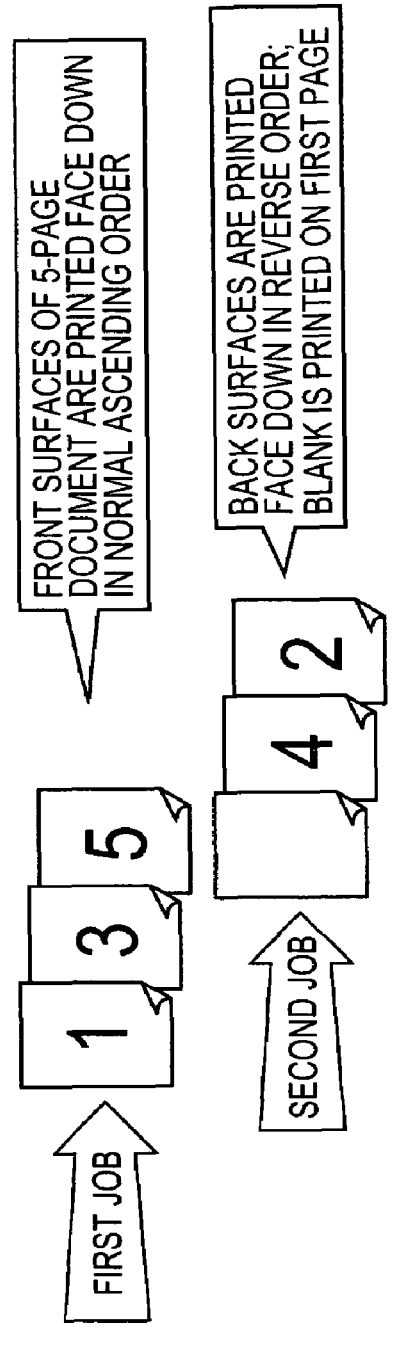
FIGS. 16A-B illustrate an exemplary procedure of duplex printing of a 5-page document including only A4 pages.

As shown in FIG. 16A, in a first job, the front surfaces of recording paper sheets are recorded in a normal ascending order, and the recording paper sheets are output face down. In a second job, the back surfaces of the recording paper sheets are recorded in the reverse order, and the recording paper sheets are output face down. In the second job, a first recording surface is a back surface of an image on a fifth page. Since an image data item for that page does not exist, a blank page recording is performed. A blank page recording can be realized by either recording an image data item for a blank page on a recording paper sheet or feeding a recording paper sheet and outputting it without performing a recording operation.

Figure 16B:
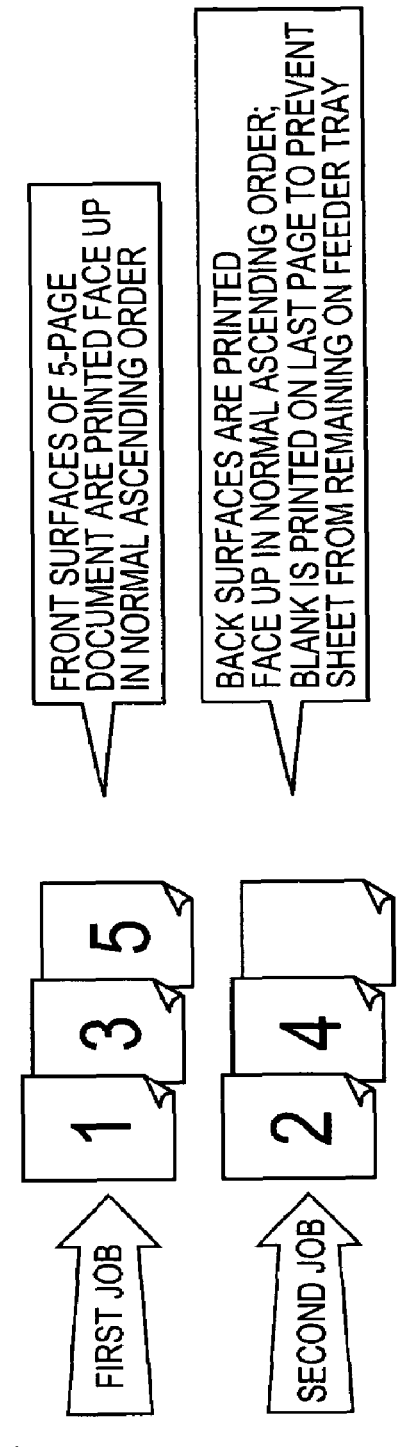

As shown in FIG. 16B, in a first job, the front surfaces of recording paper sheets are recorded in a normal ascending order, and the recording paper sheets are output face up. In a second job, the back surfaces of the recording paper sheets are recorded in a normal ascending order, and the recording paper sheets are output face up. Like the example shown in FIG. 16A, in the second job, a blank page recording is performed on the last recording surface. As shown in FIG. 17A, in a first job, the front surfaces of recording paper sheets are recorded in a reverse order, and the recording paper sheets are output face down. In a second job, the back surfaces of the recording paper sheets are recorded in a normal ascending order, and the recording paper sheets are output face up. Like the example shown in FIG. 16A, in the second job, a blank page recording is performed on the last recording surface. As shown in FIGS. 16B and 17A, by performing a simplex printing on the last recording surface of the second job as a blank page, no recording paper sheet whose one surface is printed remains on the manual feed tray 315.

As shown in FIG. 17B, in a first job, the front surfaces of recording paper sheets are recorded in a reverse order, and the recording paper sheets are output face up. In a second job, the back surfaces of the recording paper sheets are recorded in the reverse order, and the recording paper sheets are output face down. Like the example shown in FIG. 16A, in the second job, a blank page recording is performed on the first recording surface.

As shown in FIG. 18A, in a first job, the back surfaces of recording paper sheets are recorded in a normal ascending order, and the recording paper sheets are output face down. In a second job, the front surfaces of the recording paper sheets are recorded in the reverse order, and the recording paper sheets are output face up. Like the example shown in FIG. 16A, in the first job, a blank page recording is performed on the last recording surface. As shown in FIG. 18B, in a first job, the back surfaces of the recording paper sheets are recorded in a normal ascending order, and the recording paper sheets are output face up. In a second job, the front surfaces of the recording paper sheets are recorded in a normal ascending order, and the recording paper sheets are output face down. Like the example shown in FIG. 16A, in the first job, a blank page recording is performed on the last recording surface. As shown in FIGS. 18A and 18B, by performing a simplex printing on the last recording surface of the first job as a blank page, recording paper sheets loaded on the manual feed tray 315 cannot be run out in the second job.

FIGS. 19A-B and 20A-B illustrate the procedure of duplex printing of a 4-page document including A4, A3, A3, and A4 pages from the first page. More specifically, FIGS. 19A-B and 20A-B illustrate the case where a first job adopts a front-surface recording and a second job adopts a back-surface recording.

Figure 21A:
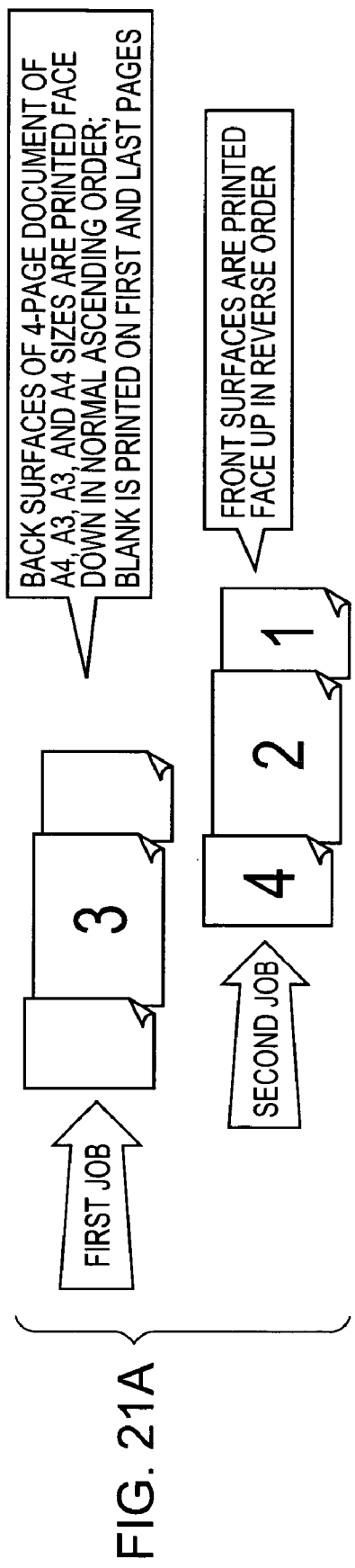
FIGS. 21A-B illustrate the procedure of duplex printing of a 4-page document including A4, A3, A3, and A4 pages from the first page.
Figure 21B:
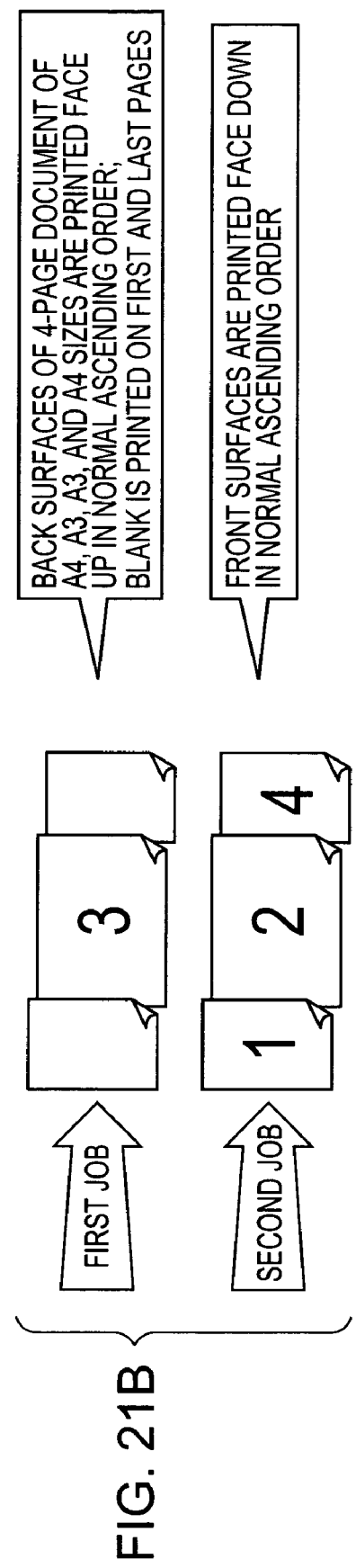

FIGS. 21A-B illustrate the case where a first job adopts a back-surface recording and a second job adopts a first-surface recording. In the front-surface recording, simplex printing is performed for image data items of a first page, a second page, and a fourth page. In the back-surface recording, simplex printing is performed for an image data item of a third page. The recording surfaces for image data items of pages subsequent to the second page are shifted in contrast to those in FIGS. 16 to 18. This is because the size of a recording paper sheet for the first page is A4, and therefore, image data item for the second page of A3 size cannot be recorded on the back surface of the first recording paper sheet. Since an image data item for the third page has an A3 recording paper sheet size that is the same as an image data item for the previous second page, the image data item for the third page can be printed on the back surface of the second page.

Figure 19A:
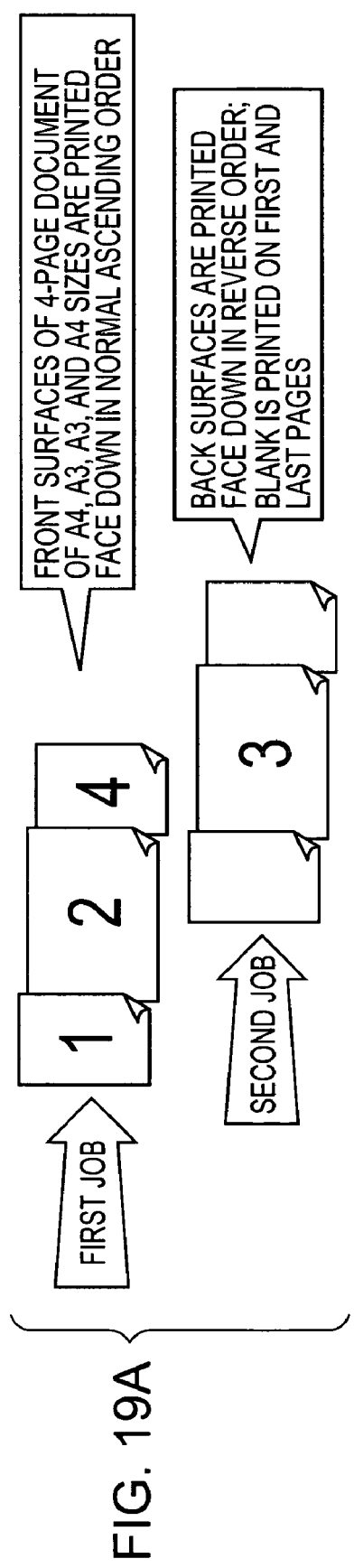

As shown in FIG. 19A, in a first job, the front surfaces of recording paper sheets are recorded in a normal ascending order, and the recording paper sheets are output face down. In a second job, the back surfaces of the recording paper sheets are recorded in the reverse order, and the recording paper sheets are output face down. In the second job, a first recording surface is a back surface of recording paper sheet whose front surface is printed with an image on a fourth page. Since the image data item does not exist for the page, a blank page printing is performed. A blank page recording is also performed on the last recording back surface of the second job due to the above-described difference between the sizes of the recording paper sheets.

Figure 19B:
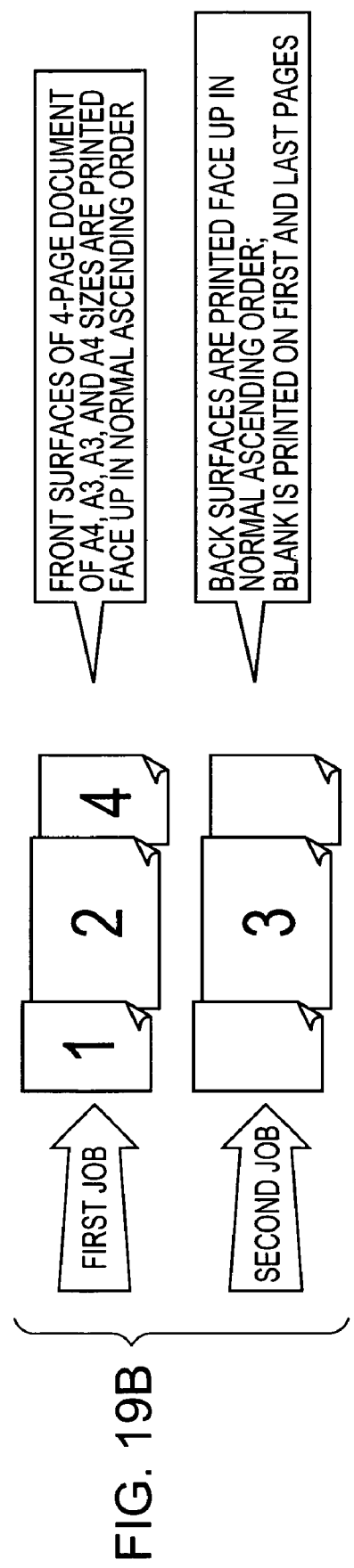

As shown in FIG. 19B, in a first job, the front surfaces of recording paper sheets are recorded in a normal ascending order, and the recording paper sheets are output face up. In a second job, the back surfaces of the recording paper sheets are recorded in a normal ascending order, and the recording paper sheets are output face up. Like the example shown in FIG. 19A, in the second job, a blank page recording is performed on the first and the last recording surfaces.

As shown in FIG. 20A, in a first job, the front surfaces of recording paper sheets are recorded in a reverse order, and the recording paper sheets are output face down. In a second job, the back surfaces of the recording paper sheets are recorded in a normal ascending order, and the recording paper sheets are output face up. Like the example shown in FIG. 19A, a blank page recording is performed on the first and the last recording surfaces of the second job.

As shown in FIG. 20B, in a first job, the front surfaces of recording paper sheets are recorded in a reverse order, and the recording paper sheets are output face up. In a second job, the back surfaces of the recording paper sheets are recorded in a reverse order, and the recording paper sheets are output face down. Like the example shown in FIG. 19A, a blank page recording is performed on the first and the last recording surfaces of the second job. As shown in FIGS. 19A-B and 20A-B, by performing a simplex printing on the last recording surface of the second job as a blank page, no recording paper sheet whose one surface is printed remains on the manual feed tray 315.

As shown in FIG. 21A, in a first job, the back surfaces of recording paper sheets are recorded in a normal ascending order, and the recording paper sheets are output face down. In a second job, the front surfaces of the recording paper sheets are recorded in the reverse order, and the recording paper sheets are output face up. Like the example shown in FIG. 19A, in the first job, a blank page recording is performed on the first and the last recording surfaces.

As shown in FIG. 21B, in a first job, the back surfaces of recording paper sheets are recorded in a normal ascending order, and the recording paper sheets are output face up. In a second job, the front surfaces of the recording paper sheets are recorded in a normal ascending order, and the recording paper sheets are output face down. Like the example shown in FIG. 19A, in the first job, a blank page recording is performed on the first and the last recording surfaces. As shown in FIGS. 21A-B, by performing a simplex printing on the last recording surface of the first job as a blank page, recording paper sheets loaded on the manual feed tray 315 cannot be run out in the second job.

Figure 22:
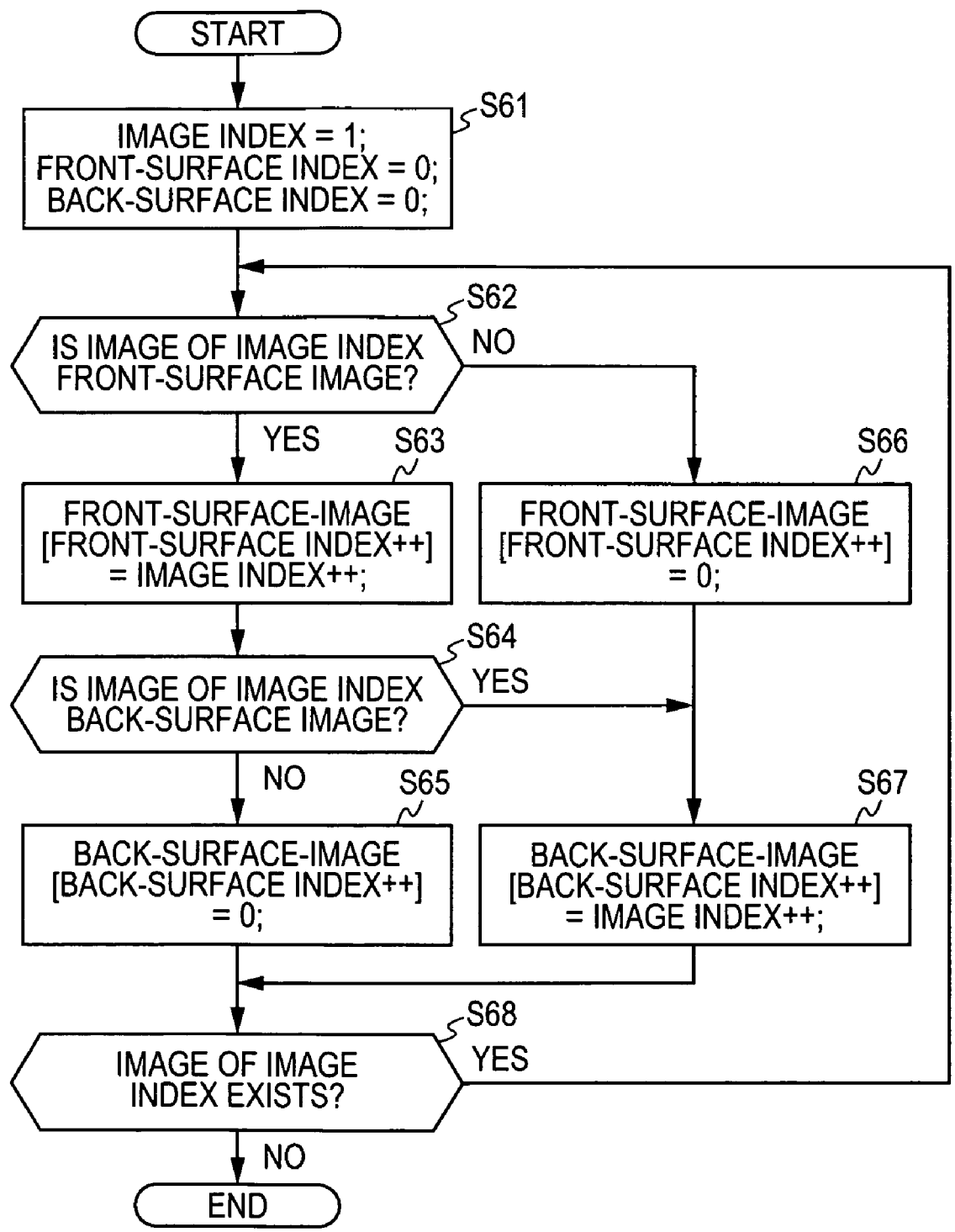
FIG. 22 is a flow chart of an exemplary procedure of processing to determine on which surface of a recording paper sheet each image data item is recorded in manual duplex printing.

FIG. 22 is a flow chart of an exemplary procedure of processing to determine on which surface of a recording paper sheet each image data item is recorded in the manual duplex printing. In this processing, an array front-surface-image[ ] of indices of image data items recorded on the front surfaces and an array back-surface-image[ ] of indices of image data items recorded on the back surfaces are set up. Additionally, the number of elements of each array is set up in a front-surface index and a back-surface index.

First, initialization is performed in which the image index representing an image data item to be evaluated is set to 1, the front-surface index, which is an index of the array front-surface-image[ ], is set to 0, and the back-surface index, which is an index of the array back-surface-image[ ], is set to 0 (step S61). Subsequently, it is determined whether an image data item indicated by the image index can be recorded on a front surface (step S62). If the image data item cannot be recorded on a front surface, the process proceeds to step S66. For example, if a back-surface recording is explicitly specified in PDL data, it is determined that the image data item cannot be recorded on a front surface.

In contrast, if the image data item can be recorded on a front surface, the element of the array front-surface-image[ ] indicated by the front surface index is set to a value of the image index and the front surface index and the image index are incremented by 1 (step S63). It is then determined whether an image data item indicated by the image index can be recorded on a back surface (step S64). For example, if one of the following conditions (a) to (c) is satisfied, it is determined that the image data item cannot be recorded on the back surface: (a) A front-surface recording is explicitly specified in the PDL data; (b) One of a recording paper size, a recording paper type (e.g., plain paper, thick paper, and color paper), and a feeder cassette specified by the PDL data is different from that of the image data immediately before the image indicated by the image index; and (c) The completion of duplex recording is specified in the PDL data of the image data immediately before the image indicated by the image index. That is, in one of the above-described cases, it is determined that the image data item cannot be recorded on the back surface.

If, at step S64, it is determined that the image data item can be recorded on a back surface, the element of the array back-surface-image[ ] indicated by the back surface index is set to a value of the image index and the back surface index and the image index are incremented by 1 (step S67). However, if it is determined that the image data item cannot be recorded on the back surface, the element of the array back-surface-image[ ] indicated by the back surface index is set to 0, which indicates that the corresponding image is not present, and the back surface index is incremented by 1 (step S65).

If, at step S62, the image data item cannot be recorded on the front surface, the element of the array front-surface-image[ ] indicated by the front surface index is set to 0, which indicates that the corresponding image is not present, and the front surface index is incremented by 1 (step S66). Subsequently, the element of the array back-surface-image[ ] indicated by the back surface index is set to the value of the image index, and the back surface index and the image index are incremented by 1 (step S67).

After the process at step S65 or S67 is completed, it is determined whether the image data item indicated by the image index exists in the document (step S68). If the image data item exists, the process returns to step S62. Otherwise, the process is completed.

[Determination Process Example]

An example of the determination process of a recording surface for an image data item is described below. For example, in FIGS. 19 through 21, a 4-page document which includes A4, A3, A3, and A4 sized pages in this order is recorded in a duplex mode. In the case of an image for the first page, that is, if the image index=1, a front-surface recording is possible at step S62. Accordingly, the process proceeds to step S63, where it is determined the front-surface-image[ ], which is an array of indices of image data items recorded on the front surfaces, to be 1. That is, the front-surface-image[0] =1. Also, the front surface index and the image index are incremented by 1, so that the front surface index=1 and the image index=2.

Subsequently, at step S64, since the recording paper size of an image data item for the image index=2 is different from that of the previous image, as shown by the condition (b), a back-surface recording cannot be performed. Therefore, the back-surface-image[ ], which is an array of indices of image data items recorded on the back surfaces, to be 1. That is, the back-surface-image[0]=1. Also, the back surface index is incremented by 1, so that the back surface index=1.

Subsequently, at step S68, since an image indicated by the image index exists, the process returns to step S62. At step S62, since a front-surface recording can be performed for an image data item indicated by an image index of 2, the front-surface-image[1]=2 is determined. Also, the front surface index and the image index are incremented by 1, so that the front surface index=2 and the image index=3. Subsequently, at step S64, since a back-surface recording can be performed for an image indicated by an image index of 3, the back-surface-image[1]=3 is determined at step S67. Also, the back surface index and the image index are incremented by 1, so that the back surface index=2 and the image index=4.

Subsequently, at step S68, since an image indicated by an image index of 4 exists, the process returns to step S62 again. At step S62, since a front-surface recording can be performed for an image data item indicated by an image index of 4, the front-surface-image[2]=4 is determined. Also, the front surface index and the image index are incremented by 1, so that the front surface index=3 and the image index=5.

Subsequently, at step S64, since a back-surface recording cannot be performed for an image indicated by an image index of 5 (the image does not exist), the back-surface-image [2]=0 is determined at step S65: Also, the back surface index is incremented by 1, so that the back surface index=3. Thereafter, it is determined at step S68 that an image indicated by an image index of 5 does not exist and the process is completed.

As the result of the above-described processing, for the image data shown in FIGS. 19 through 21, the front-surface-image[ ]={1, 2, 4}, the back-surface-image[ ]={0, 3, 0}, the front surface index=3, and the back surface index=3 are determined. When a duplex front-surface recording or a duplex back-surface recording is performed, the recording surface determination process shown in FIG. 22 is performed for all of the pages to be printed so as to obtain the above-described arrays and the number of elements for the arrays. Image data items are recorded on recording paper sheets by referencing the indices indicating the image data items from the top of the arrays if the recording order is a normal ascending order and by referencing from the bottom of the arrays if the recording order is the reverse order.

In the duplex printing operation of the first embodiment, the digital multi-function printing apparatus 100 performs the above-described operations. Accordingly, when a user submits a print job of code data operating in a manual duplex print mode to the digital multi-function printing apparatus 100, a user moves a printout whose one surface is printed to the manual feed tray 315 in the digital multi-function printing apparatus 100 after a simplex printing on the front or back surfaces of recording paper sheets. At that time, the user can operate the operation unit 150 of the digital multi-function printing apparatus 100 so as to immediately start printing on the other unprinted surfaces of the recording paper sheets.

After the user starts printing, the other unprinted surfaces of the recording paper sheets are automatically selected as printing surfaces. Accordingly, the user need not make troublesome print settings. Additionally, since image data items are automatically deleted from the documentation management module 900 when duplex printing is completed, the capacity shortage problem of the image storage unit 160 that unnecessary image data items cause does not occur. Furthermore, by explicitly specifying image data items prestored in the documentation management module 900 by a code data expanding and storing job, the image data items can be printed in a manual duplex print mode.

Thus, since it is determined on which surface of a recording paper sheet each image data item is to be printed, the image data items are printed on the appropriate pair of front surface and back surface of the recording paper sheet even when the job is divided into two simplex print jobs by the manual duplex printing function. Still furthermore, in the second print job, a problem of runout of recording paper and, conversely, remaining recording paper on the manual feed tray 315 can be eliminated.

Second Exemplary Embodiment

Figure 23:
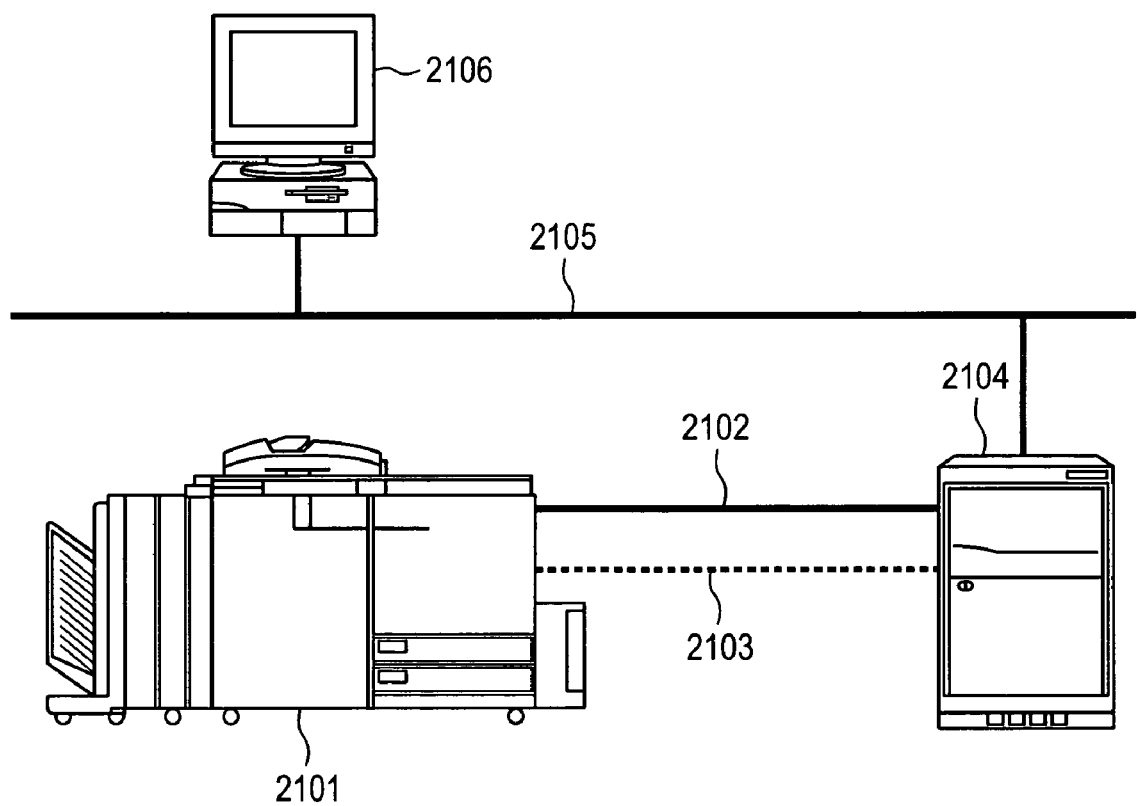
FIG. 23 illustrates an exemplary configuration of a printing system including a digital multi-function printing apparatus according to a second embodiment of the present invention.

Like the first embodiment, a printing apparatus according to a second embodiment is a digital multi-function printing apparatus. FIG. 23 illustrates the configuration of a printing system including the digital multi-function printing apparatus according to the second embodiment. The printing system includes a computer station and/or terminal 2106 and an external controller 2104, each of which is connected to an external network 2105, and a digital multi-function printing apparatus (MFP) 2101 connected to the external controller 2104. The digital multi-function printing apparatus 2101 is a color scanner/printer apparatus that can scan and print in full color. The digital multi-function printing apparatus 2101 is connected to the external controller 2104 via an internal network 2102 and a video cable 2103 for transferring image data. The external controller 2104 is connected to the computer station 2106 via the external network 2105.

Figure 24:
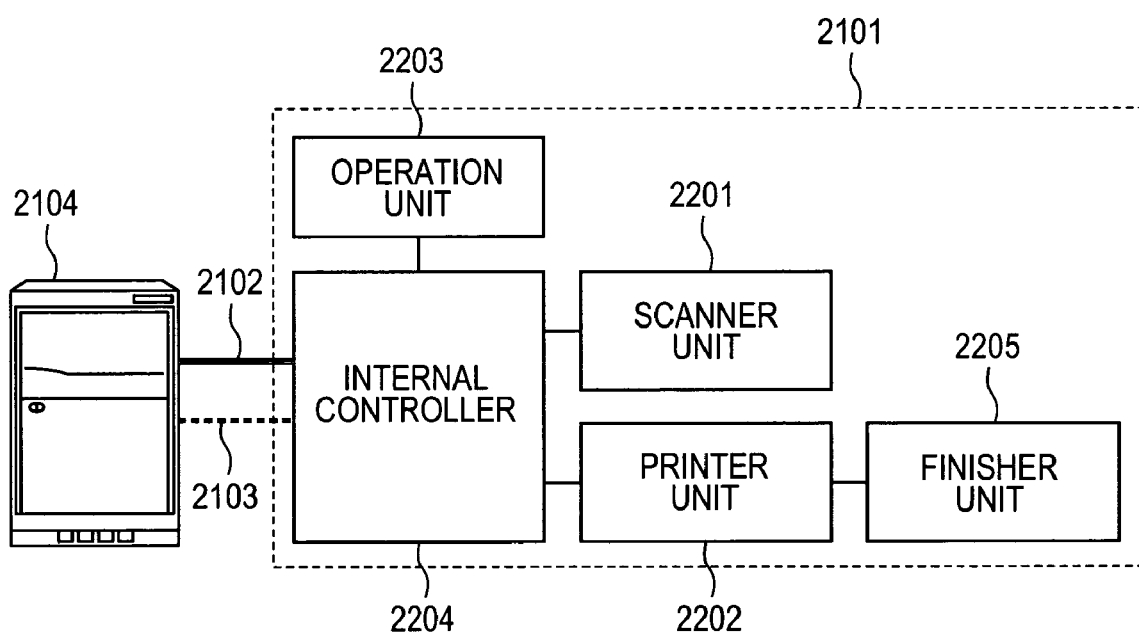
FIG. 24 schematically illustrates an exemplary architecture of a digital multi-function printing apparatus.

FIG. 24 schematically illustrates an exemplary architecture of the digital multi-function printing apparatus 2101. The digital multi-function printing apparatus 2101 includes a scanner unit 2201, a printer unit 2202, an operation unit 2203, an internal controller 2204, and a finisher unit 2205 so that the digital multi-function printing apparatus 2101 provides a copy function in which an image scanned by the scanner unit 2201 is printed by the printer unit 2202. The operation unit 2203 is used for a user to start the execution of a function provided by the digital multi-function printing apparatus 2101 and to set up the operation of the function. The operation unit 2203 is also used for the digital multi-function printing apparatus 2101 to inform the user of the state thereof. The finisher unit 2205 is connected to the printer unit 2202 and is used to provide post-print processing, such as stapling.

The internal controller 2204 performs overall control of the digital multi-function printing apparatus 2101 including operation control, status management, and image processing. The internal controller 2204 receives the state of the scanner unit 2201 and the printer unit 2202, and a user instruction via the operation unit 2203 and displays the state on the operation unit 2203. Additionally, the internal controller 2204 processes image data for the scanner unit 2201 and the printer unit 2202 and communicates data with the external controller 2104 connected to the internal network 2102.

According to the second embodiment, the printing system can provide a network print function. To execute network printing, the printing system transmits, as PDL data, a document created by the computer station 2106 to the external controller 2104 via the external network 2105. The external controller 2104 expands the PDL data received from the computer station 2106 into an image, converts the image to a data format printable for the digital multi-function printing apparatus 2101, and delivers the data to the digital multi-function printing apparatus 2101 via the video cable 2103. In addition, the external controller 2104 communicates the print operation settings and various types of information delivered via the video cable 2103 to the digital multi-function printing apparatus 2101 via the internal network 2102.

The external controller 2104 provides a function to expand the PDL data transmitted from the computer station 2106 into an image in the RGB color space and the CYMK color space using a profile for color space conversion. The video cable 2103 can transfer image data in the two types of color space, namely, the RGB color space and the CYMK color space.

Additionally, according to the second embodiment, the printing system can provide a network scan function to display an image scanned by the digital multi-function printing apparatus 2101 on the computer station 2106 and store the image. There are two types of network scan function depending on an operation type. One is a pull-scan function and the other is a push-scan function. In the pull-scan function, a user instructs the digital multi-function printing apparatus 2101 to scan an image via the computer station 2106. In contrast, in the push-scan function, a user instructs the digital multi-function printing apparatus 2101 to scan an image via the operation unit 2203 of the digital multi-function printing apparatus 2101.

In either pull-scan function or push-scan function, network scanning is performed as follows. That is, the digital multi-function printing apparatus 2101 scans the image of an original document placed on the scanner unit 2201 in response to a user instruction. The digital multi-function printing apparatus 2101 then converts the scanned image to a format suitable for the processing of the computer station 2106 and transmits the converted data to the computer station 2106 via the internal network 2102, the external controller 2104, and the external network 2105.

Additionally, since the printing system according to the second embodiment handles a full color image, the digital multi-function printing apparatus 2101 provides an image quality correction function to improve the image quality of the printer unit 2202. In the printing system, the digital multi-function printing apparatus 2101 corrects the color density and the computer station 2106 corrects the color of an electronic document at print time.

The manner in which the digital multi-function printing apparatus 2101 corrects the color will now be herein discussed below. First, the printer unit 2202 prints a predetermined image and the scanner unit 2201 scans the image. Thereafter, the digital multi-function printing apparatus 2101 sets up a density correction value used for the image processing in the internal controller 2204 while considering the characteristics of the printer unit 2202 so as to print a stable image. At that time, the predetermined image used for the printing is generated by the internal controller 2204. In contrast, the computer station 2106 corrects the color of an electronic document at print time in response to an instruction from the external controller 2104.

The external controller 2104 transmits a predetermined image to the digital multi-function printing apparatus 2101 so that the predetermined image is printed. In the digital multi-function printing apparatus 2101, the scanner unit 2201 scans the printed image. The external controller 2104 receives the scanned image from the digital multi-function printing apparatus 2101 to recognize the image characteristics of the digital multi-function printing apparatus 2101. The recognized image characteristics are stored and used by the external controller 2104 when the external controller 2104 expands PDL data from the computer station 2106 into an image.

[Exemplary Internal Controller Configuration]

Figure 25:
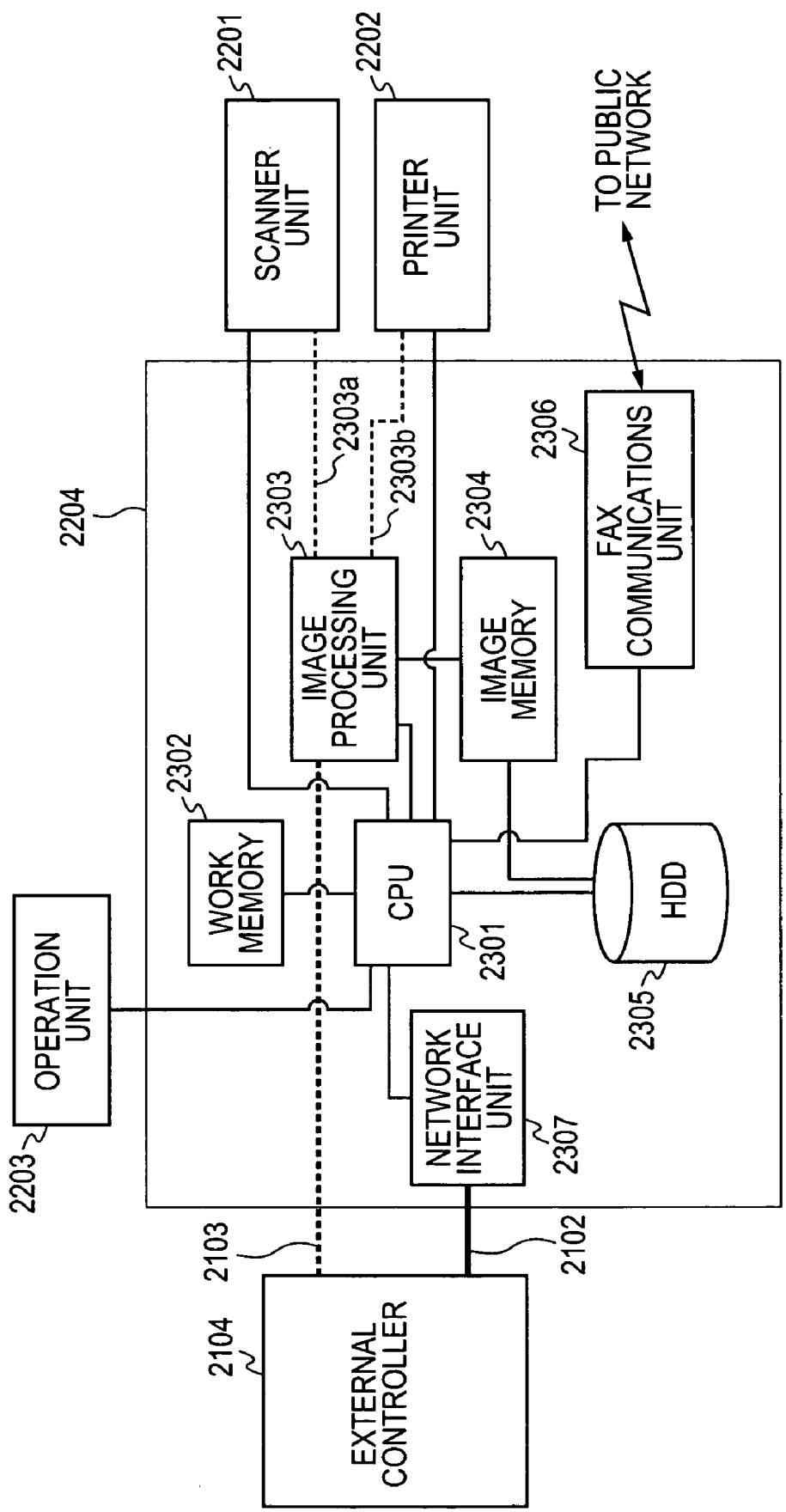
FIG. 25 illustrates an exemplary architecture of an internal controller.

FIG. 25 illustrates an exemplary configuration of the internal controller 2204. The internal controller 2204 includes a CPU 2301, a work memory 2302, an image processing unit 2303, and an image memory 2304. The internal controller 2204 further includes a high-capacity storage unit (hereinafter referred to as "HDD") 2305, a facsimile (FAX) communications unit 2306, and a network interface (I/F) unit 2307.

The image processing unit 2303 is connected to the scanner unit 2201 and the printer unit 2202 via an image signal lines 2303*a* and 2303*b*, respectively. The image processing unit 2303 is also connected to the external controller 2104 via the video cable 2103. Furthermore, the image processing unit 2303 is connected to the image memory 2304 and a facsimile communications unit 2306 via the CPU 2301. Image data from the scanner unit 2201 is stored in the image memory 2304 and the HDD 2305 via the image processing unit 2303 and is then delivered to the printer unit 2202 via the image memory 2304 and the image processing unit 2303 again. Similarly, image data from the external controller 2104 is input to the image processing unit 2303 via the video cable 2103. The facsimile communications unit 2306 can input and output image data for facsimile communications.

The digital multi-function printing apparatus 2101 provides a box function by using an image storing function onto the HDD 2305. In the box function, image data input from the scanner unit 2201 or image data input from the external controller 2104 via the video cable 2103 is not printed immediately, but is temporarily stored in the HDD 2305. When a user instructs a print or a facsimile communication from the operation unit 2203, the image data is printed or is transmitted via a facsimile communication. Additionally, image data stored for a plurality of users is shared by the users.

The digital multi-function printing apparatus 2101 further provides a file transfer function. In the file transfer function, image data stored in the HDD 2305 is converted to image data in a file format widely used for a computer station (e.g., JPEG). The image memory 2304 and the image processing unit 2303 perform this conversion. The converted file is transmitted to a desired computer station via the network interface unit 2307, the internal network 2102, the external controller 2104, and the external network 2105, and is used by the computer station.

The CPU 2301 operates in accordance with a program stored in the HDD 2305. The CPU 2301 controls each unit, such as the operation unit 2203 or the facsimile communications unit 2306, and communicates with the printer unit 2202 and the scanner unit 2201 in order to synchronize with image data transmission and reception. Similarly, the CPU 2301 accesses the network interface unit 2307 in order to communicate with the external controller 2104 via the internal network 2102.

The internal controller 2204 provides a remote control service. In the remote control service, a user can monitor the state of the digital multi-function printing apparatus 2101 and sets up the digital multi-function printing apparatus 2101 from the computer station 2106 via the internal network 2102 and the external controller 2104. Additionally, the user can read data stored in the HDD 2305 via a web service.

[Exemplary Operation Unit]

Figure 26:
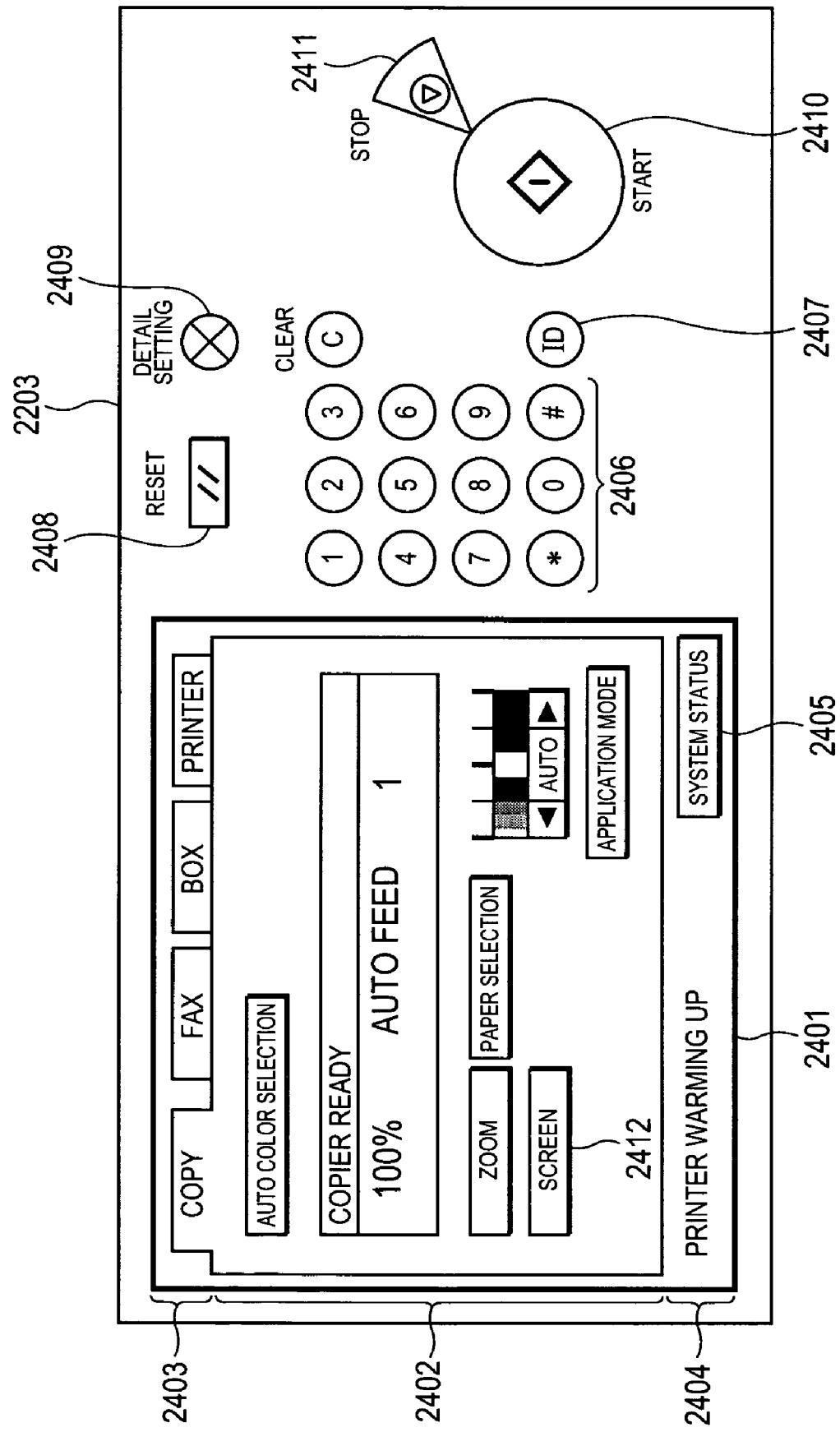
FIG. 26 illustrates the structure of an exemplary operation unit.

FIG. 26 illustrates the structure of the operation unit 2203. The operation unit 2203 includes display screen 2401 (e.g., a liquid crystal display (LCD) screen) to display the settings and the state of the digital multi-function printing apparatus 2101. In an example shown in FIG. 26, an operation setting screen 2402 displays a copy setting screen. In this copy setting screen, various settings at a copy time, such as zoom, feeder, and print copies setting, are displayed. By selecting a function key 2403, the operation setting screen 2402 is switched to a facsimile function screen or a print function screen from the external controller 2104.

A status message display section 2404 is provided in the lower left portion of the LCD display screen 2401, which displays the state of the digital multi-function printing apparatus 2101 and the status of functions currently not selected. A system status key 2405 is provided in the lower right portion of the LCD display screen 2401. The system status key 2405 is used to switch the screen to a screen that displays the details of the state of the digital multi-function printing apparatus 2101 and the status of functions currently not selected. A duplex key 2412 is a button used to switch the current screen to a duplex setting screen at a copy time.

A ten key 2406 for inputting a number setting is provided in the operation unit 2203 in addition to the LCD display screen 2401. Additionally, an ID key 2407 is provided to switch the current screen to a screen to input an ID for identifying a user when the user uses the copy and facsimile functions. A reset key 2408 is used to return the operation setting screen 2402 to a predetermined function. A detailed setting key 2409 is used to switch the current screen to a screen for setting up the detailed operation of the digital multi-function printing apparatus 2101 and setting up the network. A start key 2410 and stop key 2411 are used to start and stop the operation of each function, respectively.

[Exemplary Scanner Unit]

Figure 27:
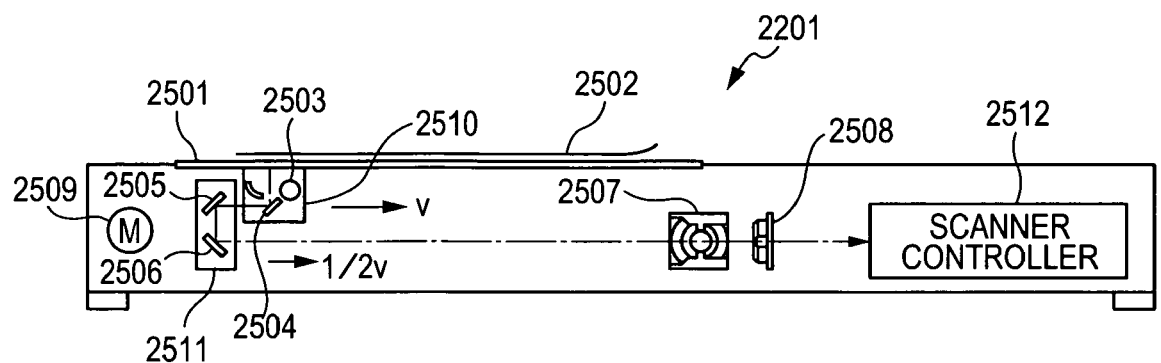
FIG. 27 illustrates the structure of an exemplary scanner unit.

FIG. 27 illustrates an exemplary structure of the scanner unit 2201. In the scanner unit 2201, an original document 2502 to be scanned is placed on a document glass 2501. The original document 2502 is illuminated with an illumination lamp 2503. Reflected light passes through mirrors 2504, 2505, and 2506, and forms an image on a CCD 2508 by a lens 2507. A first mirror unit 2510 includes the mirror 2504 and the illumination lamp 2503 and moves in the sub scanning direction at a speed of v. In contrast, a second mirror unit 2511 includes the mirrors 2505 and 2506 and moves in the sub scanning direction at a speed of (½)v. Thus, the entire surface of the original document 2502 is scanned.

The first mirror unit 2510 and the second mirror unit 2511 are driven by a motor 2509. The operations of the first mirror unit 2510 and the second mirror unit 2511 are controlled by a signal from a scanner controller 2512. The scanner controller 2512 controls the operations of the first mirror unit 2510 and the second mirror unit 2511 in accordance with an instruction from the internal controller 2204.

Figure 28:
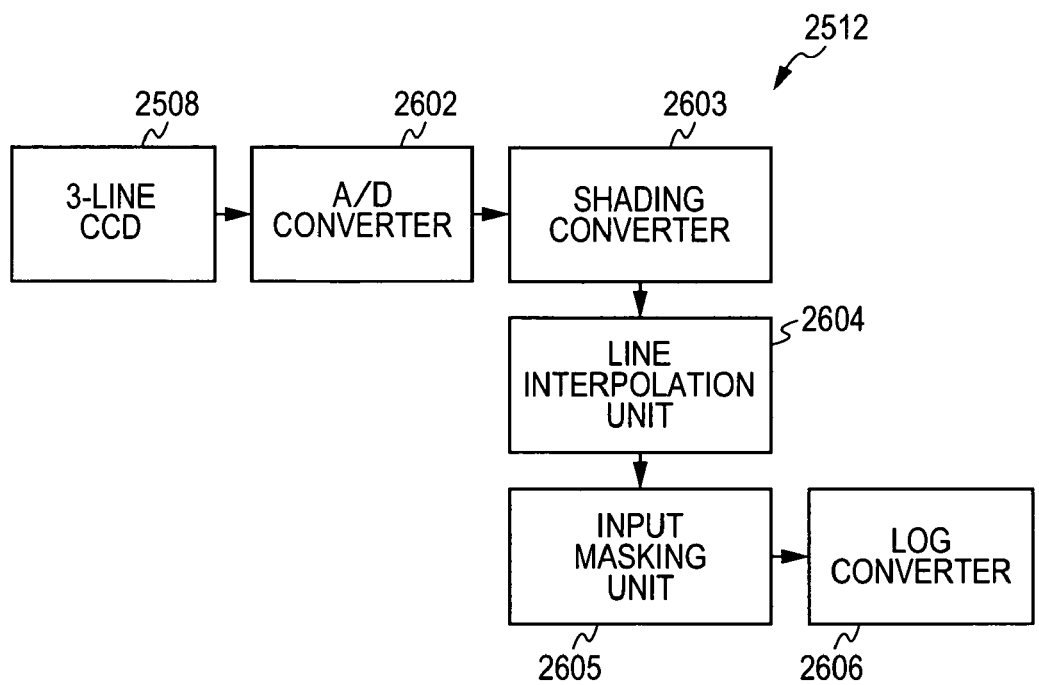
FIG. 28 illustrates a diagram representative of an exemplary image processing unit in a scanner controller.

FIG. 28 illustrates a diagram representative of an exemplary image processing unit in the scanner controller 2512. The image processing unit includes the CCD 2508, an analog-to-digital (A/D) converter 2602, a shading converter 2603, a line interpolation unit 2604, an input masking unit 2605, and a LOG converter 2606.

In the image processing unit, the CCD 2508 converts an input optical signal to an electric signal. The CCD 2508 is a color sensor of an RGB line. An RGB signal from the CCD 2508 is input to the A/D converter 2602. The A/D converter 2602 performs gain correction and offset correction on the RGB signal. The RGB signal is then converted to 8-bit digital image data R0, G0, and B0 for each color signal. Subsequently, the shading converter 2603 performs known correction on each color signal using a readout signal of a reference white board.

A line sensor for each color of the CCD 2508 is arranged at a predetermined distance. A line delay correction circuit (the line interpolation unit 2604) corrects a special shift in the sub scanning direction.

The input masking unit 2605 converts the readout color space, which is determined by the spectroscopy characteristics of an RGB filter in the CCD 2508, to a standard color space of NTSC. The input masking unit 2605 performs 3×3 matrix calculation on the input color signals (R0, G0, and B0) using a constant value specific to the CCD 2508 while considering the sensitivity of the CCD 2508 and the spectrum characteristics of the illumination lamp so as to convert the input color signals (R0, G0, and B0) to standard color signals (R, G, and B). In addition, a luminance/density converter (the LOG converter 2606) includes a look-up table (LUT) to convert a RGB luminance signal to image density signals C1, M1, and Y1. The converted signals are delivered to the internal controller 2204.

[Exemplary Printer Unit]

Figure 29:
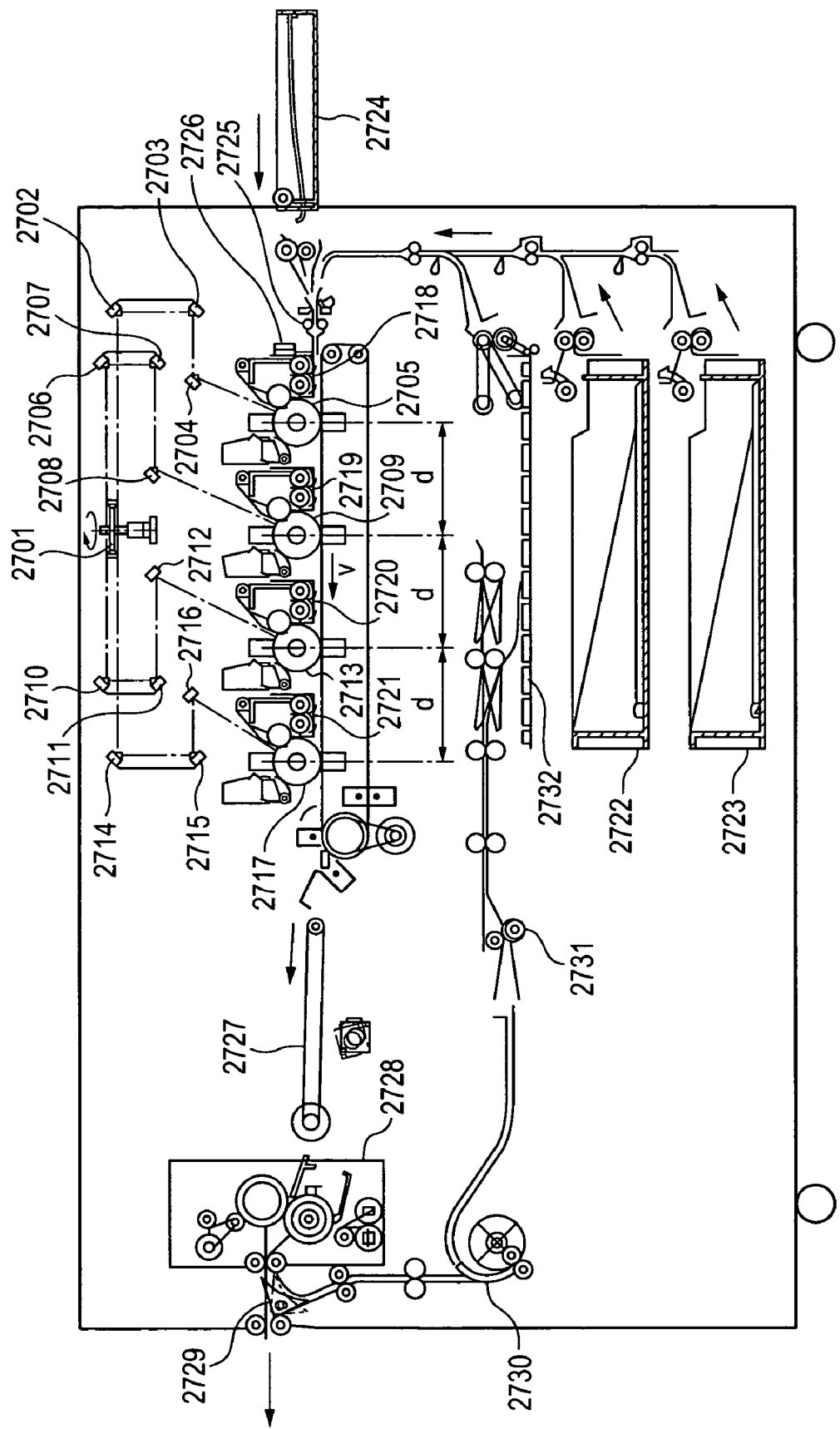
FIG. 29 illustrates the internal structure of an exemplary printer unit.

FIG. 29 illustrates the internal structure of an exemplary printer unit 2202. A semiconductor laser is driven by a semiconductor laser control unit. A polygon mirror 2701 receives four light beams emitted from the semiconductor laser. A first received light beam is reflected by mirrors 2702, 2703, and 2704 to scan a photoconductor drum 2705. A second received light beam is reflected by mirrors 2706, 2707, and 2708 to scan a photoconductor drum 2709. A third received light beam is reflected by mirrors 2710, 2711, and 2712 to scan a photoconductor drum 2713. A fourth received light beam is reflected by mirrors 2714, 2715, and 2716 to scan a photoconductor drum 2717.

A developer unit 2718 supplies yellow (Y) toner to form a yellow toner image on the photoconductor drum 2705 in response to the movement of the laser beam. A developer unit 2719 supplies magenta (M) toner to form a magenta toner image on the photoconductor drum 2709 in response to the movement of the laser beam. A developer unit 2720 supplies cyan (C) toner to form a cyan toner image on the photoconductor drum 2713 in response to the movement of the laser beam. A developer unit 2721 supplies black (B) toner to form a black toner image on the photoconductor drum 2717 in response to the movement of the laser beam. These toner images of four colors (Y, M, C, and K) are transferred to a recording paper sheet to obtain a full color output image.

A sheet fed from either one of sheet cassettes 2722 and 2723, and a manual feed tray 2724 passes through a registration roller 2725 and is transported by a transfer belt 2726 while being attracted. Toner images of four colors are developed on the photoconductor drums 2705, 2709, 2713, and 2717 in synchronization with the sheet feed timing and are transferred onto the sheet as the sheet is transported.

The sheet on which the toner of four colors is transferred is separated from the transfer belt 2726 and is further transported by a transport belt 2727 to a fuser unit 2728, where the toner is fixed to the sheet. The sheet passes through the fuser unit 2728, a flapper 2729, a duplex inversion roller 2730, a duplex tray transport roller 2731, and a duplex tray 2732 so as to be output in a predetermined manner. The print operation including this output operation is described in detail below. Additionally, the four photoconductor drums 2705, 2709, 2713, and 2717 are evenly spaced by distance d from each other. The sheet is transported by the transfer belt 2726 at a constant speed v. The semiconductor laser is driven in synchronization with the transport timing to emit the laser beams to the polygon mirror 2701.

[Exemplary Finisher Unit]

Figure 30:
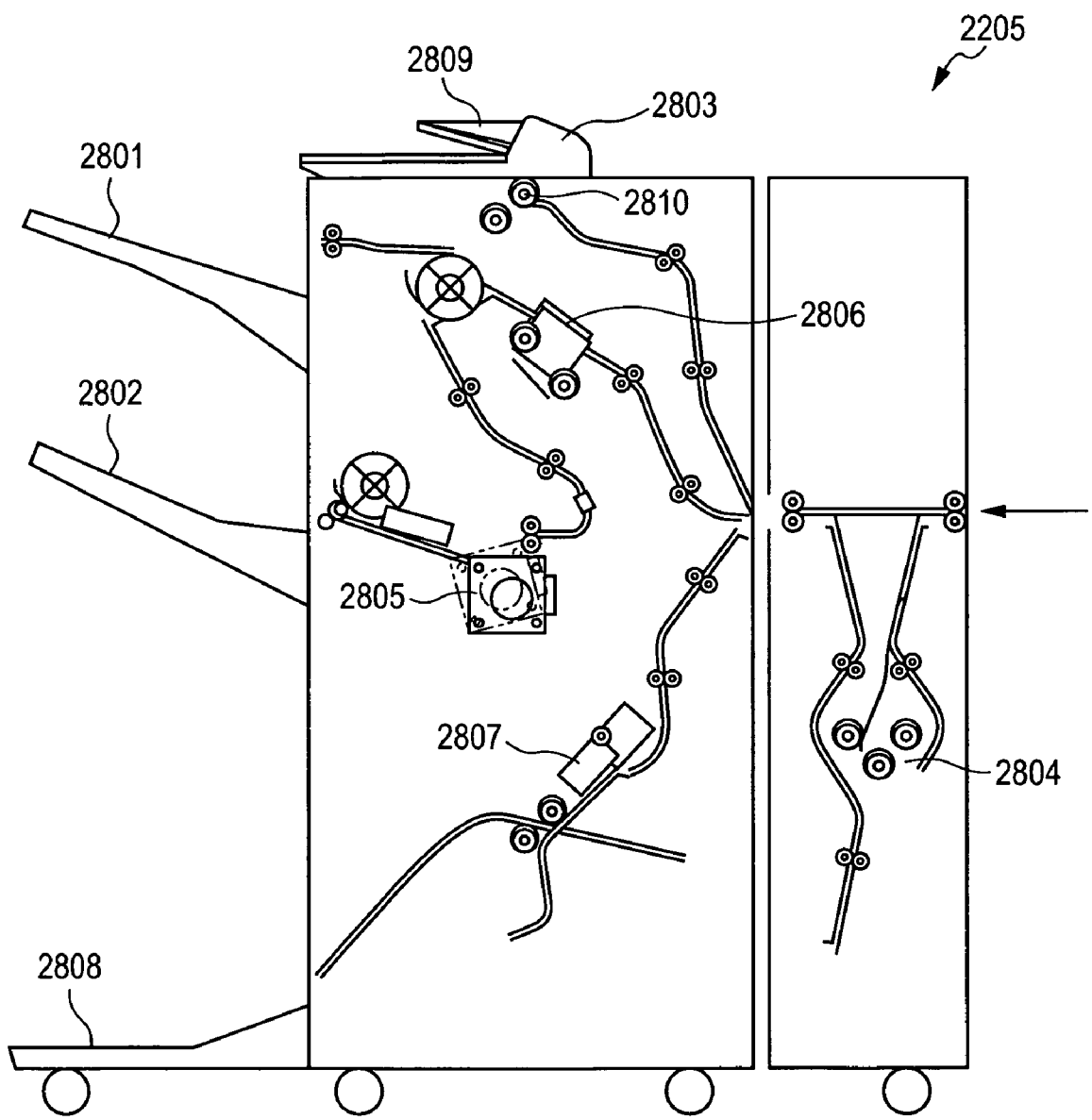
FIG. 30 illustrates the internal structure of an exemplary finisher unit.

FIG. 30 illustrates an exemplary internal structure of the finisher unit 2205. The sheet output from the fuser unit 2728 of the printer unit 2202 is input to the finisher unit 2205. The finisher unit 2205 includes a sample tray 2801 and a stack tray 2802, which are switched depending on the type of job and the number of output sheets.

To sort the output sheets, two types of sorting methods are provided: a bin sort method and a shift sort method. In the bin sort method, the finisher unit 2205 includes a plurality of bins. An output sheet is sorted into each bin. In the shift sort method, by using an electronic sort function, a bin or a tray is shifted in the fore and aft direction for each job so that the output sheets are sorted.

The electronic sort function is referred to as "collating". If the digital multi-function printing apparatus 2101 includes a large-capacity buffer memory, the output pages are once buffered and are output in a different order in which the pages are buffered (i.e., collating function). Thus, the electronic sort function can be provided. Additionally, a group sort function is provided in which the output pages are sorted on a page basis, whereas normal sorting is performed on a job basis.

Furthermore, when a sheet is output onto the stack tray 2802, the sheets are stored on a job basis immediately before being output onto the stack tray 2802 so that the sheets can be fastened by a stapler 2805. Still furthermore, a Z-folding device 2804 for folding the sheet in a Z shape and a puncher 2806 for punching two or three holes in the sheets for filing are provided prior to the sample tray 2801 and the stack tray 2802 to finish the sheets depending on the type of job.

A saddle stitcher 2807 binds the center portion of the sheets at two positions, and then folds the sheets in half by nipping the center portions thereof with rollers, thereby performing processing for creating booklets, such as magazines or brochures. The sheets bound by the saddle stitcher 2807 are output to a booklet tray 2808. In addition, although not shown in this embodiment, the sheets may be fastened by gluing or the edges of the sheets opposite to the binding side may be trimmed after binding the sheets.

Also, an inserter 2803 feeds a sheet set on a tray 2809 to one of the sample tray 2801, the stack tray 2802, and the booklet tray 2808, without passing through the printer. This allows the sheet set on the inserter 2803 to be inserted between sheets delivered to the finisher 2205. The user sets sheets on the tray 2809 of the inserter 2803 face up, and the sheets are sequentially fed from the top by a pick-up roller 2810. Accordingly, the sheets from the inserter 2803 are directly transported to the sample tray 2801 and the stack tray 2802 and are output face down. When these sheets are fed to the saddle stitcher 2807, the sheets are delivered to the puncher 2806 first and subsequently are switched back, thereby facing the same way.

[Exemplary External Controller]

Figure 31:
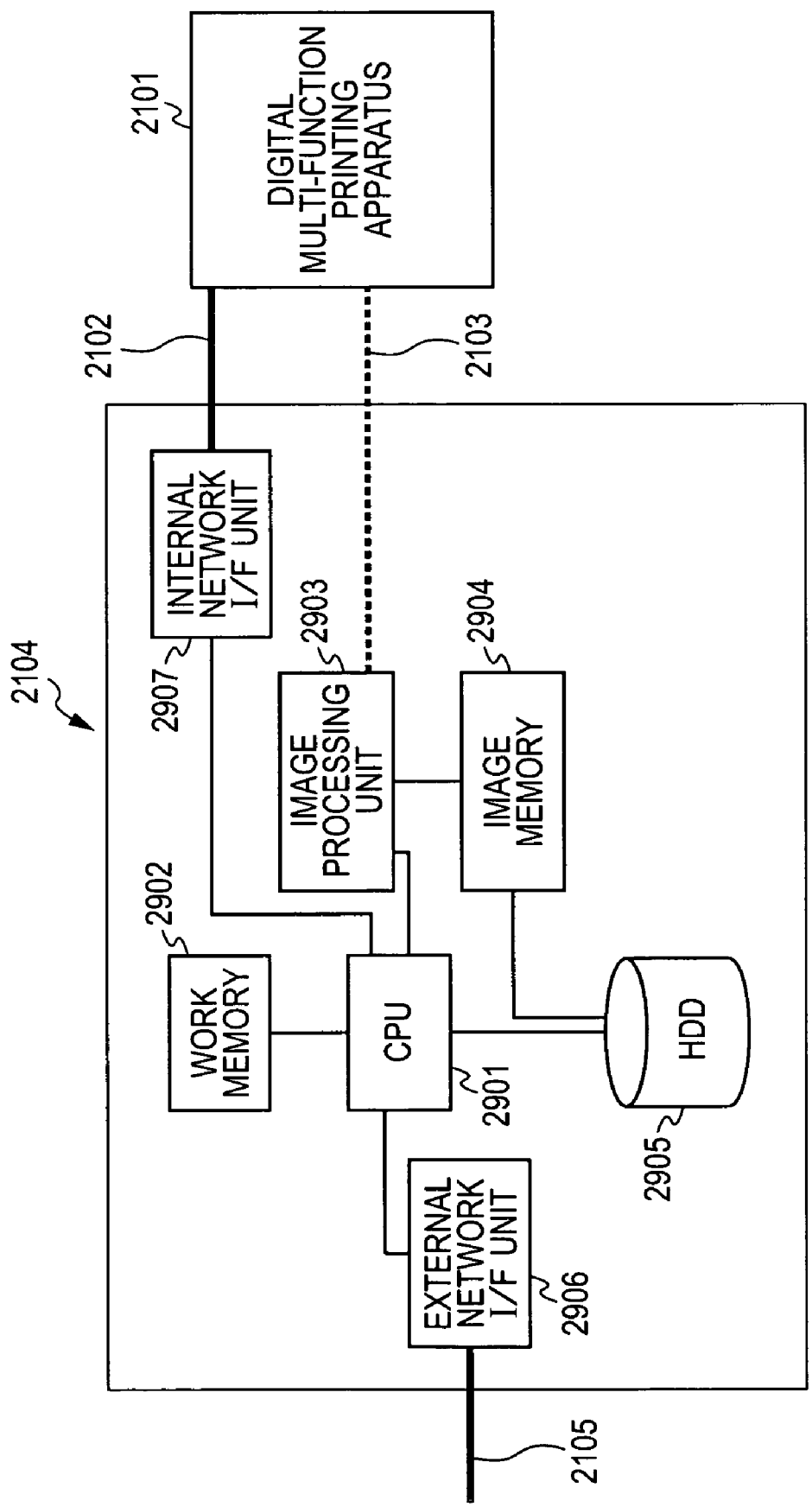
FIG. 31 illustrates the configuration of an exemplary external controller.

FIG. 31 illustrates an exemplary configuration of the external controller 2104. The external controller 2104 includes a CPU 2901, a work memory 2902, an image processing unit 2903, an image memory 2904, a high-capacity storage unit (hereinafter referred to as "HDD") 2905, an external network I/F unit 2906, and an internal network I/F unit 2907.

The image processing unit 2903 is connected to the digital multi-function printing apparatus 2101 via the video cable 2103. The image processing unit 2903 is also connected to the image memory 2904. The external network I/F unit 2906 is connected to the external network 2105. The internal network I/F unit 2907 is connected to the internal network 2102. The CPU 2901 operates in accordance with a program stored in the HDD 2905 to communicate with the computer station 2106 via the external network I/F unit 2906. The CPU 2901 also communicates with the digital multi-function printing apparatus 2101 via the internal network I/F unit 2907 to execute a predetermined process.

To print a document file of the computer station 2106, the external controller 2104 receives PDL data transferred from the computer station 2106 via the external network 2105. The received PDL data is stored in the HDD 2905 via the external network I/F unit 2906. The PDL data stored in the HDD 2905 is expanded into an image in the image memory 2904 in accordance with the program executed by the CPU 2901.

Additionally, the external controller 2104 transmits information, such as the size of the image expanded in the image memory 2904, and print settings of the digital multi-function printing apparatus 2101 contained in the PDL data via the internal network I/F unit 2907 and the internal network 2102. Simultaneously, the external controller 2104 transmits the expanded image to the digital multi-function printing apparatus 2101 via the video cable 2103 in order to print the image.

[Exemplary Automatic Duplex Printing]

Figure 32:
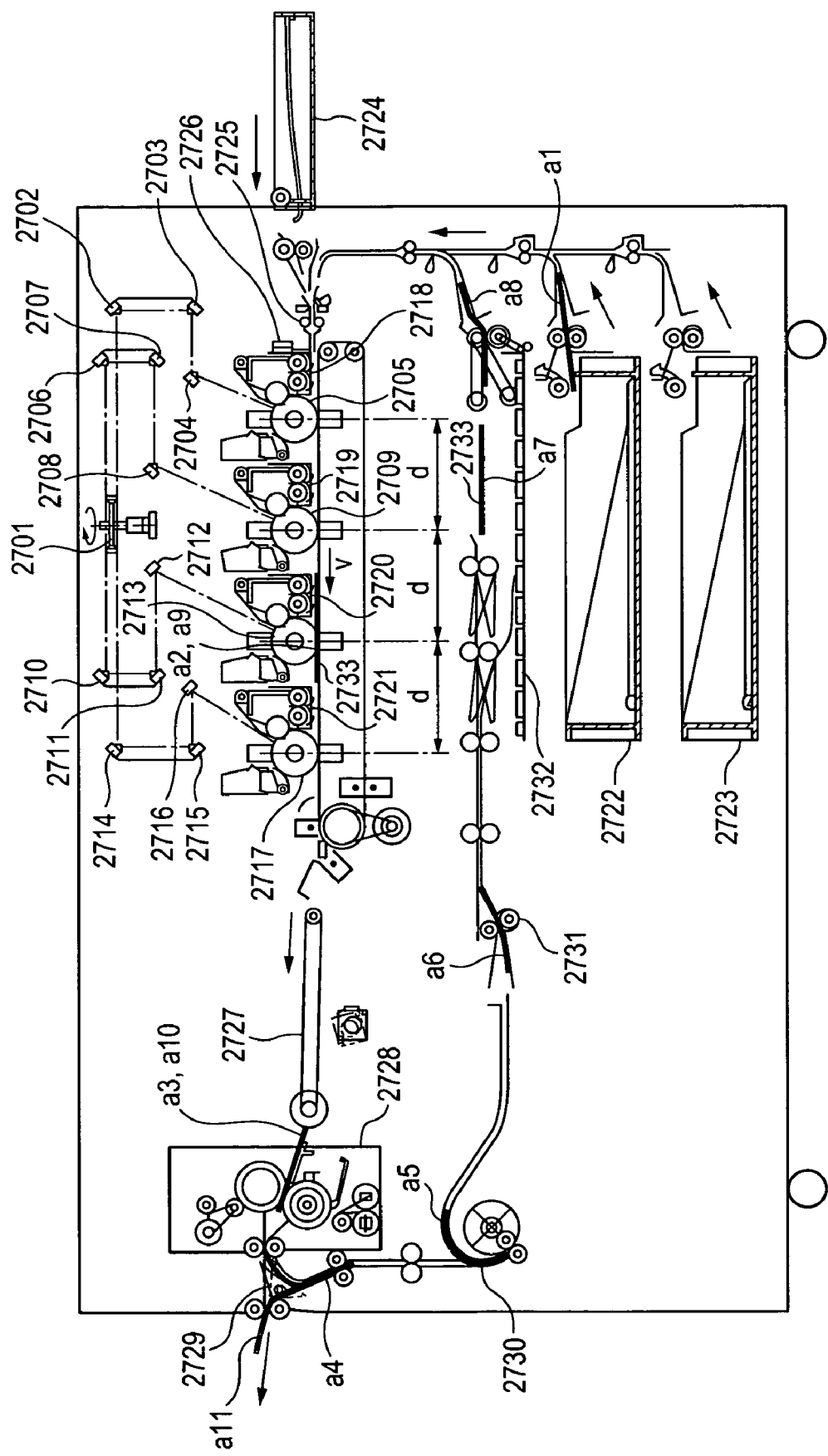
FIG. 32 illustrates the movement of a sheet when automatic duplex printing is performed.

FIG. 32 illustrates exemplary movement of a sheet when automatic duplex printing is performed. As used herein, the term "automatic duplex printing" refers to printing in which a sheet is circulated in the printer unit 2202 to form images on both surfaces of the sheet. In automatic duplex printing, a sheet 2733 is fed from either one of the sheet cassettes 2722 and 2723, and the manual feed tray 2724 (see state a1). In FIG. 32, the sheet 2733 is fed from the sheet cassette 2722 for exemplary purposes. Toner of four colors developed on the photoconductor drums 2705, 2709, 2713, and 2717 is transferred on a "surface A" of the sheet 2733 (see state a2). The toner is fixed on the surface A of the sheet 2733 by the fuser unit 2728 to form an image (see state a3).

Here, the surface A is a surface on which an image is formed when the sheet 2733 is fed from either one of the sheet cassettes 2722 and 2723, and the manual feed tray 2724. When a sheet is loaded on the sheet cassette 2722 or 2723, the lower side of the sheet becomes the surface A of the sheet. In contrast, when a sheet is loaded on the manual feed tray 2724, the upper side of the sheet becomes the surface A of the sheet. The surface of the sheet opposed to the surface A is referred to as a "surface B".

The sheet 2733 passed through the fuser unit 2728 is led downwards by the flapper 2729 (see state a4) and is switched back by the duplex inversion roller 2730 (see state a5). The sheet 2733 then passes through the duplex tray transport roller 2731 (see state a6) and is transported to the duplex tray 2732 (see state a7). Thereafter, the sheet 2733 is fed from the duplex tray 2732 (see state a8). Subsequently, an image is formed in the same manner as described above (see states a9 and a10). At that time, since the sheet 2733 was switched back by the duplex inversion roller 2730, the next image is formed on the surface B.

The sheet 2733 having the surfaces A and B on which images are formed is temporarily led downwards by the flapper 2729. When the trailing edge of the sheet 2733 passes by the flapper 2729, the sheet 2733 is switched back and is output (see state a11). Thus, automatic duplex recording is realized.

[Exemplary Face-down Output]

Figure 33:
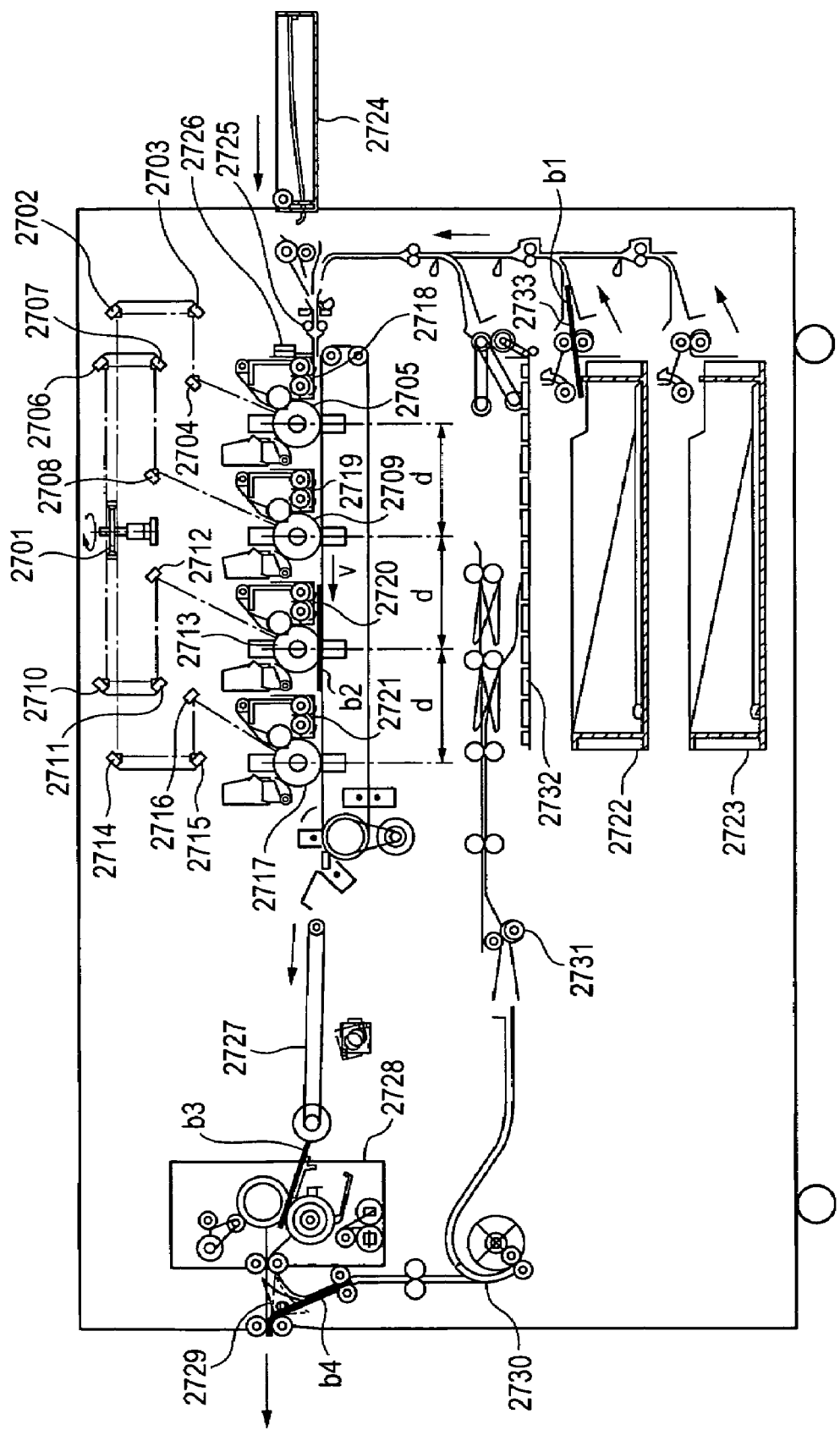
FIG. 33 illustrates the movement of a sheet when the sheet is output face down.

FIG. 33 illustrates the movement of a sheet when the sheet is output face down. As used herein, the term "face-down output" refers to an output method in which an image is formed on only one side of a sheet and the sheet is output with the image-formed side downwards. In the face-down output method, the sheet 2733 is fed from either one of the sheet cassettes 2722 and 2723, and the manual feed tray 2724 (see state b1). In FIG. 33, the sheet 2733 is fed from the sheet cassette 2722.

Toner of four colors developed on the photoconductor drums 2705, 2709, 2713, and 2717 is transferred on a surface A of the sheet 2733 (see state b2). The toner is fixed on the surface A of the sheet 2733 by the fuser unit 2728 to form an image (see state b3). The sheet 2733 having the surface A on which an image is formed is temporarily led downwards by the flapper 2729. When the trailing edge of the sheet 2733 passes by the flapper 2729, the sheet 2733 is switched back and is output (see state b4). Thus, face-down output is realized.

[Exemplary Face-up Output]

Figure 34:
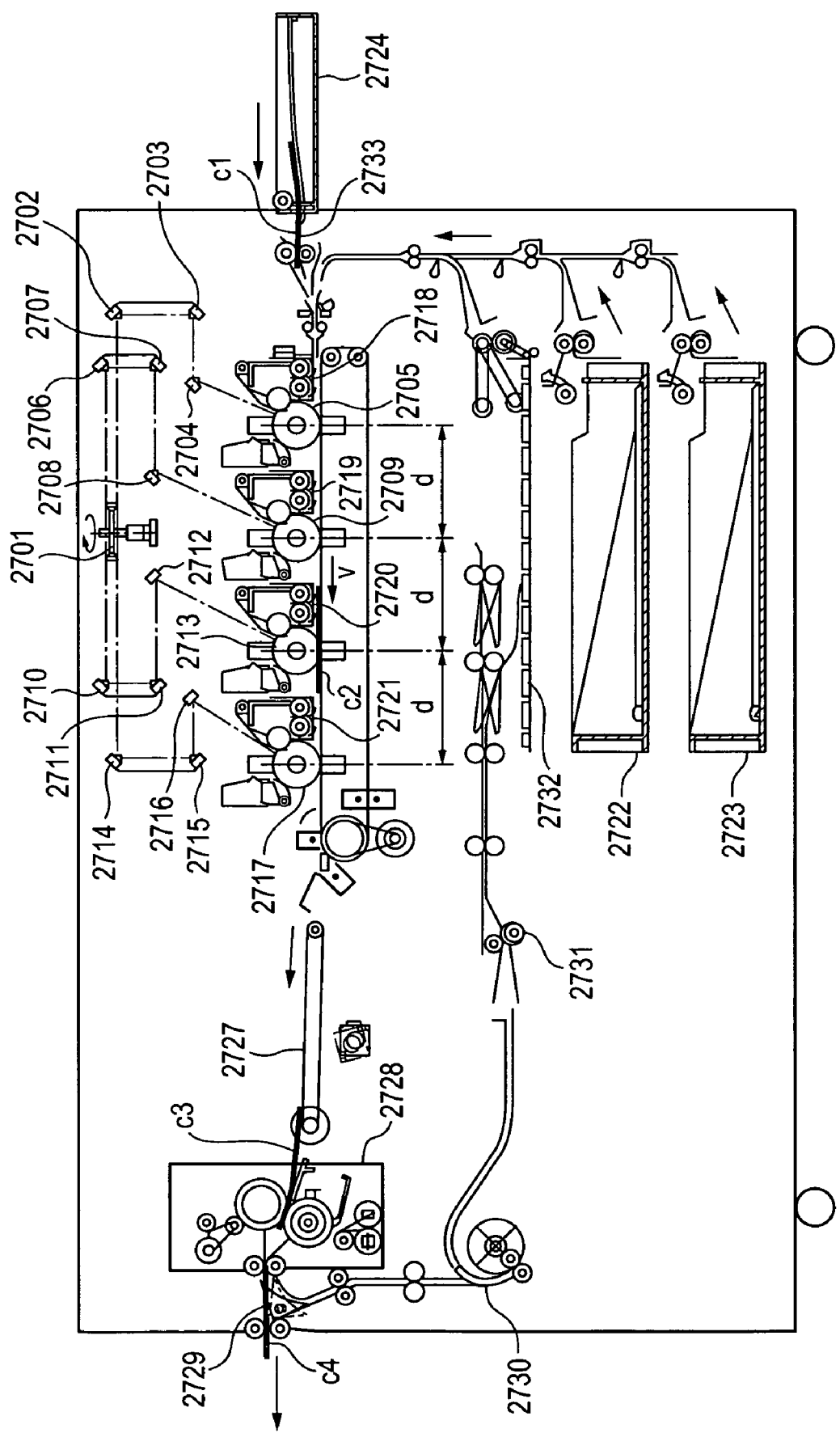
FIG. 34 illustrates the movement of a sheet when the sheet is output face up.

FIG. 34 illustrates the movement of a sheet when the sheet is output face up. As used herein, the term "face-up output" refers to an output method in which an image is formed on one surface of a sheet and the sheet is output with the image-formed side upwards. In the face-up output method, the sheet 2733 is fed from either one of the sheet cassettes 2722 and 2723, and the manual feed tray 2724 (see state c1). In FIG. 34, the sheet 2733 is fed from the manual feed tray 2724.

Toner of four colors developed on the photoconductor drums 2705, 2709, 2713, and 2717 is transferred on a surface A of the sheet 2733 (see state c2). The toner is fixed on the surface A of the sheet 2733 by the fuser unit 2728 to form an image (see state c3). Unlike the duplex printing and the face-down output method, the sheet 2733 having the surface A on which an image is formed is directly output without being temporarily led downwards by the flapper 2729 (see state c4). Thus, face-up output is realized. Since a sheet is directly output without being led downwards by the flapper 2729, the face-up output is employed when an image is formed on a sheet that is not easily curved, such as a thick paper sheet.

In the configuration of the second embodiment, if a sheet is fed from the sheet cassette 2722 or 2723, the sheet is curved. Therefore, desired sheets are loaded on the manual feed tray 2724 and the face-up output is selected. The face-up output is suitable for forming an image on a sheet that is not easily curved, such as a thick paper sheet.

Additionally, to form images on both sides of a sheet that is not easily curved, such as a thick paper sheet, an image is formed on a surface A of the sheet first using the face-up output method. Subsequently, the sheet is placed on the manual feed tray 2724 with the surface A downwards and the face-up output is performed. Thus, the images can be formed on both sides of the sheet. By performing face-up output twice while a user places the sheet on the tray after the first face-up output, images are formed on both sides of the sheet. This printing method is referred to as "manual duplex printing".

[Exemplary Printer Driver]

Figure 35:
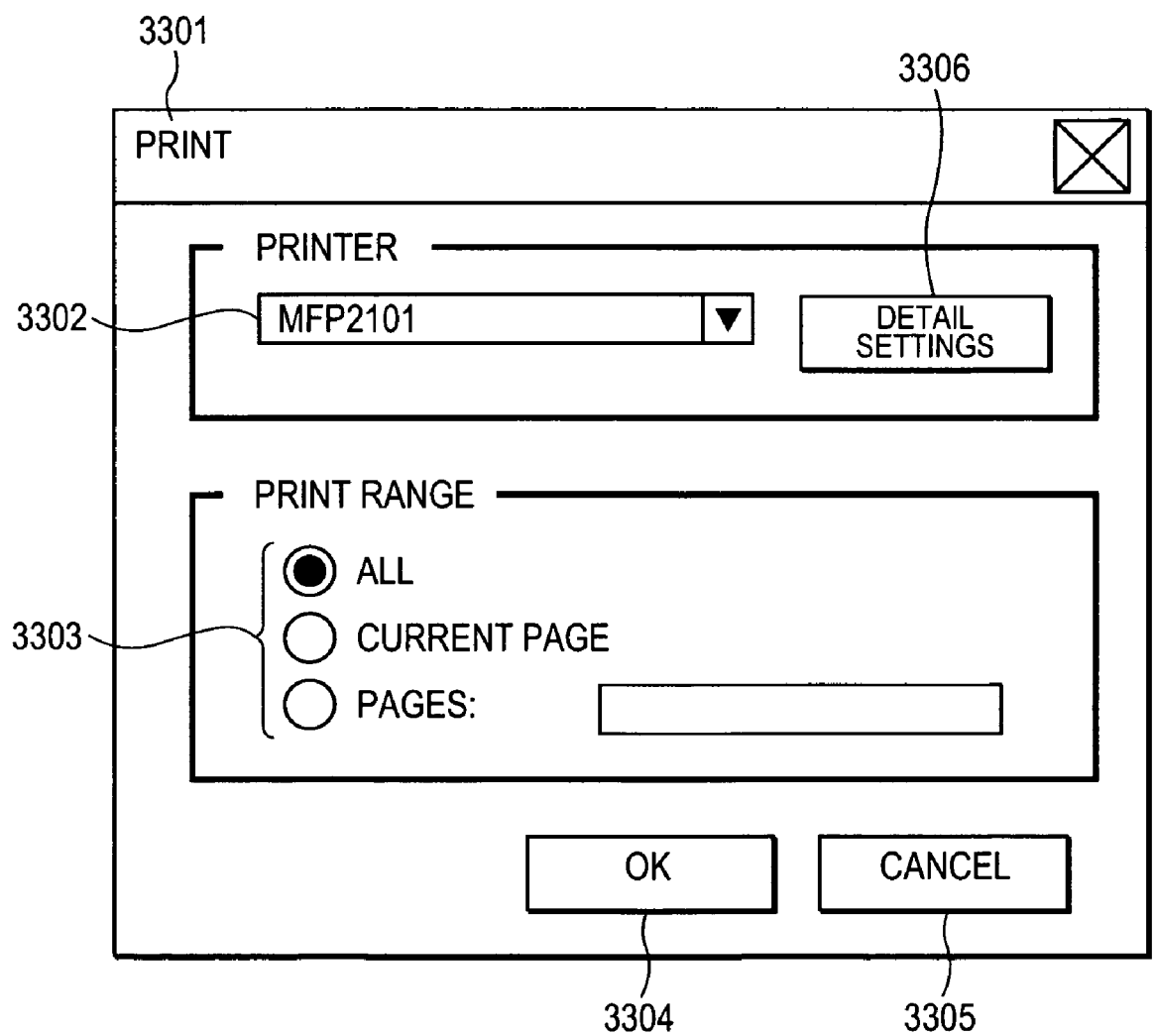
FIG. 35 illustrates an exemplary printer driver screen displayed when a document created by a computer station is printed.

FIG. 35 illustrates an exemplary printer driver screen displayed when a document created by the computer station 2106 is printed. In a printer driver screen 3301, setting items 3302 of a printer selected as an output destination are displayed. The setting items 3302 are in the form of pull-down menus. From this menu, a different printer can be selected. In this example, the digital multi-function printing apparatus 2101 is selected as an output destination.

Additionally, in a print rage setting field 3303 for setting up the print range of a document, it can be determined whether all pages of the document are printed or some selected pages of the document are printed. In the printer driver screen 3301, an OK key 3304 and a cancel key 3305 are provided. If the OK key 3304 is pressed, the pages of the document selected in the print rage setting field 3303 are converted to PDL data. The converted PDL data is delivered to the external controller 2104 connected to the digital multi-function printing apparatus 2101 along with detailed print settings. In contrast, if the cancel key 3305 is pressed, the pages of the document are not converted to PDL data, and therefore, no PDL data is delivered to the external controller 2104. The printer driver screen 3301 is then closed.

Figure 36:
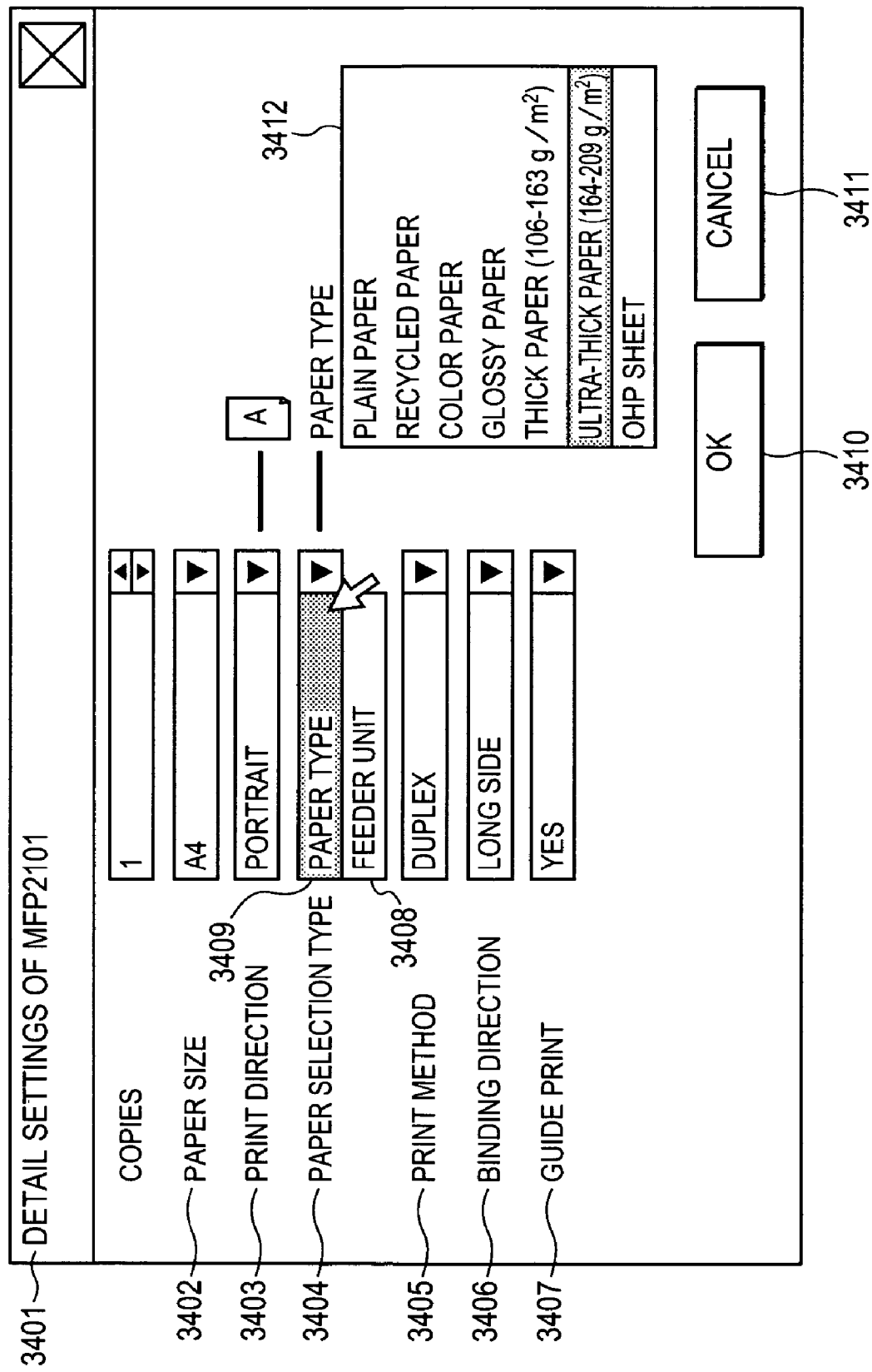
FIG. 36 illustrates an exemplary print detail setting screen.

Additionally, in the printer driver screen 3301, a detail settings key 3306 is provided. When the detail settings key 3306 is pressed, a print detail settings screen 3401 appears. FIG. 36 illustrates the print detail settings screen 3401. The print detail settings screen 3401 in this example is a screen for setting the digital multi-function printing apparatus 2101. The print detail settings screen 3401 includes a paper size setting field 3402, a print direction setting field 3403 for selecting a direction of an image with respect to a print sheet, and a paper selection type setting field 3404. The print detail settings screen 3401 also includes a print method selection field 3405 for selecting one of simplex and duplex printing, a binding direction selection field 3406 for setting a binding direction in a duplex mode, and a guide print setting field 3407 used at manual duplex printing, which is described below.

In the paper selection type setting field 3404, one of feeder unit selection 3408 for selecting a feeder unit and paper type selection 3409 can be set. In the feeder unit selection 3408, one of the sheet cassettes 2722 and 2723 and the manual feed tray 2724 of the digital multi-function printing apparatus 2101 can be selected. In FIG. 36, the paper type selection 3409 is selected. In a paper type selection field 3412, the paper types that can be set for the digital multi-function printing apparatus 2101 are displayed. In the binding direction selection field 3406, one of two types of binding is set. The first one is a long-side binding in which the directions of images on the front and back surfaces coincide when the sheet is rotated about a long side of the sheet. The second one is a short-side binding in which the directions of images on the front and back surfaces coincide when the sheet is rotated about a short side of the sheet.

A user selects desired setting in the print detail settings screen 3401 and presses an OK key 3410. The print detail settings screen 3401 is closed and the display returns to the printer driver screen 3301. At the same time, the settings are held by the computer station 2106. In contrast, if the user presses a cancel key 3411, the display also returns to the printer driver screen 3301. However, the settings are not held by the computer station 2106.

Thus, by performing detailed print setting in the print detail settings screen 3401 and by operating the printer driver screen 3301, PDL data, together with the detailed print settings, are transmitted to the external controller 2104 connected to the digital multi-function printing apparatus 2101.

[Exemplary Print Status Screen]

Figure 37:
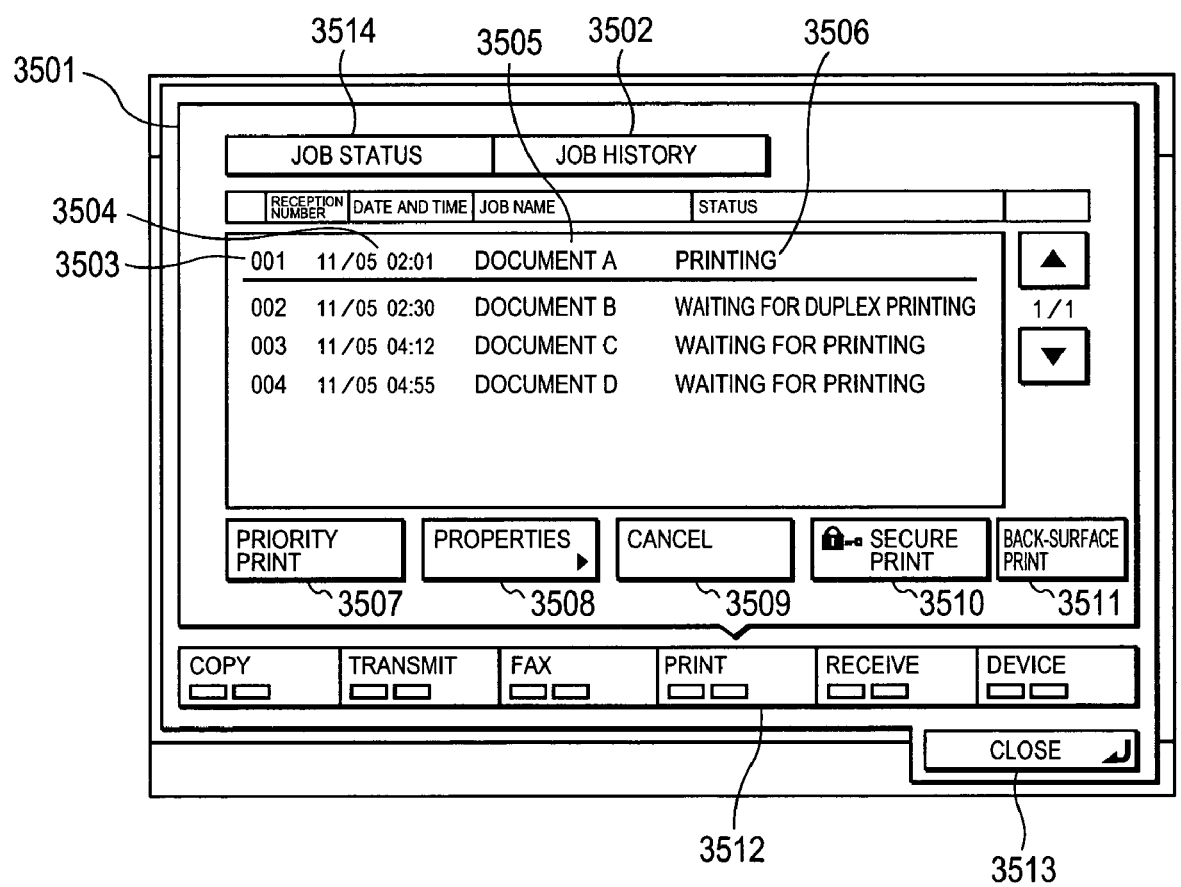
FIG. 37 illustrates an exemplary print status screen.

FIG. 37 illustrates an exemplary print status screen 3501. A print status screen 3501 is displayed when the system status key 2405 in the LCD display screen 2401 of the operation unit 2203 is pressed. A job status key 3514 is provided to display the status of the jobs. While a job history key 3502 is provided to display the history of jobs. A reception number field 3503 represents a job number for identifying a job. The job number is assigned to each print job by the internal controller 2204 of the digital multi-function printing apparatus 2101. A date and time field 3504 represents a date and time when the internal controller 2204 of the digital multi-function printing apparatus 2101 receives the job. A job type and name field 3505 represents a job type (e.g., copy and PDL print) and the job name if the job (e.g., PDL print job) has a name. A status field 3506 represents the job status in the digital multi-function printing apparatus 2101.

Additionally, the print status screen 3501 provides a priority print key 3507 for designating printing priorities with respect to each job. A property key 3508 is provided for setting printing properties. A cancel key 3509 is provided for canceling a specified job. A secure print key 3510 is provided for setting security printing features. A back-surface print key 3511 for starting printing on the back surfaces of sheets. The operation of the back-surface print key 3511 is described in more detail later in the specification. Additionally, activity indicators 3512 (copy, transmit, fax, print, receive, and device) are provided. Also, a close key 3513 is used to close the print status screen 3501 and to return to the previous screen of the print status screen 3501.

[Exemplary Documentation Management Module]

Figure 38:
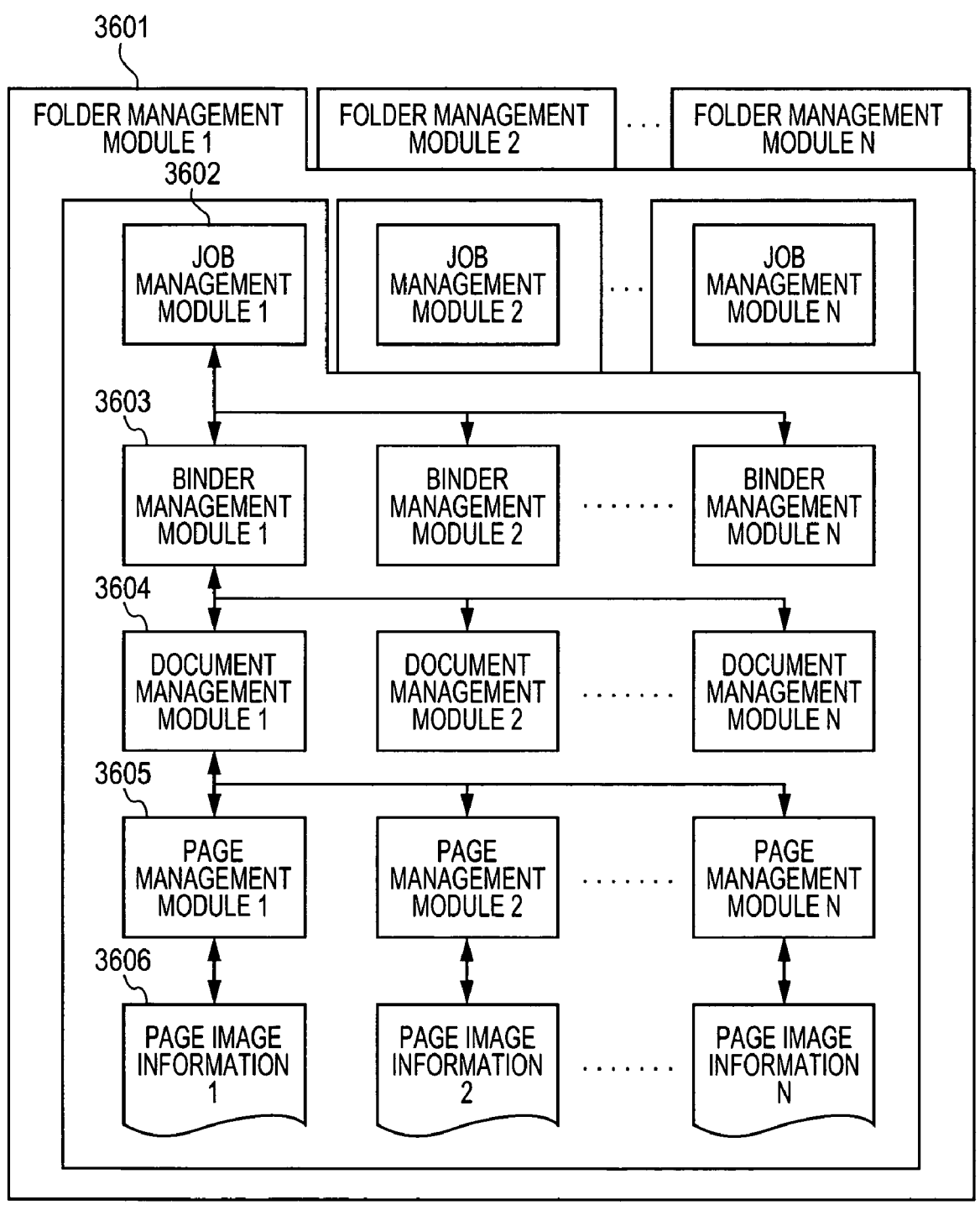
FIG. 38 illustrates a management structure of an exemplary documentation management module for storing a document.

FIG. 38 illustrates an exemplary management structure of a documentation management module for storing a document. The documentation management module includes a management section and image information about each page of a document. A management section includes a folder management module 3601, a job management module 3602, a binder management module 3603, a document management module 3604, and a page management module 3605.

The documentation management module is composed of one or more folder management modules. The documentation management module stores management information for managing the folder management modules. The folder management module 3601 is composed of one or more job management modules. The folder management module 3601 stores setting information for setting the job management modules. The job management module 3602 is composed of one or more binder management modules. The job management module 3602 stores setting information for setting the binder management modules. The binder management module 3603 is composed of one or more document management modules. The binder management module 3603 stores setting information for setting the document management modules. The document management module 3604 is composed of one or more page management modules. The document management module 3604 stores setting information for setting the page management modules. Each piece of setting information includes attribute values (parameters) required for processing the job.

The documentation management module also stores page image information 3606 about each page associated with the page management module 3605. The page image information 3606 is image data for one page scanned by a scanner, image data for one page of PDL data transmitted from a host computer, or image data for one page received by a facsimile (FAX). This image data may be image data compressed by a compression/decompression unit or may be raw image data without being compressed.

[Exemplary Print Operation]

Figure 39:
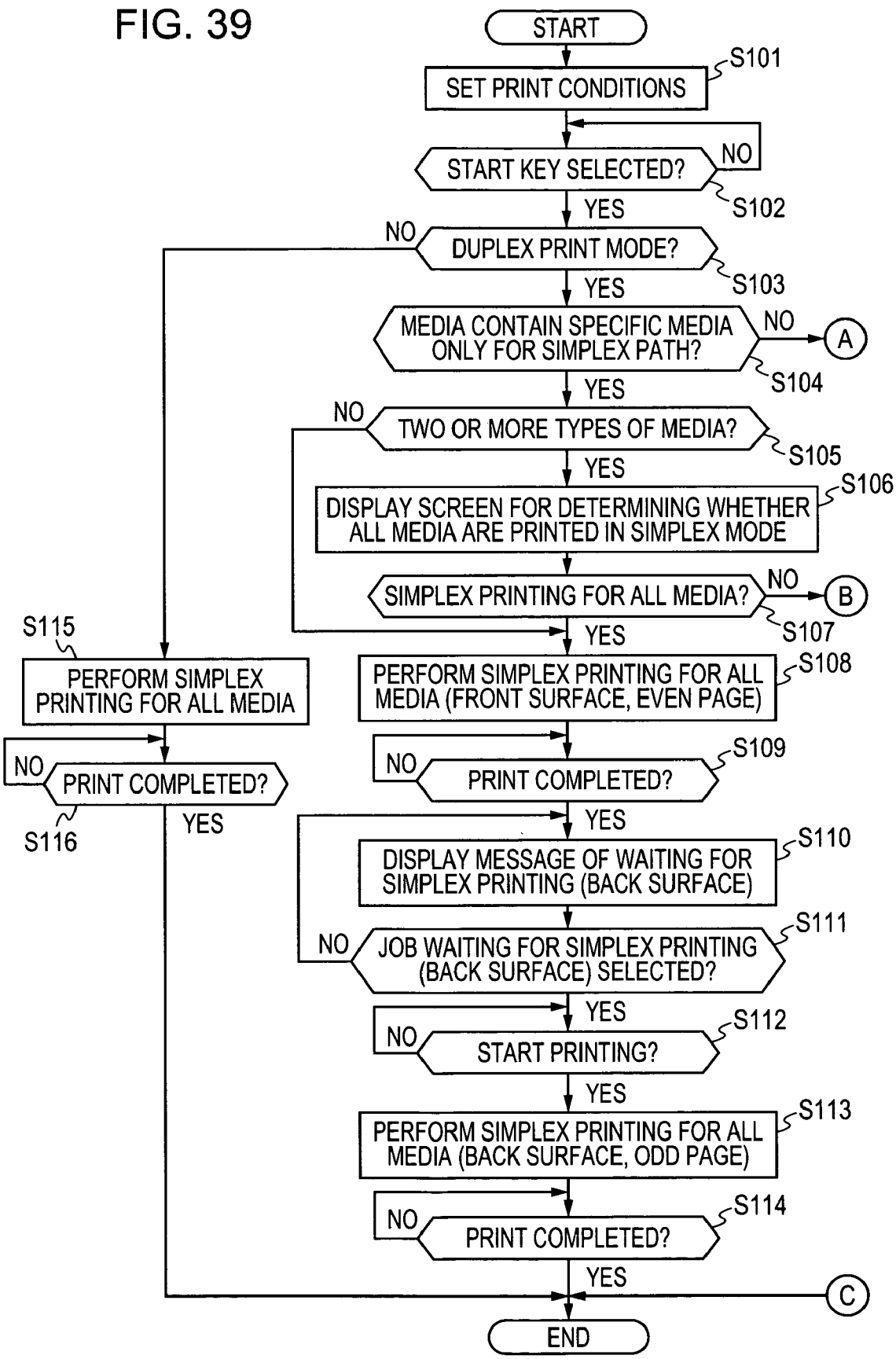
FIG. 39 illustrates a flow chart of an exemplary procedure of print operation.
Figure 40:
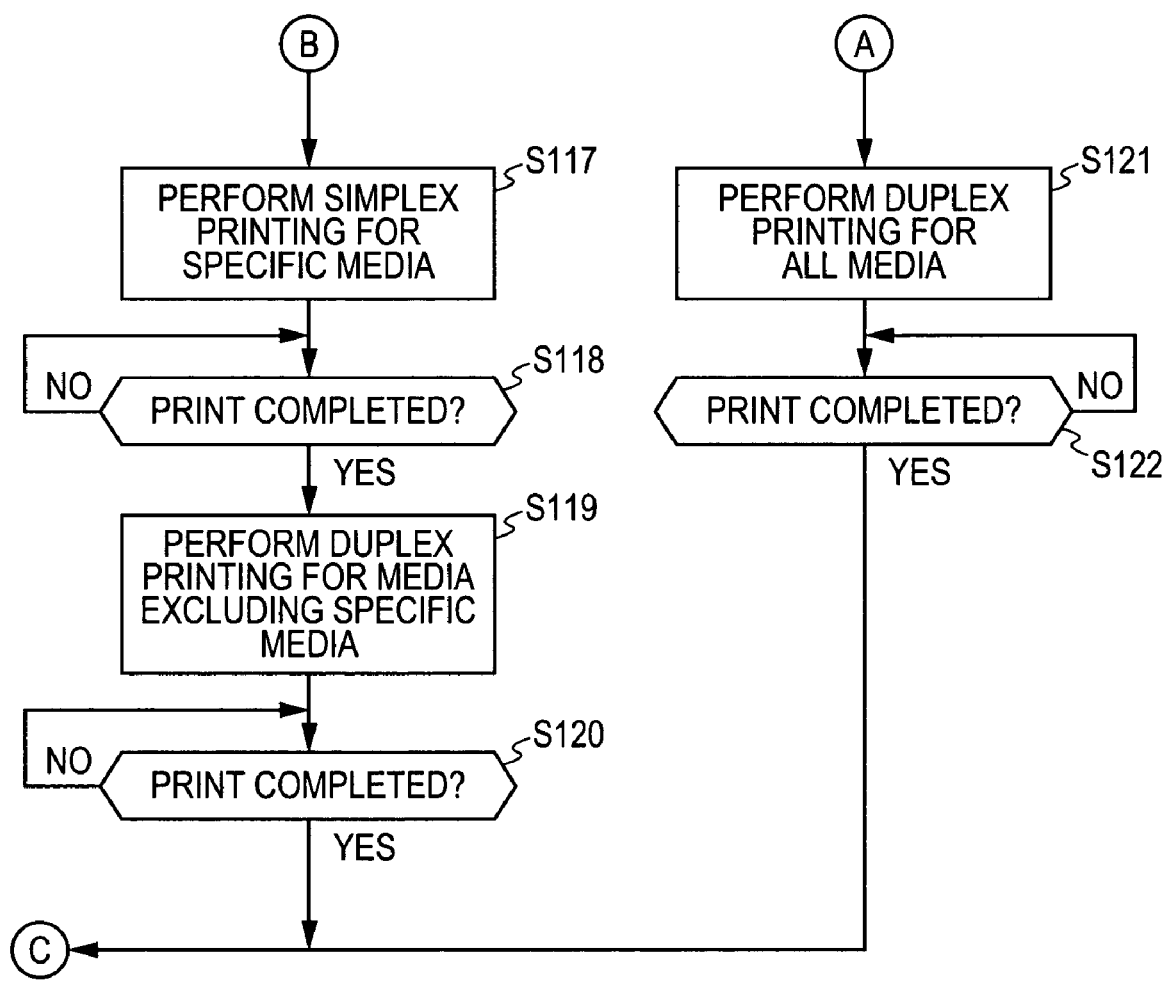
FIG. 40 is a continuation of the flow chart of FIG. 39.

An exemplary print operation of the digital multi-function printing apparatus 2101 is described next. FIGS. 39 and 40 illustrate a flow chart of the procedure of print operation. A program for realizing the print operation procedure is stored in the HDD 2305 of the digital multi-function printing apparatus 2101 and is executed by the CPU 2301. The CPU 2301 receives settings that a user specifies in the printer driver screen 3301 and the print detail settings screen 3401 of the computer station 2106 (step S101). The CPU 2301 then waits for an instruction to start printing by depressing the OK key 3304 in the printer driver screen 3301 (step S102).

Upon being instructed to start printing, the CPU 2301 determines whether duplex printing is set in the user settings specified by the user (step S103). If duplex printing is set, the CPU 2301 determines whether sheets used for the duplex print job contain an untransportable sheet (step S104). If the sheets contain an untransportable sheet, the CPU 2301 determines whether the sheets contain two or more types of specific media (step S105).

Figure 41:
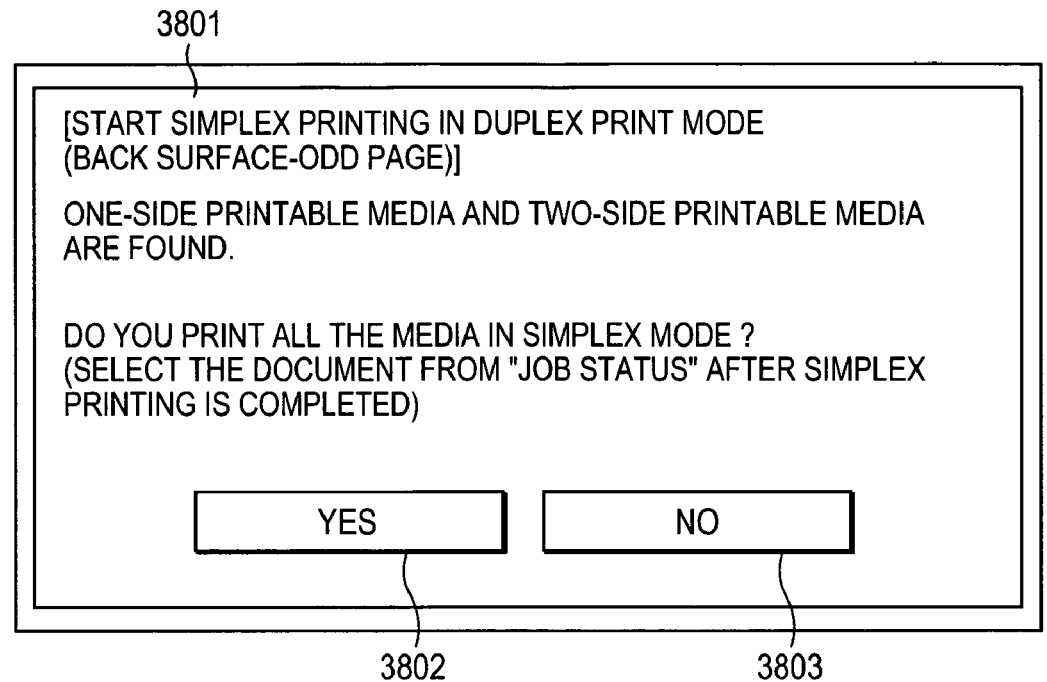
FIG. 41 illustrates an exemplary selection screen displayed on an operation unit.

If it is determined that the sheets contain two or more types of specific media, the CPU 2301 displays a screen on the operation unit 2203 for the user to select whether simplex printing is performed for all of the sheets and the sheets are output (step S106). FIG. 41 illustrates the selection screen 3801 displayed on the operation unit 2203 at step S106. This screen indicates that the sheets contain an untransportable sheet. Also, a YES key 3802, which is depressed to perform simplex printing in a duplex mode, and a NO key 3803, which is depressed not to perform simplex printing, are displayed in the selection screen.

Figure 42:
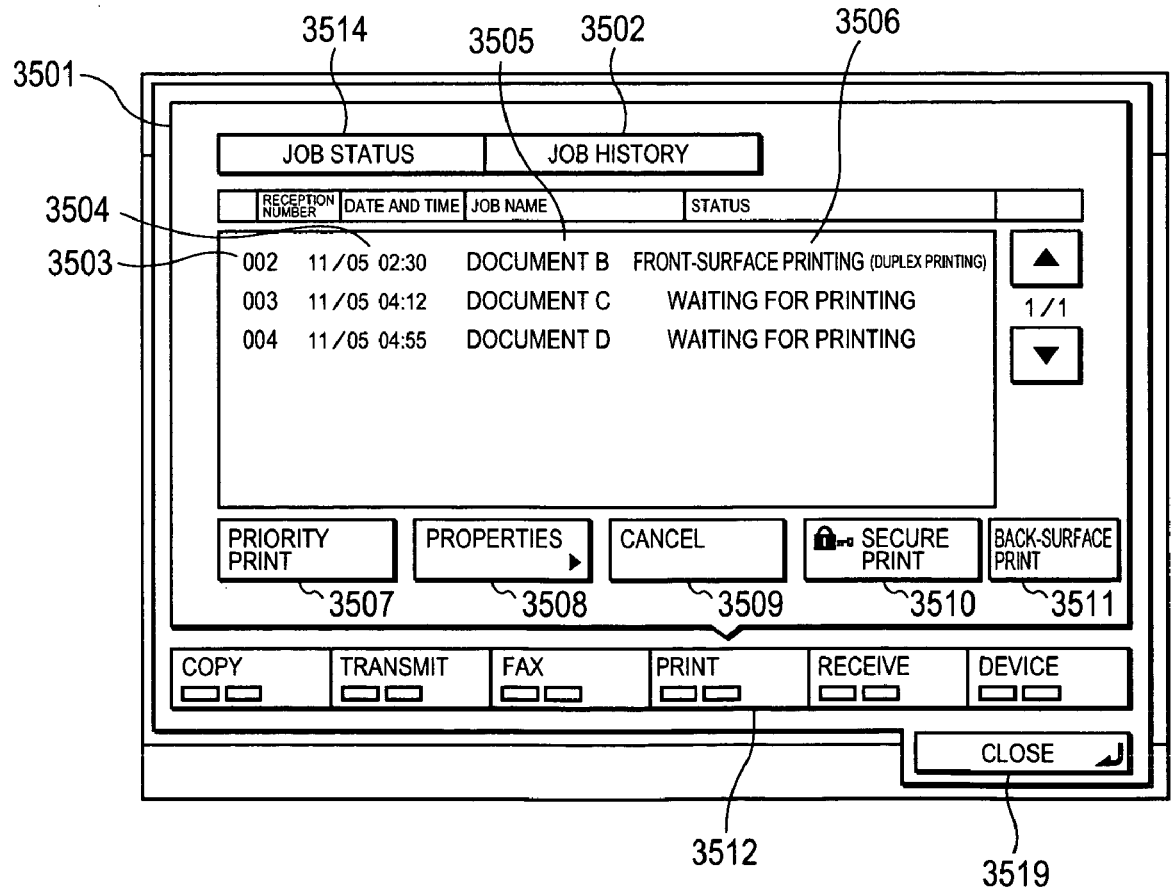
FIG. 42 illustrates an example of a job status screen in which a message "Front-surface printing (duplex printing)" is displayed.

The CPU 2301 determines whether the YES key 3802 is selected, that is, whether simplex printing is to be performed for all of the sheets (step S107). If the YES key 3802 is selected, simplex printing is performed for all of the sheets without turning over even a transportable sheet (step S108). If the printing operation at S108 is performed on the front surfaces of the sheets, only even pages of the job are printed in a face-down output mode. In a face-up output mode, only odd pages of the job are printed in a face-down output mode. Additionally, at step S108, the target job is registered to the print status screen 3501 (see FIG. 37). As shown in FIG. 37, the job name "Document B" of the target job is displayed in the screen. Since a different job is submitted prior to this job, a message "Waiting for duplex printing" is displayed in the status field 3506. If, at step S108, the job is being printed, a message "Front-surface printing (duplex printing)" is displayed. FIG. 42 illustrates an example of the job status screen in which a message "Front-surface printing (duplex printing)" is displayed.

Figure 43:
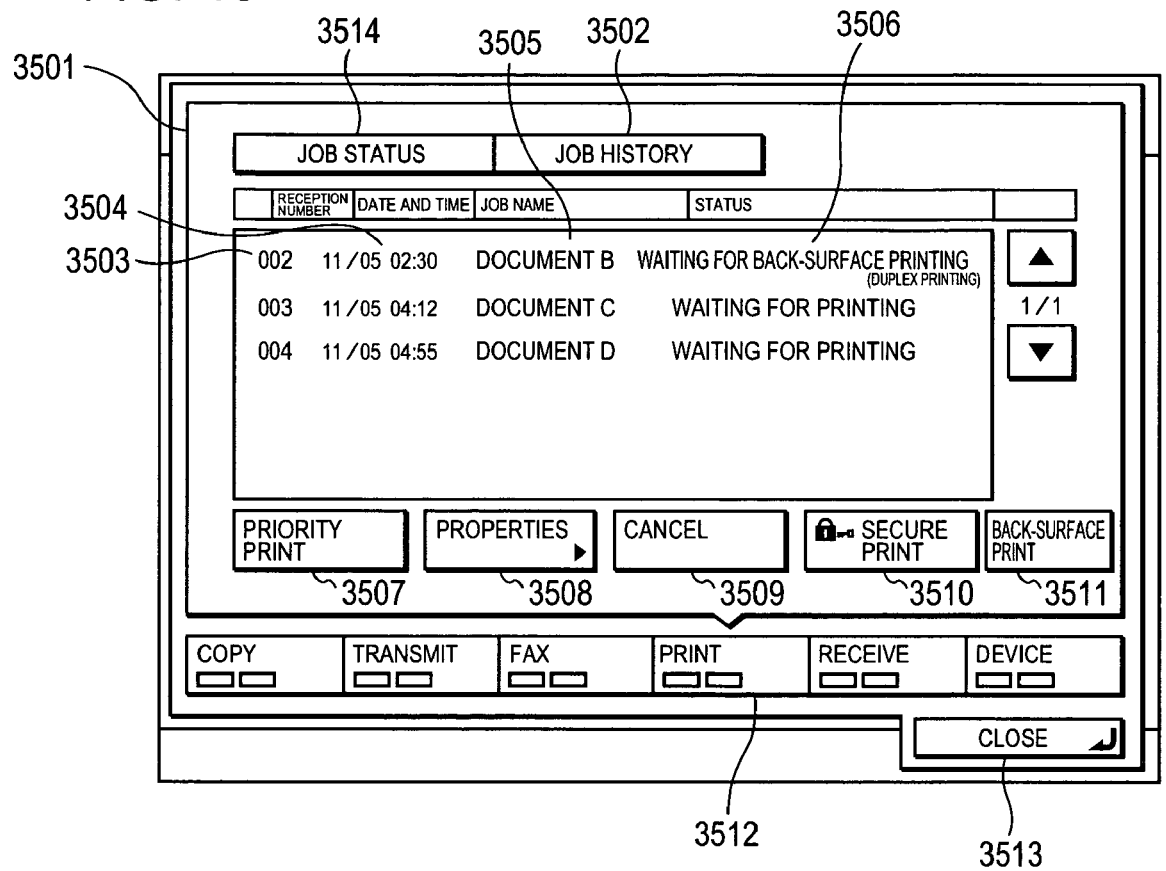
FIG. 43 illustrates an example of a job status screen in which a message "Waiting for back-surface printing (duplex printing)" is displayed.

Thereafter, the CPU 2301 determines whether the printing is completed (step S109). Step S109 is repeated until the printing is completed. When the printing is completed, the CPU 2301 displays a message, on the operation unit 2203, indicating that the simplex printing on the first surfaces is completed for the target job and the job is waiting for simplex printing on the second surfaces (step S110). If the second surfaces are back surfaces and the front surfaces of the sheets are printed in a face-down output mode, the back surfaces of the sheets become odd pages. If the front surfaces are printed in a face-up output mode, the back surfaces become even pages. In the status field 3506, a message "Waiting for back-surface printing (duplex printing)" is displayed. FIG. 43 illustrates an example of the job status screen in which a message "Waiting for back-surface printing (duplex printing)" is displayed.

At step S110, while the target job "Document B" is waiting for back-surface printing, another print job submitted after the target job "Document B" can be started. In this case, the back-surface printing becomes ready after the printing operation for another job is completed. Alternatively, while the target job "Document B" is waiting for back-surface printing, the printing operation for another print job submitted after the target job "Document B" may be paused until the back-surface printing is completed.

Figure 44:
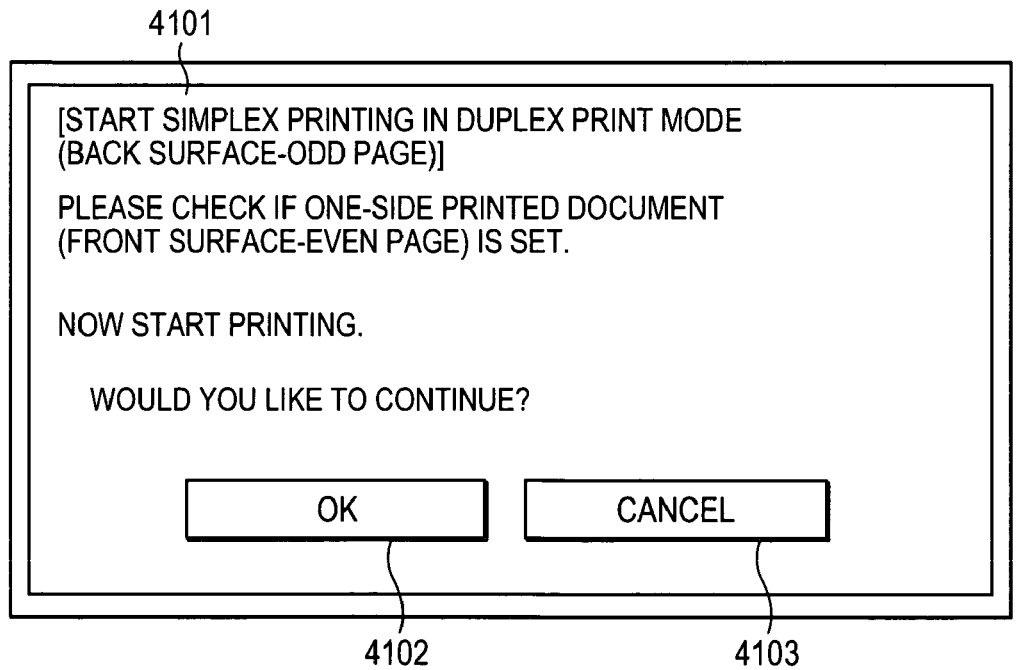
FIG. 44 illustrates an exemplary screen to confirm the start of printing.

The CPU 2301 determines whether the job waiting for back-surface printing is selected or not (step S111). If the job waiting for back-surface printing is selected, the CPU 2301 enables the back-surface print key 3511 in the print status screen 3501. The CPU 2301 then waits until the back-surface print key 3511 is selected (step S112). When the back-surface print key 3511 is selected, the CPU 2301 starts printing on the back surfaces of the sheets (step S113). At step S112, the CPU 2301 may display, on the operation unit 2203, a screen to confirm the start of printing. FIG. 44 illustrates an exemplary screen 4101 to confirm the start of printing at step S112. In a confirmation screen 4101, a message for checking if all the media whose front surfaces are printed are properly set is displayed. Also, an OK key 4102 used to start printing and a cancel key 4103 used to cancel the printing are provided in the confirmation screen 4101.

Figure 45:
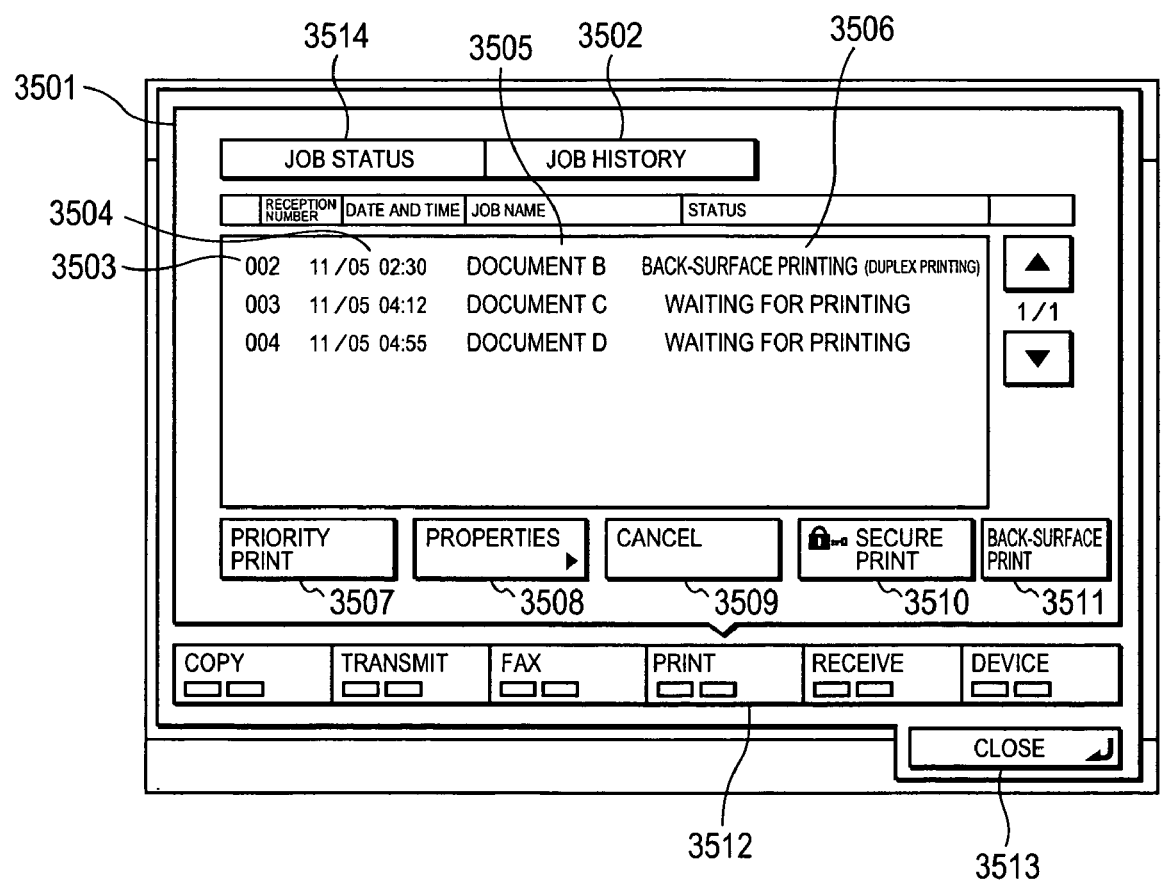
FIG. 45 illustrates an example of the job status screen in which a message "Waiting for back-surface printing (duplex printing)" is displayed.

At step S113, all the media in the duplex print job are printed without turning over the media in the digital multi-function printing apparatus 2101. Additionally, at step S113, the CPU 2301 displays a message "Back-surface printing (duplex printing)" in the status field 3506 during the print operation. FIG. 45 illustrates an example of the job status screen in which a message "Back-surface printing (duplex printing)" is displayed. Thereafter, the CPU 2301 waits until all the pages in the duplex print job are printed (step S114). When all the pages are printed, the process is completed.

In contrast, if, at step S107, it is determined that the NO key 3803 is selected, simplex printing is sequentially performed for all of the sheets without turning over an untransportable sheet in the digital multi-function printing apparatus 2101 (step S117). The CPU 2301 waits until a print operation for pages printed at step S117 is completed (step S118). When printing on the first surfaces of the media is completed, the CPU 2301 turns over the transportable sheet excluding the specific media to perform duplex printing (step S119). The CPU 2301 then waits for the completion of duplex printing (step S120). Upon completion of duplex printing, the process is completed. In this case, the media whose one surface is printed and the media whose both surfaces are printed are output onto different output trays. However, both media may be output onto a single output tray.

If, at step S105, only one type of specific media is found, simplex printing (front-surface printing) is performed for all the media at step S108 since all the media are untransportable. As described above, the user then turns over the media, and all of the other surfaces (i.e., back surfaces) are printed (see steps S108 to S114). To turn over the media, the user manually moves the media whose one surfaces are printed and which are output onto an output tray onto the manual feed tray 2724.

In contrast, if, at step 104, the untransportable sheets are not found, and therefore, all the media are transportable, the CPU 2301 performs automatic duplex printing for all the media by turning over the media in the digital multi-function printing apparatus 2101 (step S121). Thereafter, the CPU 2301 waits until all the pages in the duplex print job are printed (step S122). When all the pages are printed, the process is completed.

If, at step S103, duplex printing is not set and only simplex printing is set, all the media (all the pages) of the duplex print job is printed in a simplex mode (step S115). Thereafter, the CPU 2301 waits until all the pages in the duplex print job are printed (step S116). When all the pages are printed, the process is completed.

As stated above, according to the second embodiment of the present invention, when a printing apparatus continuously performs duplex printing by turning over a plurality of media (recording paper sheets), the printing apparatus determines whether each of the plurality of media is transportable by a duplex transport function in the digital multi-function printing apparatus 2101. If an untransportable sheet is specified in a duplex print job, simplex printing is performed for all the media including transportable sheet. Subsequently, a user manually turns over the media whose first surfaces are printed and sets them on a feeder unit so as to print on the second surfaces of the media.

Accordingly, even when both transportable size or type of media and untransportable size or type of media are specified in a duplex print job, an appropriate duplex printing can be provided. Additionally, the second embodiment eliminates the operation required when one part of a duplex print job is processed by manual duplex printing and the other part is processed by automatic duplex printing, thus reducing print defect caused by an operation error. Furthermore, a plurality of media printed by one duplex print job are not output to different output units.

Third Exemplary Embodiment

The configurations of a printing apparatus and a printing system of a third embodiment are similar to those of the second embodiment, and therefore, the descriptions are not repeated. Only different points from the second embodiment are described here.

Figure 46:
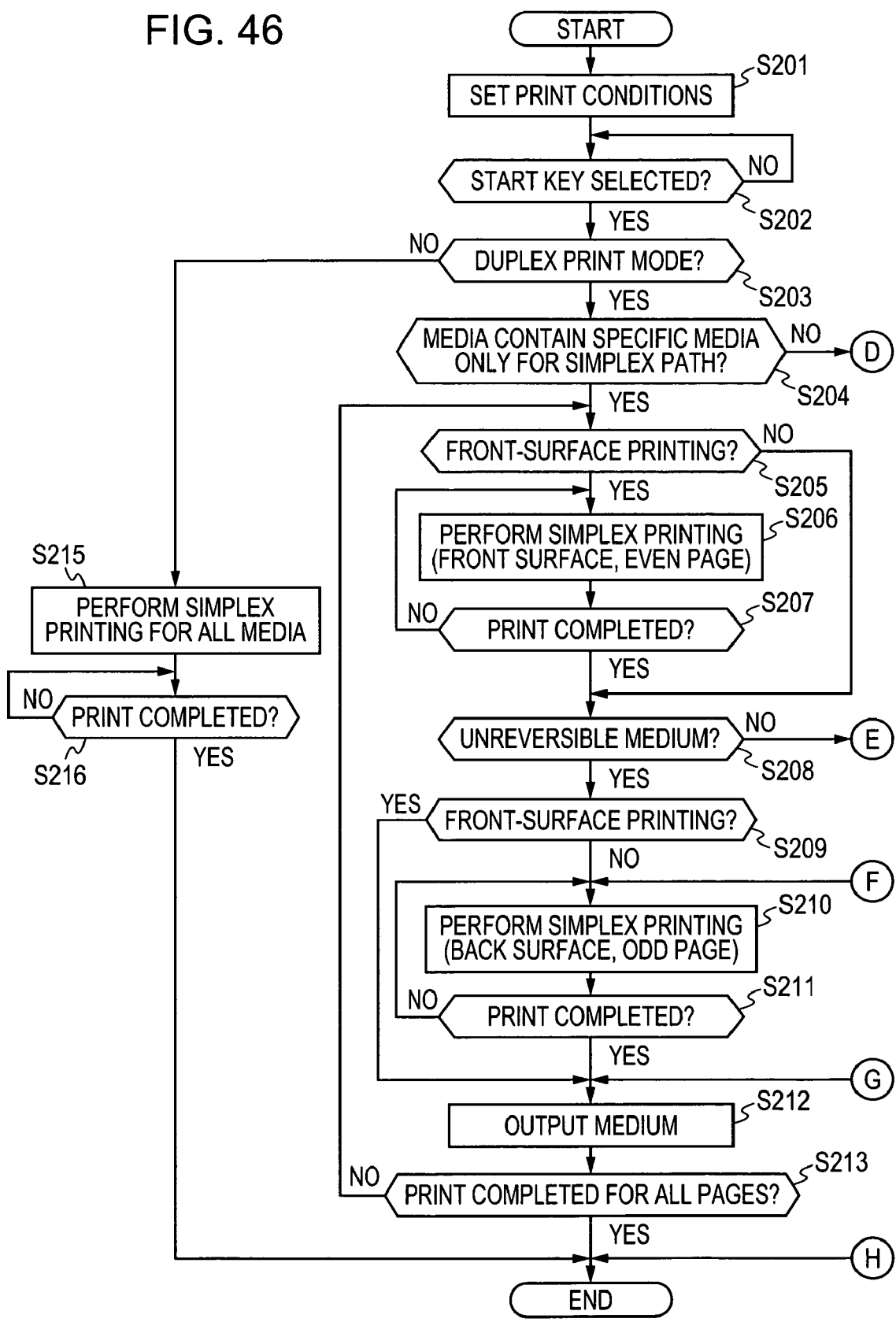
FIG. 46 illustrates a flow chart of an exemplary procedure of print operation according a third embodiment of the present invention.
Figure 47:
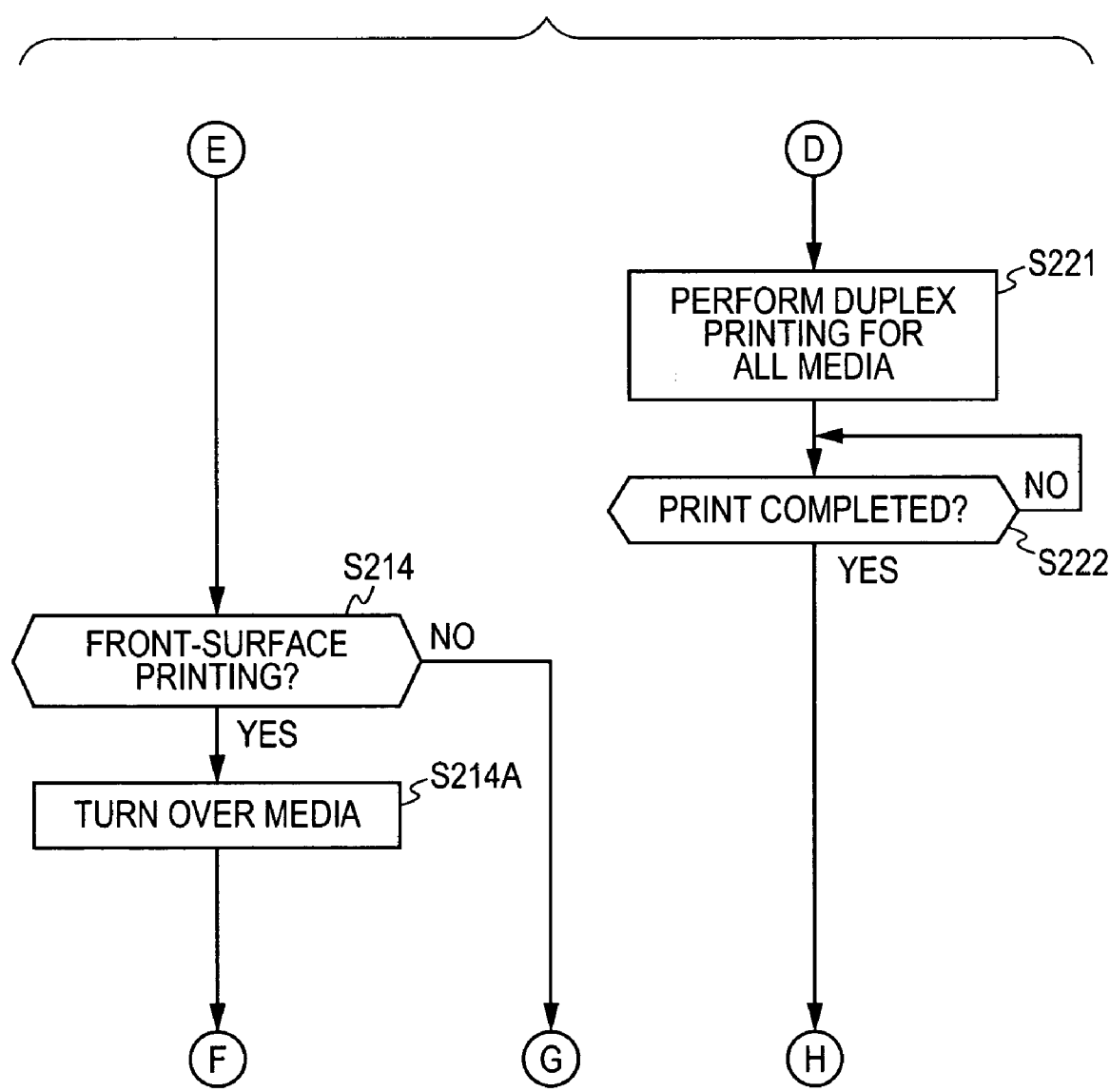
FIG. 47 is a continuation of the flow chart of FIG. 46.

FIGS. 46 and 47 illustrate a flow chart of the procedure of print operation of the third embodiment. A program for realizing the print operation procedure is stored in the HDD 2305 of the digital multi-function printing apparatus 2101 and is executed by the CPU 2301. The CPU 2301 receives settings that a user specifies in the printer driver screen 3301 and the print detail settings screen 3401 of the computer station 2106 (step S201). The CPU 2301 then waits for an instruction to start printing by depressing the OK key 3304 in the printer driver screen 3301 (step S202).

Upon being instructed to start printing, the CPU 2301 determines whether duplex printing is set in the user settings specified by the user (step S203). If duplex printing is set, the CPU 2301 determines whether recording media used for the duplex print job contain an untransportable sheet (step S204). If the media contain an untransportable, the CPU 2301 determines whether front-surface printing is specified for the page (step S205). As used herein, the term "front surface" refers to a surface printed first in duplex printing. In a face-down output mode, the front surface is an even page, whereas, in a face-up output mode, the front surface is an odd page.

If it is determined that front-surface printing is specified, the CPU 2301 starts printing on the front surface (step S206). Thereafter, the CPU 2301 determines whether printing on the front surface has been completed (step S207). If printing on the front surfaces has not been completed, the process returns to step S206. However, if printing on the front surfaces has been completed, the CPU 2301 determines whether the sheet for the page is untransportable (step S208). If the sheet for the page is transportable, it is determined whether printing on the front surface was performed (step S214). If printing on the front surface was performed, the sheet is turned over (step S214A). Subsequently, the CPU 2301 starts printing on the back surface (step S210). The CPU 2301 determines whether printing on the back surface has been completed (step S211). If printing on the back surface has not been completed, the process returns to step S210. However, if printing on the back surface has been completed, the sheet is output (step S212).

If, at step S208, the sheet for the page is untransportable, it is determined whether printing on the front surface was performed (step S209). If printing on the front surface was performed, the page is immediately output. The CPU 2301 then determines whether printing has been completed for all the pages of the duplex print job (step S213). If printing for all the pages has not been completed, the process returns to step S205. In contrast, if printing for all the pages has been completed, the process is completed. At that time, "Waiting for back-surface printing (duplex printing)" is displayed in the job status field of the operation unit 2203.

If, at step S205, printing is performed on the back surface, the CPU 2301 determines at step S208 whether the sheet for the page is untransportable. If the sheet is transportable, printing has been performed on both surfaces of the sheet. Therefore, the sheet is immediately output at step S212. However, if it is determined at step S208 that the sheet for the page is untransportable, printing on the back surface is started at step S210. The CPU 2301, at step S211, determines whether printing on the back surface has been completed. If printing on the back surface has been completed, the sheet is output at step S212.

Subsequently, the CPU 2301 then determines whether printing has been completed for all the pages of the duplex print job (step S213). If printing for all the pages has not been completed, the process returns to step S205. In contrast, if printing for all the pages has been completed, the process is completed.

If, at step S204, an untransportable is not specified for any page of the duplex print job, that is, if all the media are transportable, all the media are turned over in the digital multi-function printing apparatus 2101 to perform duplex printing (step S221). The CPU 2301 then determines whether printing has been completed for all the pages of the duplex print job (step S222). If printing for all the pages has been completed, the process is completed.

In contrast, if, at step S203, duplex printing is not set, and therefore, simplex printing is performed, the CPU 2301 prints all the media of the duplex print job in a simplex mode (step S215). The CPU 2301 then determines whether printing has been completed for all the pages of the duplex print job (step S216). If printing for all the pages has been completed, the process is completed.

As stated above, according to the third embodiment of the present invention, when at least one untransportable sheet and at least one transportable sheet are mixed, instead of performing simplex printing for all the pages first, duplex printing is performed for transportable sheets and the transportable sheets are output. Thereafter, when the output media are turned over and are fed again, the media whose both surfaces are printed are output via the paper transport paths without being printed. Thus, for some models of printing apparatuses, the print efficiency can be increased.

Fourth Exemplary Embodiment

The configurations of a printing apparatus and a printing system of a fourth embodiment are similar to those of the second embodiment, and therefore, the descriptions are not repeated. Only different settings and operations from the second embodiment are described here.

[Exemplary Paper Type Settings]

The procedure of setting the paper type loaded in the sheet cassettes 2722 and 2723 or the manual feed tray 2724 of the printer unit 2202 is described. As used herein, the paper type represents the feature of paper, such as a material and color of the paper. First, the registration procedure of the type of paper loaded in the sheet cassettes 2722 and 2723 is described. To set the paper type, by pressing the detailed setting key 2409 (see FIG. 26) of the operation unit 2203, a detail settings screen 4301 is displayed on the LCD display screen 2401.

Figure 48:
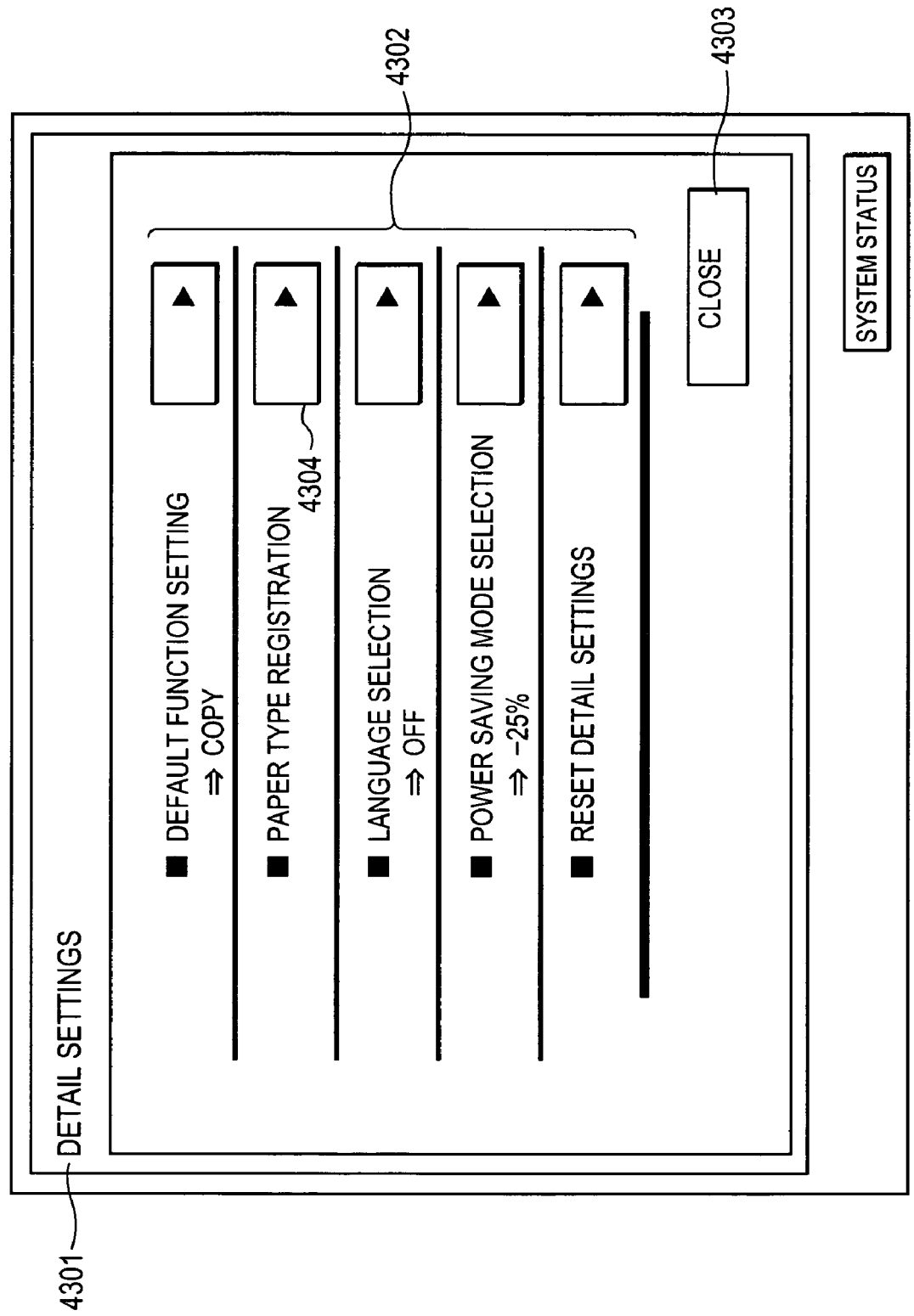
FIG. 48 illustrates an exemplary detail settings screen.

FIG. 48 illustrates an exemplary detail settings screen 4301. In the detail settings screen 4301, detail settings keys 4302 and a close key 4303 are provided. When the close key 4303 is pressed, the detail settings screen 4301 is closed and the display returns to the previously displayed screen. When a paper type registration key 4304, which is one of the detail settings keys 4302, is pressed, a paper type registration screen 4401 is displayed.

Figure 49:
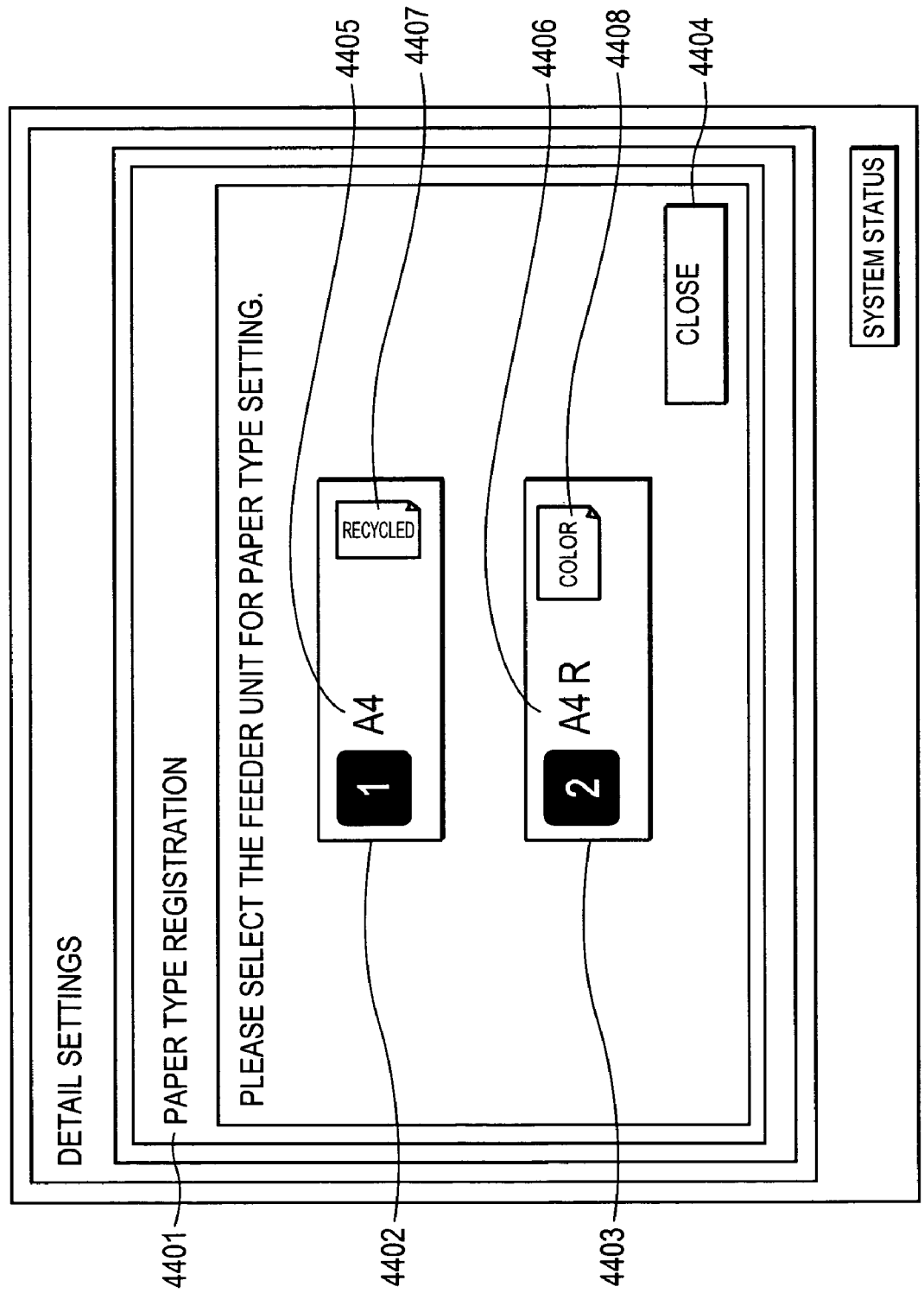
FIG. 49 illustrates an exemplary paper type registration screen.

FIG. 49 illustrates an exemplary paper type registration screen 4401. In the paper type registration screen 4401, paper keys 4402 and 4403 respectively corresponding to the sheet cassettes 2722 and 2723 of the digital multi-function printing apparatus 2101 are displayed. Also, a close key 4404 is provided in the paper type registration screen 4401. When the close key 4404 is pressed, the display returns to the detail settings screen 4301.

On paper keys 4402 and 4403, icons 4407 and 4408 which respectively represent the type of paper sheet loaded on the sheet cassettes 2722 and 2723 are displayed. Also displayed are the size icons 4405 and 4406 which respectively represent the sizes of paper loaded on the sheet cassettes 2722 and 2723. The icon 4407 indicates that the paper is recycled paper whereas the icon 4408 indicates that the paper is color paper. When the paper key 4402 or 4403 is pressed, a paper type selection screen 4501 is displayed.

Figure 50:
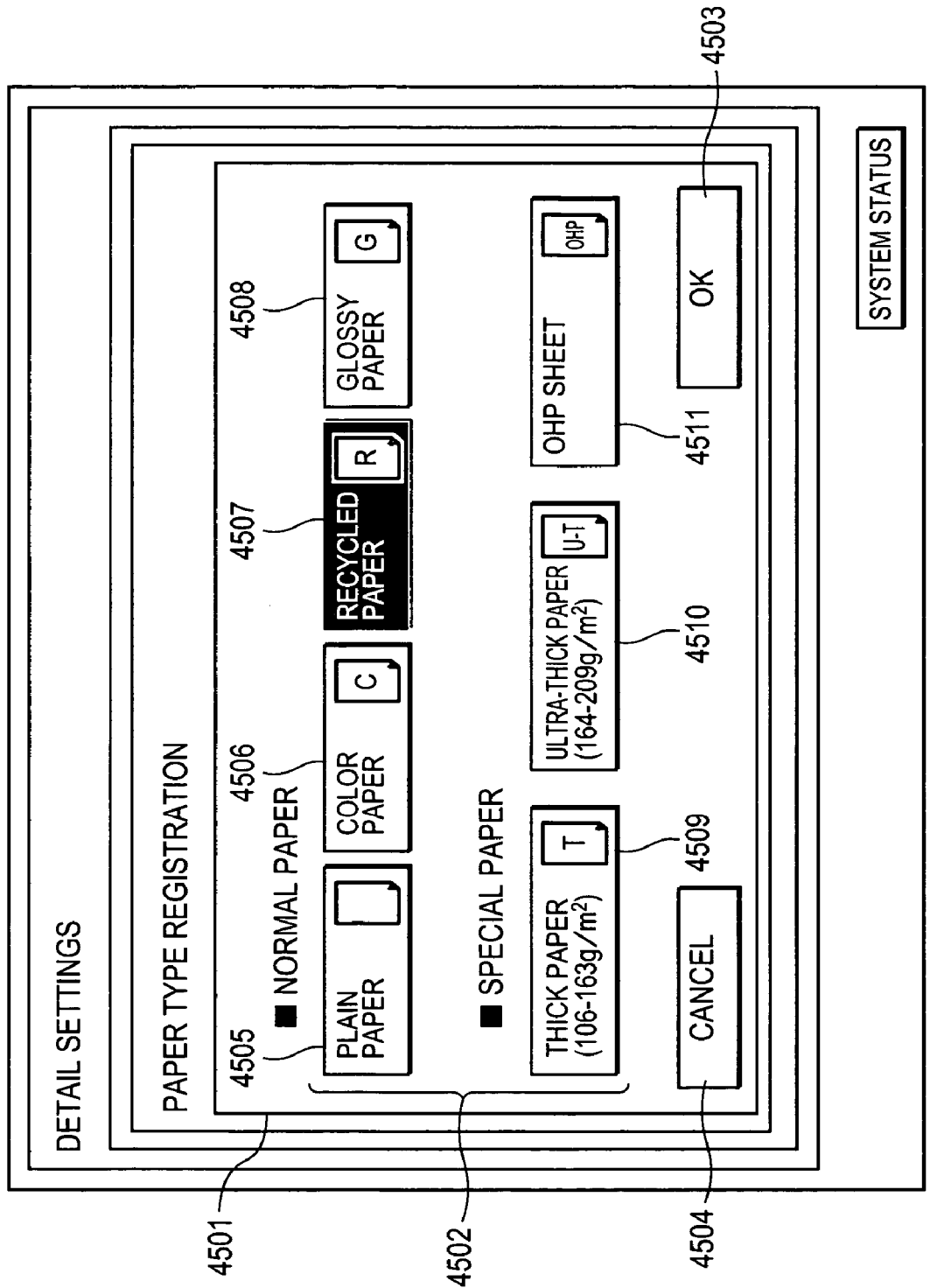
FIG. 50 illustrates an exemplary paper type selection screen.

FIG. 50 illustrates an exemplary paper type selection screen 4501. In the paper type selection screen 4501, selectable paper type keys 4502, an OK key 4503, and a cancel 4504 key are provided. Available setting paper types include plain paper 4505, color paper 4506, recycled paper 4507, glossy paper 4508, thick paper 4509, ultra-thick paper 4510, and an OHP sheet 4511. The paper type key currently selected is displayed with its black and white portions reversed. In FIG. 50, the recycled paper key 4507, which is one of the paper type keys 4502, is displayed with its black and white portions reversed.

In the paper type selection screen 4501, the user selects a key for desired paper from among paper 4505 to 4511 from among paper type keys 4502 and presses the OK key 4503. The paper type selection screen 4501 is closed and the display returns to the paper type registration screen 4401. Simultaneously, in the digital multi-function printing apparatus 2101, the selected paper type is stored in the work memory 2302 of the internal controller 2204 via the operation unit 2203. When the user presses a cancel key 4504, the paper type remains unchanged and the paper type selection screen 4501 is closed. The display then returns to the paper type registration screen 4401. Thus, the type of sheet loaded in the sheet cassette 2722 or 2723 can be set.

The procedure to register the type of sheet loaded on the manual feed tray 2724 is described. Registration of the type of paper loaded on the manual feed tray 2724 is performed every time paper is loaded on the manual feed tray 2724. This is because the registration that generally requires a troublesome operation is easily performed for the manual feed tray 2724, which does not require an open and closed operation of a cassette when the paper is loaded in contrast to the sheet cassettes 2722 and 2723. When the user loads sheets on the manual feed tray 2724, a manual feed paper size setting screen 4601 is displayed on the LCD display screen 2401 of the operation unit 2203.

Figure 51:
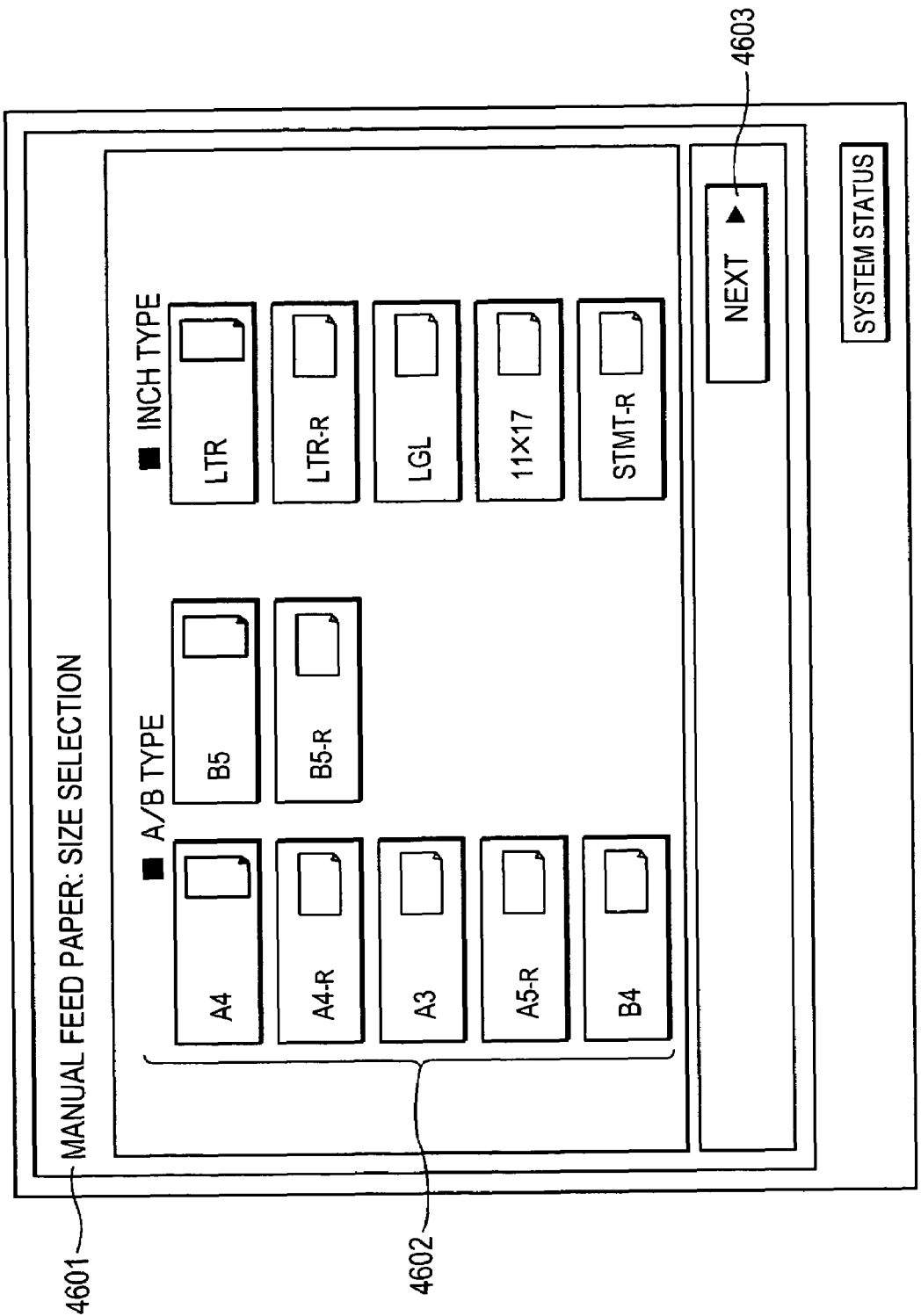
FIG. 51 illustrates an exemplary manual feed paper size setting screen.

FIG. 51 illustrates an exemplary manual feed paper size setting screen 4601. In the manual feed paper size setting screen 4601, manual feed paper size keys 4602 are provided. The user presses one of the manual feed paper size keys 4602 to select the corresponding paper size. After the selection is completed, the user presses a "NEXT" key 4603 to determine the manual feed paper size. A manual feed paper type selection screen 4701 is then displayed.

Figure 52:
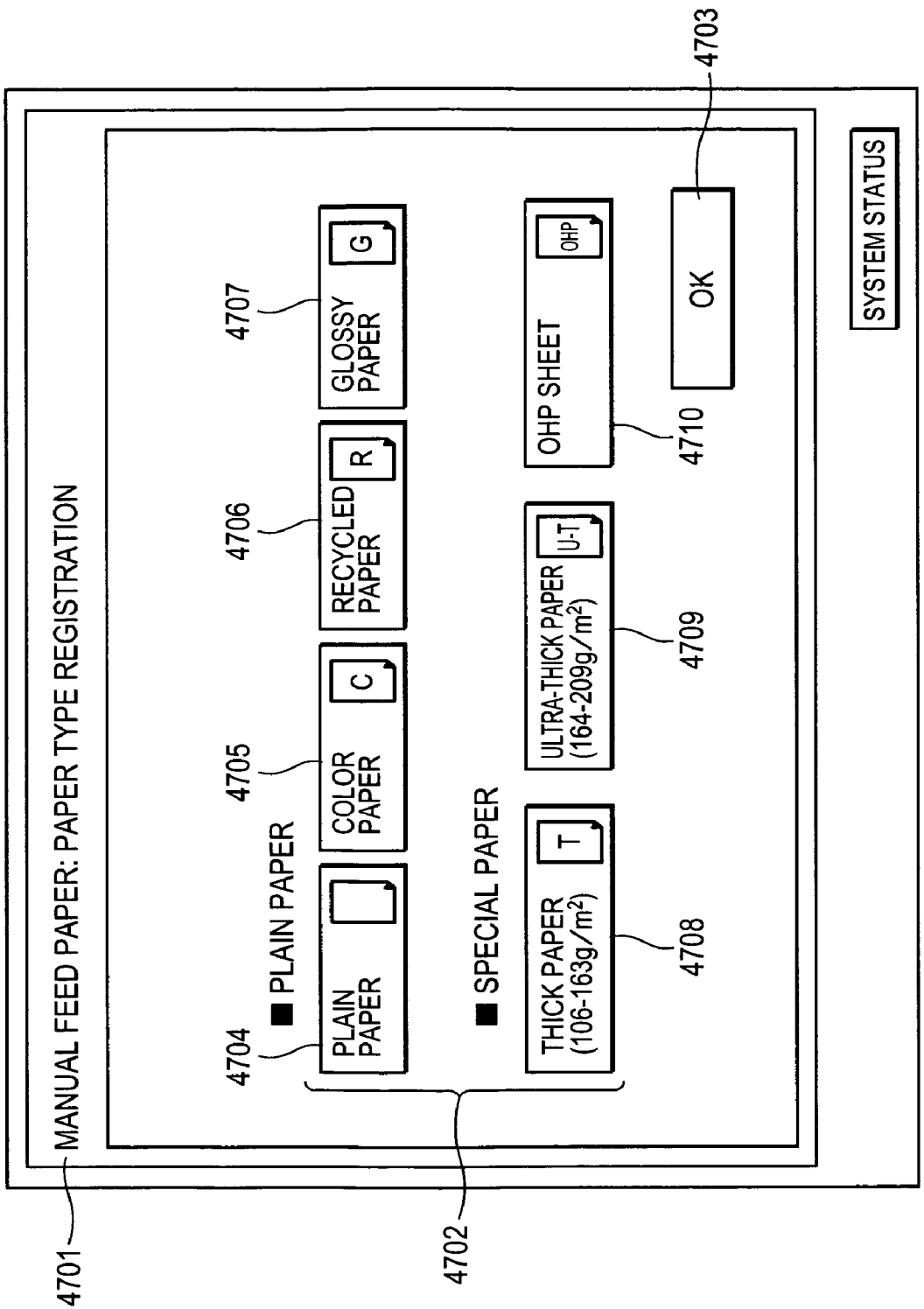
FIG. 52 illustrates an exemplary manual feed paper type selection screen.

FIG. 52 illustrates an exemplary manual feed paper type selection screen 4701. In the manual feed paper type selection screen 4701, selectable manual feed paper type keys 4702 and an OK key 4703 are provided. Available setting paper types include plain paper 4704, color paper 4705, recycled paper 4706, glossy paper 4707, thick paper 4708, ultra-thick paper 4709, and an OHP sheet 4710.

In the manual feed paper type selection screen 4701, the user selects one of the manual feed paper type keys 4702 for desired paper from among manual feed paper 4704 to 4710 and presses the OK key 4703. The manual feed paper type selection screen 4701 is closed. Simultaneously, in the digital multi-function printing apparatus 2101, the selected manual feed paper size and type are stored in the work memory 2302 of the internal controller 2204. When the manual feed paper type selection screen 4701 is closed, a paper selection screen 4801 is displayed.

Figure 53:
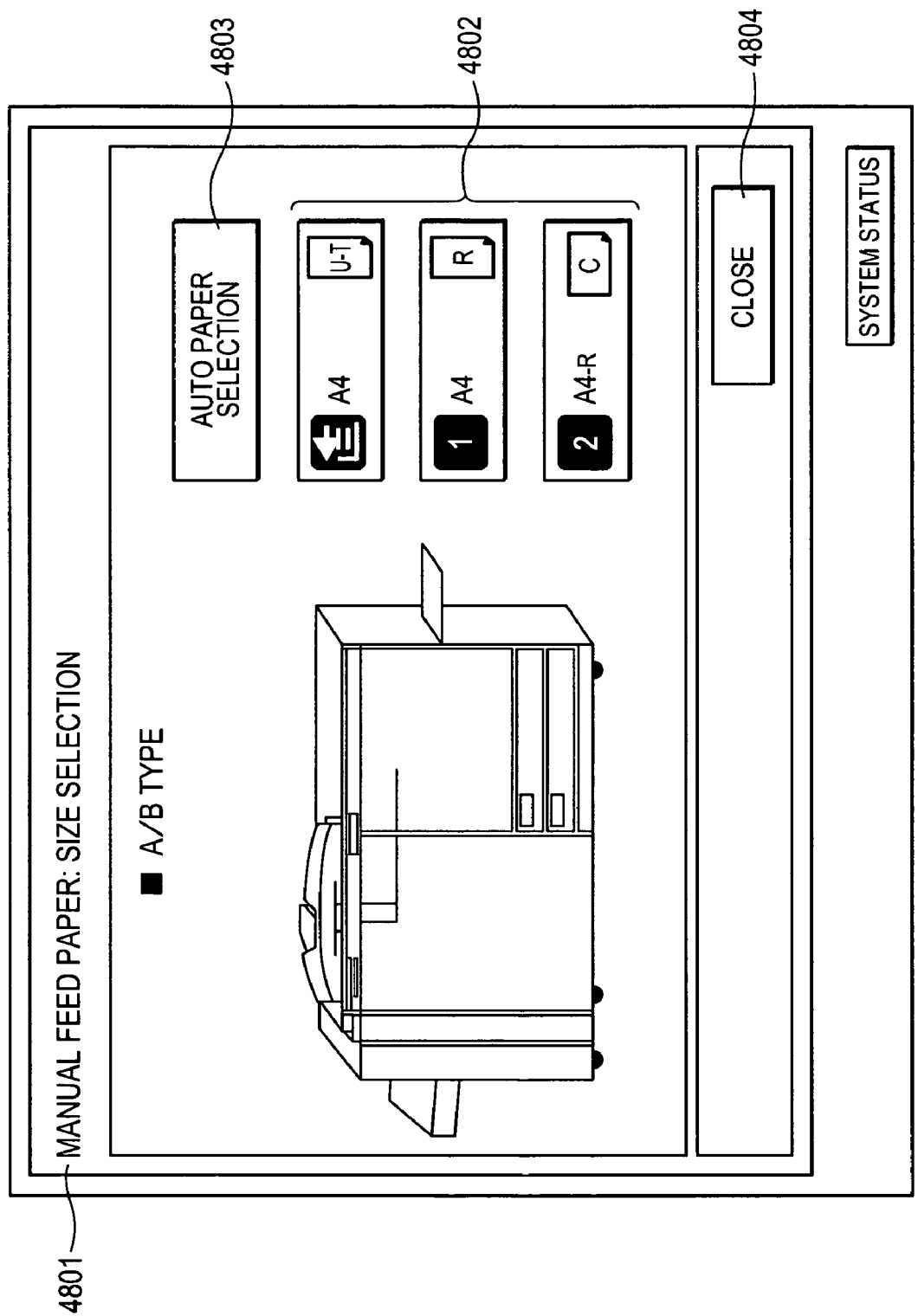
FIG. 53 illustrates an exemplary paper selection screen.

FIG. 53 illustrates an exemplary paper selection screen 4801. In the paper selection screen 4801, display items 4802 which displays the size and type of paper loaded on the sheet cassettes 2722 and 2723 and the manual feed tray 2724 are provided. Additionally, in the paper selection screen 4801, a feeder unit is selected for the copy function of the digital multi-function printing apparatus 2101. Accordingly, an automatic feeder unit selection key 4803 is displayed in the paper selection screen 4801. When a close key 4804 is pressed, the paper selection screen 4801 is closed and the display returns to the copy setting screen (see FIG. 26). If the paper is unloaded from the manual feed tray 2724 during the display of the manual feed paper size setting screen 4601 or the manual feed paper type selection screen 4701, the paper settings of the manual feed tray 2724 are canceled and the display returns to the copy setting screen. Thus, the type of sheet loaded on the manual feed tray 2724 can be set.

[Printer Driver]

The setting screens of a printer driver are identical to those of the second embodiment shown in FIGS. 35 and 36, and therefore, the descriptions are not repeated.

[Exemplary Print Status Screen]

Figure 54:
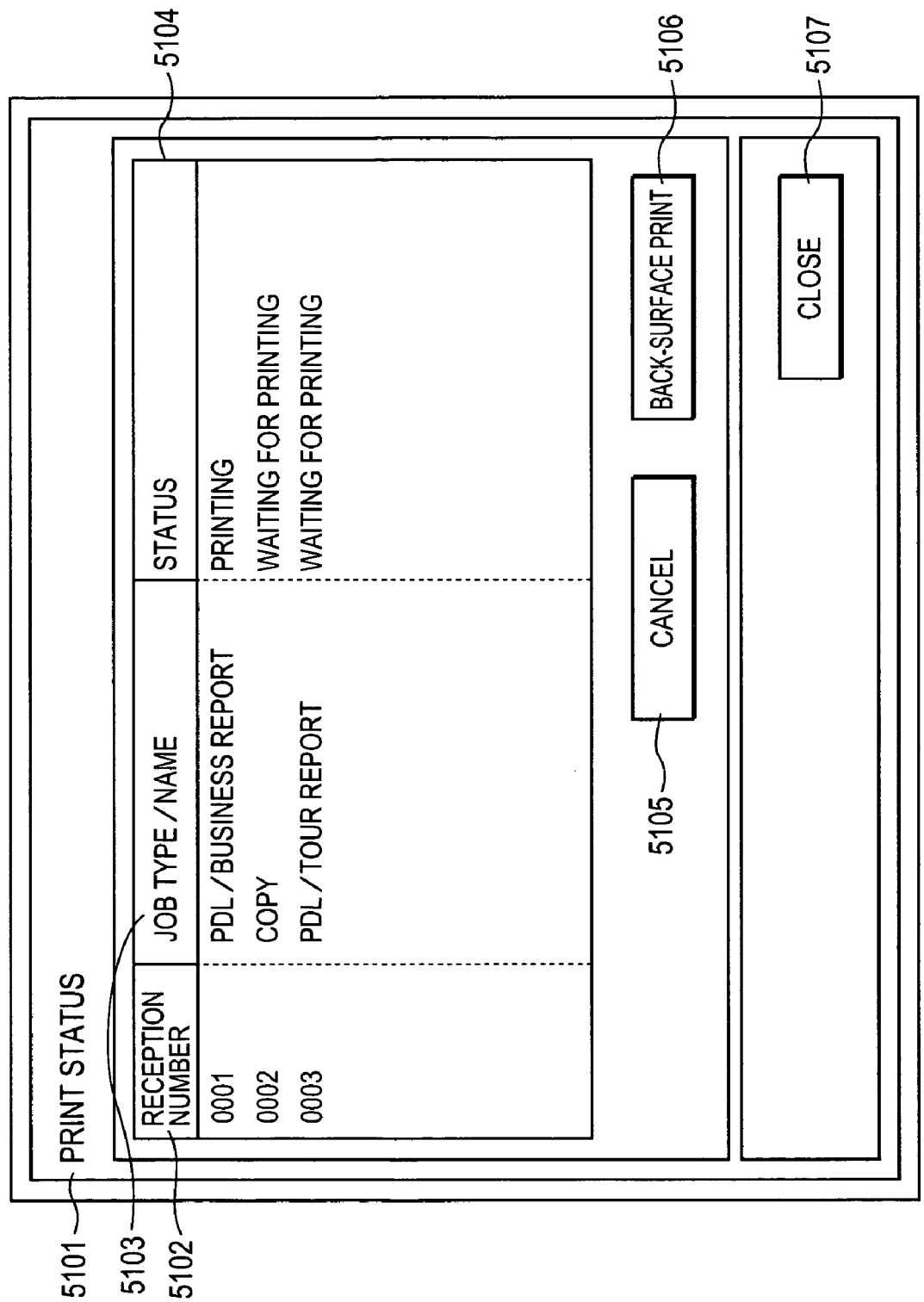
FIG. 54 illustrates an exemplary print status screen.

FIG. 54 illustrates a print status screen. A print status screen 5101 is displayed by pressing the system status key 2405 provided in the LCD display screen 2401 of the operation unit 2203. In the print status screen 5101, the following items are displayed. A reception number 5102 is allocated to a print job by the internal controller 2204 of the digital multi-function printing apparatus 2101 in order to identify the print job. A job type and name item 5103 represents a job type (e.g., copy and PDL print) and the job name if the job (e.g., PDL print job) has a name. A status item 5104 represents the job status in the digital multi-function printing apparatus 2101.

Additionally, the print status screen 5101 provides a cancel key 5105 for canceling a specified job and a back-surface print key 5106 for starting printing on first surfaces of sheets with second surfaces printed. The operation of the back-surface print key 5106 is described in detail below. A close key 5107 is used to close the print status screen 5101 and to return to the previously displayed screen.

[Exemplary PDL Print]

Figure 55:
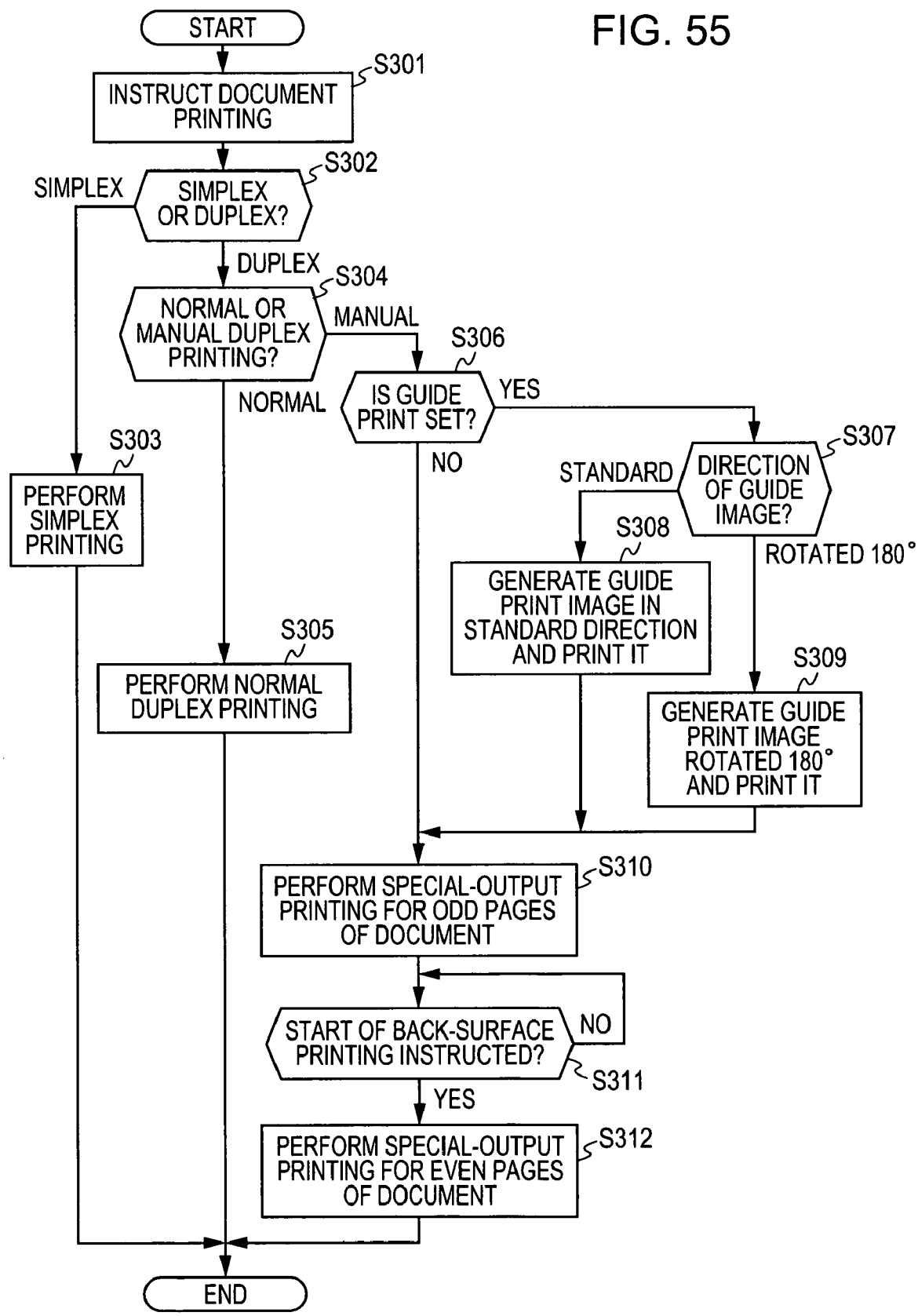
FIG. 55 illustrates a flow chart of an exemplary procedure of print operation.

An exemplary print operation of the digital multi-function printing apparatus 2101 is now herein described. FIG. 55 illustrates a flow chart of an exemplary procedure of print operation. A program for realizing the print operation procedure is stored in the HDD 2305 of the digital multi-function printing apparatus 2101 and is executed by the CPU 2301. The CPU 2301 receives settings that a user specified in the printer driver screen 3301 and the print detail settings screen 3401 of the computer station 2106. The CPU 2301 also receives a print execution instruction for a document (print job) (step S301).

Upon receiving the print settings together with an expanded image from the external controller 2104, the CPU 2301 determines which one of simplex and duplex printing is set in the print job via the print method selection field 3405 of the print detail settings screen 3401 (step S302). If the job is a simplex print job, the CPU 2301 executes a print operation in accordance with the settings set in the print detail settings screen 3401 (step S303). Thereafter, the process is completed.

In contrast, if it is determined at step S302 that the job is a duplex print job, the CPU 2301 determines whether the type of paper used for printing is the type that allows automatic duplex printing or the type that requires manual duplex printing to print images on both sides of a sheet (step S304).

The determination of the paper type used for printing is made depending on the paper selection type setting field 3404 in the print detail settings screen 3401 as follows: if the feeder unit that feeds a sheet is set in the print job, the paper type set via the operation unit 2203 for the sheet cassette 2722, the sheet cassette 2723, or the manual feed tray 2724 corresponding to the feeder unit is employed; and, if the paper type used for the print job is specified, the paper type selected by a user from among the paper type selection field 3412 (see FIG. 36) is employed. As used herein, the case where the feeder unit that feeds a sheet is set in the print job refers to a case where the feeder unit selection 3408 is set in FIG. 36. Also, the case where the paper type used for the print job is specified refers to a case where the paper type selection 3409 is set in FIG. 36.

If it is determined at step S304 that the paper type used for printing is the type that allows automatic duplex printing, the CPU 2301 performs automatic duplex printing (step S305). The process is then completed. During automatic duplex printing, a message "Duplex printing" is displayed in the status field of the print status screen 5101 at step S305. FIG. 56 illustrates a print status screen in which a message "Duplex printing" is displayed.

In contrast, if it is determined at step S304 that the paper type used for printing is the type that requires manual duplex printing to print images on both sides of a sheet, the CPU 2301 then determines whether the guide print setting field 3407 in the print detail settings screen 3401 is set or not (step S306). If the CPU 2301 determines that the guide print is specified, the CPU 2301 then determines the orientation of a guide image on the basis of the combination of the size and orientation of paper sheet used for a duplex print job, a print direction setting, and a binding direction setting suitable for the setting in the paper size setting field 3402.

FIG. 57 illustrates a table representing the orientation of a guide image determined on the basis of the combination of the size and orientation of a sheet used for a duplex print job, a print direction setting, and a binding direction setting. Here, the orientation of a guide image is determined to be a standard direction or a direction rotated 180° in accordance with a combination of the settings.

FIG. 58 is a diagram illustrating the size and the orientation of a sheet and an image forming standard, while FIG. 59 illustrates a guide image. The guide image includes information about a reception number for identifying a job ("0001" in this example) and a direction in which sheets whose surfaces B are to be printed are placed on the manual feed tray 2724. The reception number is also displayed in the print status screen 5101. The CPU 2301 then determines whether a guide image orientation is a standard direction or a direction rotated 180° (step S307).

The internal controller 2204 generates a guide image having an orientation determined at step S307 and expands it into the image memory 2304. That is, if the orientation of the guide image is a standard direction, the internal controller 2204 generates the guide image in the standard direction (step S308). In contrast, if the orientation of the guide image is a direction rotated 180°, the internal controller 2204 generates the guide image in the direction rotated 180° (step S309). At step S308 or S309, the internal controller 2204 further prints the generated guide image on a paper sheet which allows face-down output and which is fed from the sheet cassette 2722, the sheet cassette 2723, or the manual feed tray 2724, and outputs the sheet in a face-down output mode.

However, if, at step S306, it is determined that a guide print is not specified or after the sheet on which the guide image is printed at step S308 or S309 is output in a face-down mode, the following process is performed. The CPU 2301 prints odd pages (2n+1; n=0, 1, 2 . . . ) of a document image expanded by the internal controller 2204 and stored in the HDD 2305 of the internal controller 2204 on the paper sheets of the type determined at step S304, and outputs the pages face up (step S310). At that time, a message "Front-surface printing" is displayed in the status field of the print status screen 5101 to indicate that the surfaces A are being printed. FIG. 60 illustrates a print status screen in which a message "Front-surface printing" is displayed.

Figure 61:
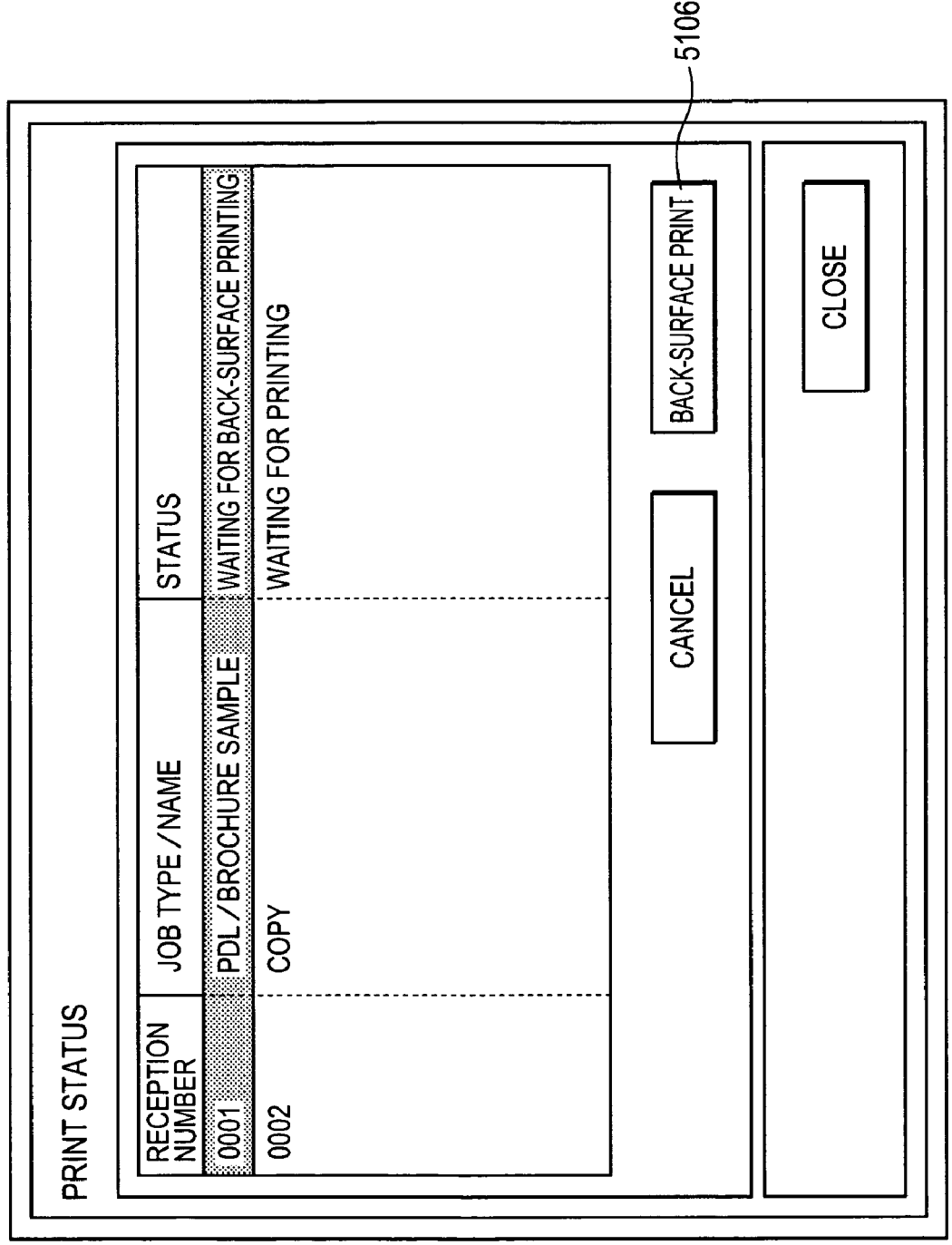
FIG. 61 illustrates an exemplary print status screen in which a message "Waiting for back-surface printing" is displayed.

After printing on the surfaces A in a face-up output mode is completed, a message "Waiting for back-surface printing" is displayed in the status field of the print status screen 5101 to indicate that the surfaces A have been printed in a face-up output mode and the surfaces B are ready for printing. FIG. 61 illustrates a print status screen in which a message "Waiting for back-surface printing" is displayed.

The CPU 2301 selects the corresponding job and determines whether the back-surface print key 5106 is pressed (step S311). If the back-surface print key 5106 is pressed, a back-surface printing start screen 5701 is displayed to prompt the user to place the sheets whose surfaces A are only printed onto the manual feed tray 2724 in order to print on the surfaces B.

Figure 62:
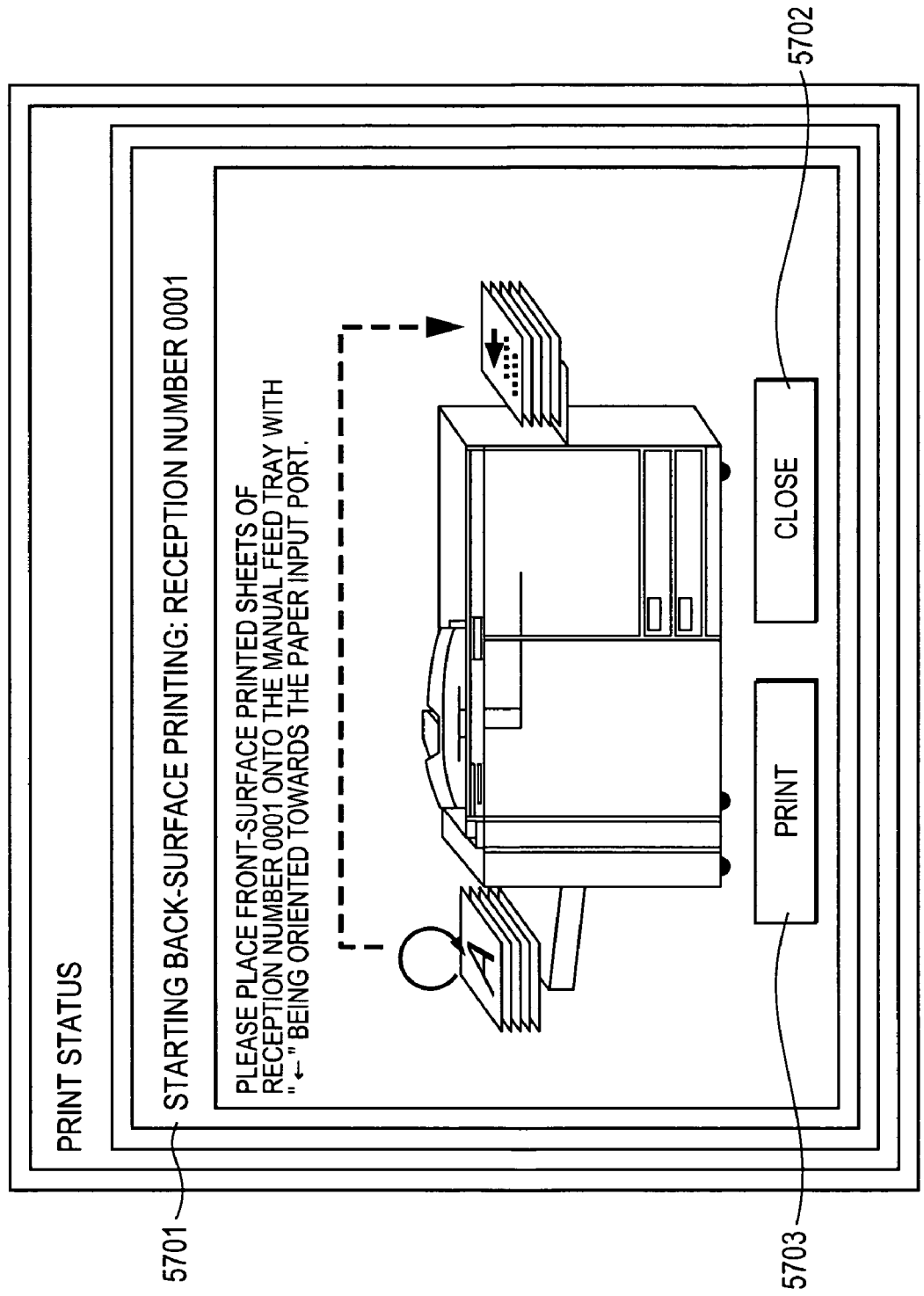
FIG. 62 illustrates an exemplary back-surface printing start screen.

FIG. 62 illustrates the back-surface printing start screen 5701 displayed on the operation unit 2203. The back-surface printing start screen 5701 indicates the orientation of the sheets when the sheets having printed front surfaces are placed on the manual feed tray 2724. When a close key 5702 in the back-surface printing start screen 5701 is pressed, the display returns to the print status screen shown in FIG. 61. If a print start key 5703 is pressed, the CPU 2301 sequentially prints even pages starting from page 2 (2n; n=1, 2, 3, . . . ) of the document image on the surfaces B in a face-up output mode (step S312). The process is then completed.

Here, if a guide print was performed, an image is not formed on the sheet on which a guide print is performed so that a page sequence after images are formed on the surfaces B is properly ordered. At that time, a message "Back-surface printing" is displayed in the status field of the print status screen 5101 to indicate that the surfaces B are being printed in a face-up output mode. FIG. 63 illustrates a print status screen in which a message "Back-surface printing" is displayed.

FIGS. 64A and 64B illustrate the consistency between guide print and a binding direction when manual duplex printing is performed, where FIG. 64A illustrates a stacking state of sheets on which a guide image is printed when the paper size is A4, the print direction is portrait, and the binding direction is "long side" and FIG. 64B illustrates a stacking state of sheets on which a guide image is printed when the paper size is A4R, the print direction is portrait, and the binding direction is "long side". It is noted that, instead of printing a guide image on a sheet, the back-surface printing start screen 5701 may display a direction to turn over the sheets when the sheets having only the printed surfaces A are placed onto the manual feed tray 2724.

FIG. 65 illustrates the back-surface printing start screen 5701 that indicates a direction to turn over the sheets. In this back-surface printing start screen, a center axis about which the sheets are rotated is displayed.

As stated above, according to an printing apparatus of the fourth embodiment, a user can perform duplex printing without determining whether the sheets used for printing are sheets that allow automatic duplex printing or not. Additionally, when performing duplex printing on sheets that do not allow automatic duplex printing, the user can easily recognize the direction of the sheets when the user places the sheets onto a feeder tray again after one side of the sheet has been printed, and therefore, the user can obtain a desired duplex printout without a print direction error. Furthermore, even when a plurality of duplex print jobs are submitted and manual duplex printing is instructed, the user can identify the print job that requires back-surface printing by using a guide print and can start the printing process of the job. Accordingly, a plurality of images of different duplex print jobs is easily prevented from being printed on a single sheet. Still furthermore, duplex printing that provides consistency between a page sequence and a binding direction can be achieved.

Fifth Exemplary Embodiment

The configurations of a printing apparatus and a printing system of a fifth embodiment are similar to those of the fourth embodiment, and therefore, the descriptions are not repeated. Only different operations from the fourth embodiment are described here.

Figure 66:
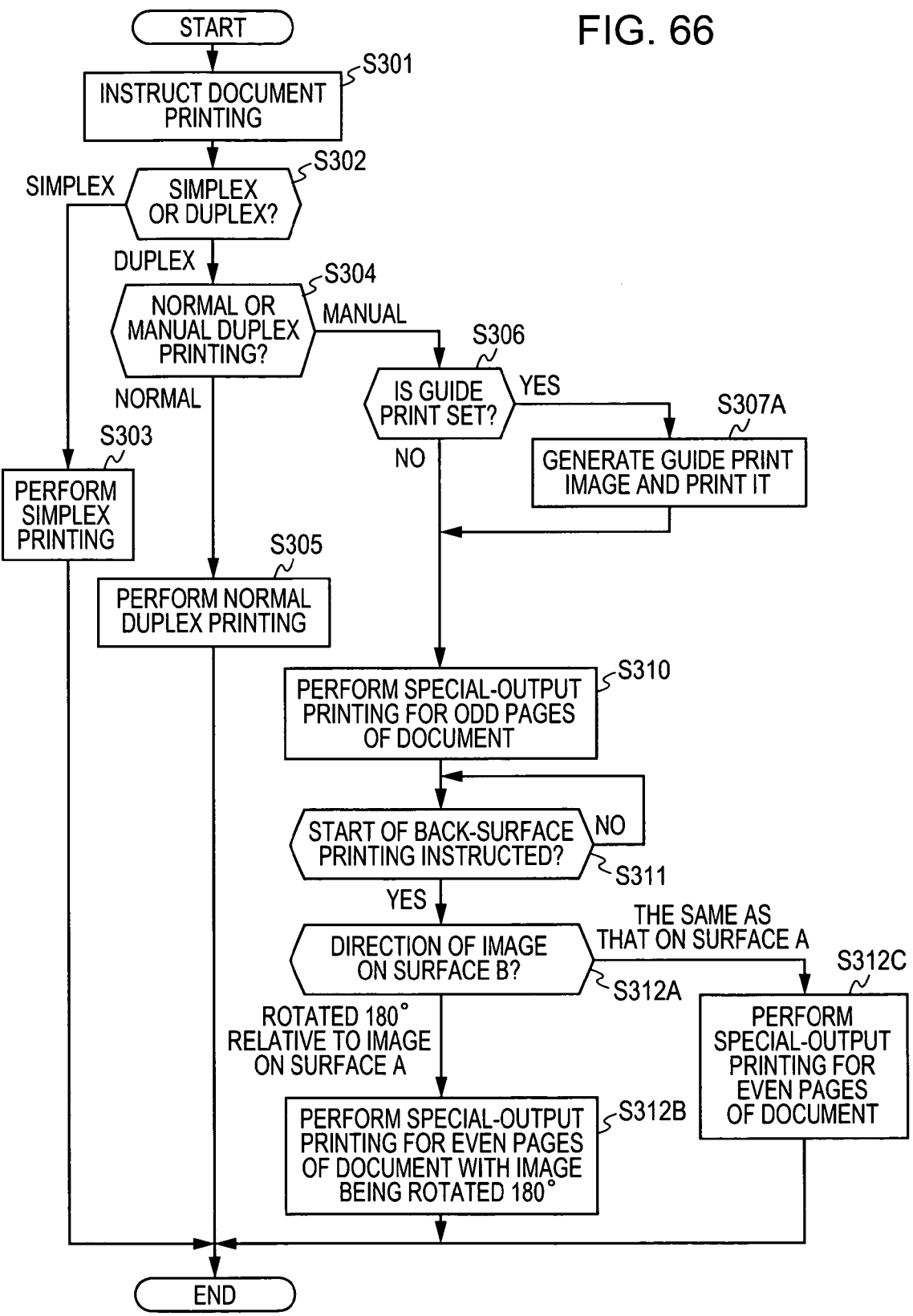
FIG. 66 illustrates a flow chart of an exemplary procedure of print operation according to a fifth embodiment of the present invention.

FIG. 66 illustrates a flow chart of an exemplary procedure of print operation according to the fifth embodiment. A program for realizing the print operation procedure is stored in the HDD 2305 of the digital multi-function printing apparatus 2101 and is executed by the CPU 2301. Similar step processes to those illustrated in FIG. 55 of the fourth embodiment are designated by the identical step number and the descriptions are not repeated here.

If, at step S306, the guide print setting field 3407 of the print detail settings screen 3401 is set, the direction of a guide image is fixed and the guide image is printed (step S307A). If, at step S311, the back-surface print key 5106 is pressed and the start of back-surface printing is instructed, the CPU 2301 determines the orientation of an image printed on the surface B (step S312A). At step S312A, the CPU 2301 determines the orientation of an image using the table shown in FIG. 67 to print even pages (2n; n=1, 2, 3, . . . ) of the document on the surfaces B in a face-up output mode.

FIG. 67 illustrates a table representing an image forming direction on the surface B. The table is used to print a document suitable for the setting in the paper size setting field 3402 of the print detail settings screen 3401. The CPU 2301 determines the image forming direction on the basis of the combination of the size and orientation of a sheet, a print direction setting, and a binding direction. Here, the image forming direction is determined to be either one of a direction that is the same as a direction of an image on the surface A and a direction rotated 180°.

The internal controller 2204 rotates the image and expands it into the image memory 2304 on the basis of the determination result at step S312A. That is, when an image is rotated 180°, an image of an even page to be printed on the surface B is rotated 180° and is expanded into the image memory 2304 (step S312B). In contrast, when an image is formed in the same direction, the image of an even page is formed without being rotated (step S312C).

As stated above, according to a printing apparatus of the fifth embodiment, by appropriately changing the direction of an image formed on the surface B, duplex printing that provides consistency between a page sequence and a binding direction can be achieved, as in the fourth embodiment.

Sixth Exemplary Embodiment

The configurations of a printing apparatus and a printing system of a sixth embodiment are similar to those of the fourth embodiment, and therefore, the descriptions are not repeated. Only different operations from the fourth embodiment are described here. In the sixth embodiment, duplex printing is performed by using a copy function.

Figure 68:
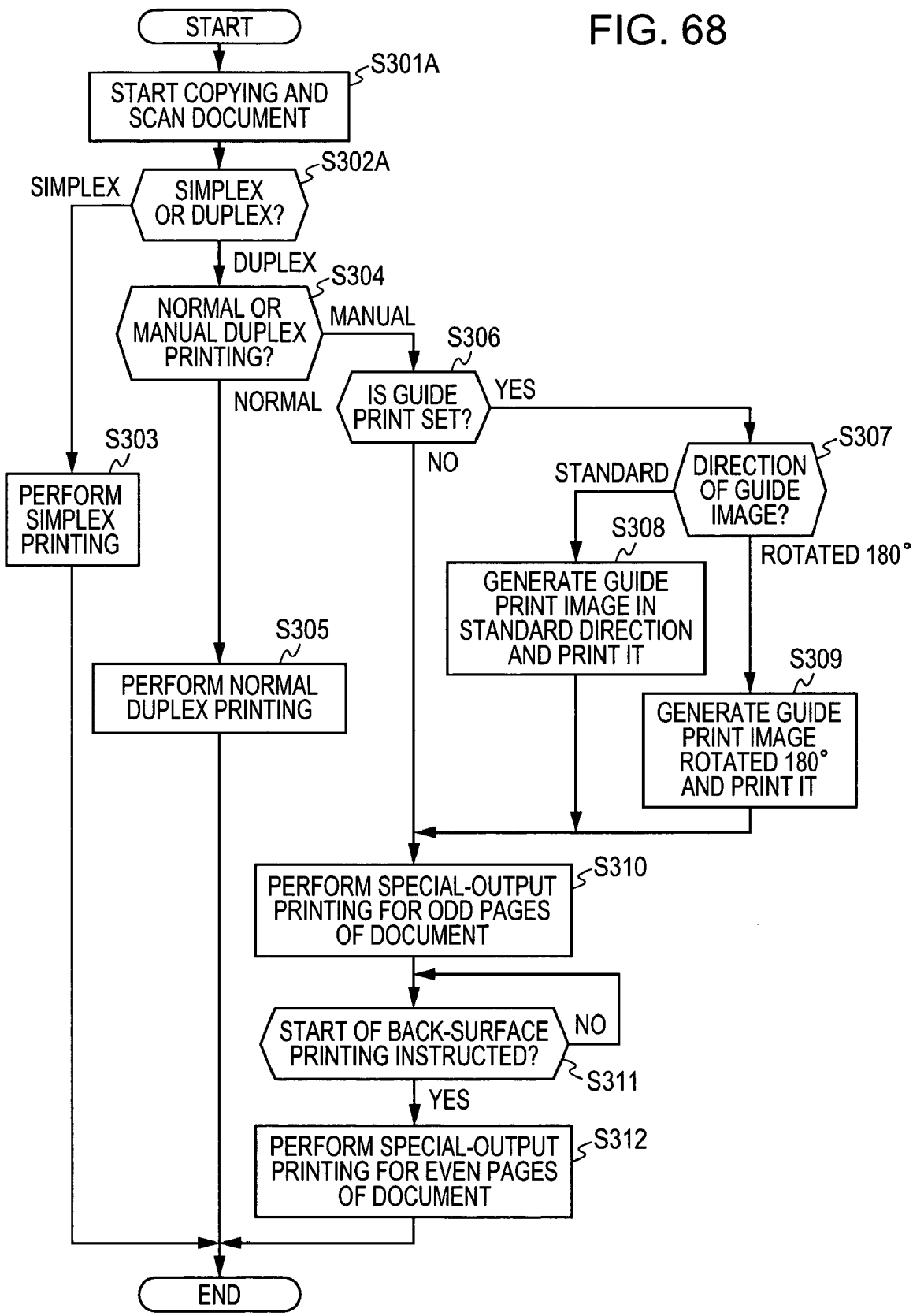
FIG. 68 illustrates a flow chart of an exemplary procedure of print operation according to a sixth embodiment of the present invention.

FIG. 68 illustrates a flow chart of an exemplary procedure of print operation according to the sixth embodiment. A program for realizing the print operation procedure is stored in the HDD 2305 of the digital multi-function printing apparatus 2101 and is executed by the CPU 2301. Similar step processes to those illustrated in FIG. 55 of the fourth embodiment are designated by the identical step number and the descriptions are not repeated here.

When a user starts copying, the digital multi-function printing apparatus 2101 scans an original document placed on the scanner unit 2201 and stores the scanned image data in the HDD 2305 of the internal controller 2204 (step S301A). The CPU 2301 determines whether the image is printed in a simplex mode or a duplex mode on the basis of the duplex setting preset by the user via the operation unit 2203 (step S302A).

Figure 69:
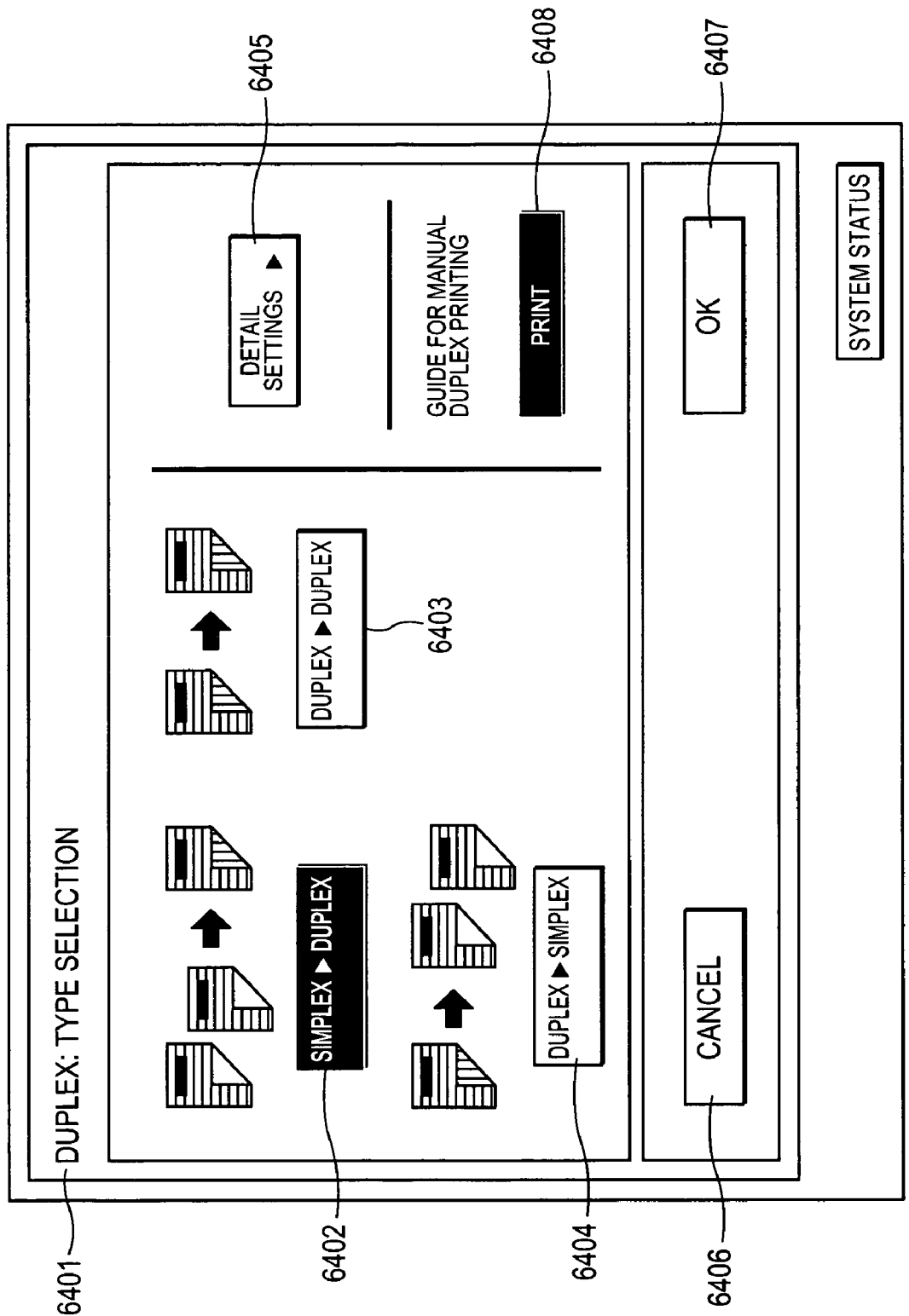
FIG. 69 illustrates an exemplary duplex setting screen.

A duplex setting screen is displayed when the duplex key 2412 of the LCD display screen 2401 is pressed. FIG. 69 illustrates an exemplary duplex setting screen. In a duplex setting screen 6401, by operating three keys, three types of duplex printing method can be set. A simplex/duplex key 6402 is used to scan only one surface of the document and prints images in a duplex mode. A duplex/duplex key 6403 is used to scan both surfaces of the document and prints images in a duplex mode. A duplex/simplex key 6404 is used to scan both surfaces of the document and prints images in a simplex mode.

The user selects one of the keys 6402 to 6404, which are the duplex setting keys, and presses an OK key 6407. The selected duplex setting is stored in the work memory 2302 of the internal controller 2204, and the display returns to the operation setting screen 2402 (the copy setting screen) (see FIG. 26).

The duplex setting screen 6401 further provides a guide print key 6408 for selecting whether a guide image for manual duplex printing is printed or not. Every time the guide print key 6408 is pressed, ON and OFF of the print are switched. A setting cancel key 6406 is a button to cancel a duplex setting when performing a copy by scanning only one surface of the document and forming an image on one surface of a sheet. The display returns to the operation setting screen 2402. A detail setting key 6405 is a button to move to a detail setting screen to set up the orientation of an image when an image is scanned and the image is formed on a sheet.

Figure 70:
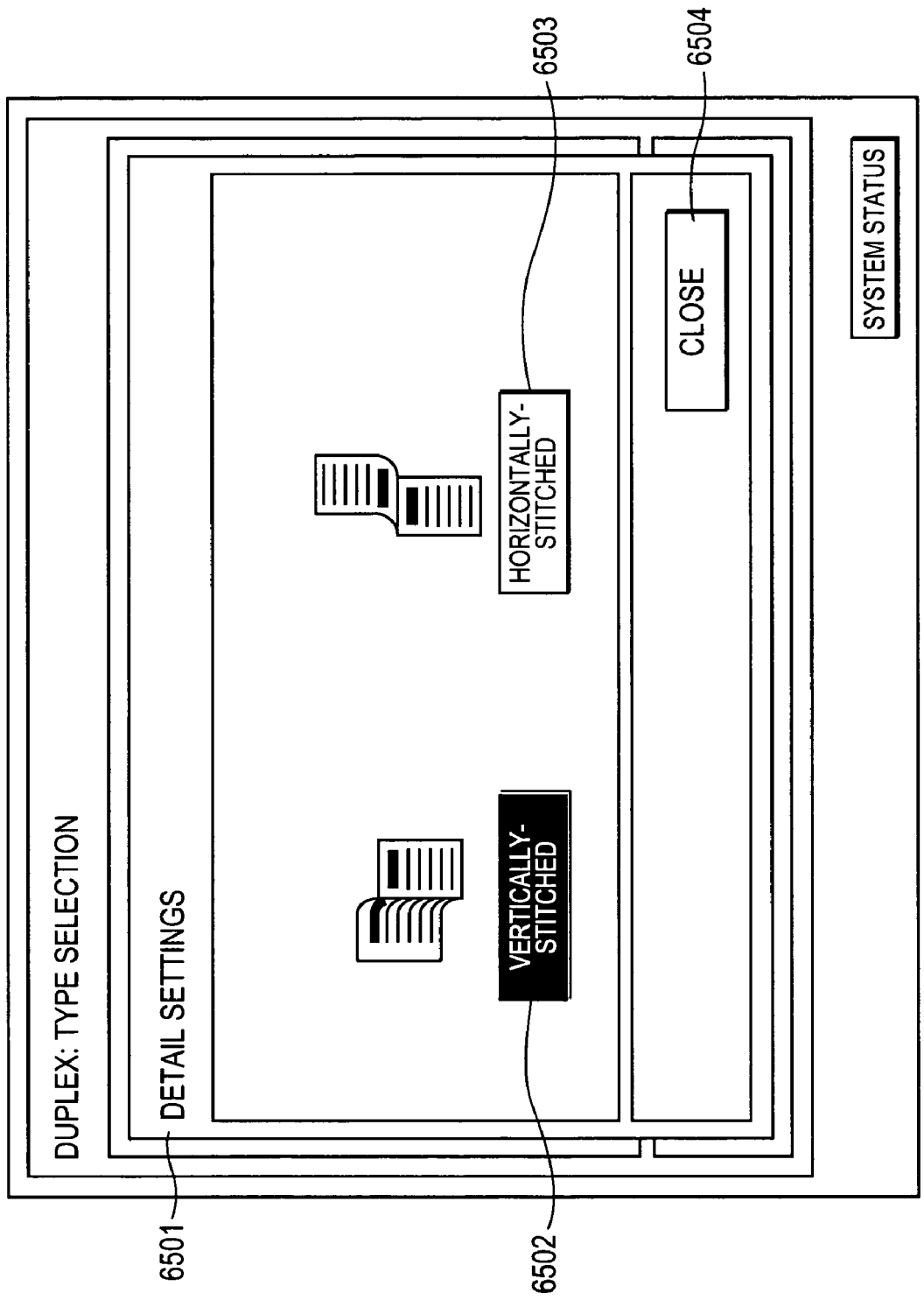
FIG. 70 illustrates an exemplary detail setting screen.

FIG. 70 illustrates an exemplary detail setting screen. In a detail setting screen 6501, a vertically-stitched key 6502 for scanning a vertically-stitched document or printing a vertically-stitched document, and a horizontally-stitched key 6503 for scanning a horizontally-stitched document or printing a horizontally-stitched document, are provided. The user selects one of the keys and depresses a close key 6504. The settings are stored in the work memory 2302 of the internal controller 2204. The display then returns to the duplex setting screen 6401.

If, at step S302A, duplex printing is not set or if the duplex/simplex key 6404 is set, simplex printing is performed (step S303). However, if, at step S302A, the simplex/duplex key 6402 or the duplex/duplex key 6403 is set, that is, if duplex printing is set, the following determination is made: the CPU 2301 determines whether the type of a sheet used for printing is the type that allows automatic duplex printing or the type that requires manual duplex printing to print images on both surfaces of the sheet (step S304). Here, the type of the sheet for copying is selected in the paper selection screen 4801 (see FIG. 53).

If it is determined at step S304 that the paper type used for printing is the type that allows automatic duplex printing, the CPU 2301 performs automatic duplex printing at step S305. However, if it is determined at step S304 that the paper type used for printing is the type that requires manual duplex printing to print images on both surfaces of a sheet, the CPU 2301 determines at step S306 whether the guide print key 6408 in the duplex setting screen 6401 is set or not.

In contrast, if, at step S306, the CPU 2301 determines that the guide print is set, the CPU 2301 then determines the orientation of a guide image on the basis of the combination of the size and orientation of a sheet used for printing, a direction of the document, and duplex settings in the duplex setting screen 6401 and the detail setting screen 6501. FIG. 71 illustrates a table representing the orientation of a guide image.

The CPU 2301 then determines whether a guide image orientation is a standard direction or a direction rotated 180° (step S307). The internal controller 2204 generates a guide image having an orientation determined at step S307 and expands it into the image memory 2304. That is, if the orientation of the guide image is a standard direction, the internal controller 2204 generates the guide image in the standard direction (step S308). In contrast, if the orientation of the guide image is a direction rotated 180°, the internal controller 2204 generates the guide image in the direction rotated 180° (step S309). At step S308 or S309, sheets of the type that allows face-down output are set. The CPU 2301 prints the generated guide image on a sheet which allows face-down output and which is fed from the sheet cassette 2722, the sheet cassette 2723, or the manual feed tray 2724, and outputs the sheet in a face-down output mode.

However, if, at step S306, it is determined that a guide print is not specified or after the sheet on which the guide image is printed at step S308 or S309 is output in a face-down mode, the following process is performed. That is, the CPU 2301 performs a print operation at steps S310 through S312 in the same manner as in the fourth embodiment so that manual duplex printing is performed.

As stated above, according to a printing apparatus of the sixth embodiment, even when a copy function is used, the same advantage as that of the fourth embodiment can be provided.

Other Exemplary Embodiments, Features and Aspects of the Present Invention

It is noted that the present invention is not limited to the structures of the above-described embodiments, but may be applicable to any structure having the functionality as defined by the appended claims or a structure having the functionality of the above-described embodiments. For example, while an exemplary embodiment of the present invention has been described with reference to a digital multi-function printing apparatus including a duplex transport mechanism (e.g., the transport paths 336, 333, 338, and 332 for duplex recording in the first embodiment), the present invention can be applied to an image forming apparatus not including such a duplex transport path.

The present invention can also be achieved by supplying a storage medium storing software program code that achieves the functions of the above-described embodiments to a system or an apparatus. That is, the present invention can be achieved by causing a computer (central processing unit (CPU) or micro-processing unit (MPU)) of the system or apparatus to read and execute the software program code.

In such a case, the program code itself read out of the storage medium realizes the functions of the above-described embodiments. Therefore, the program code itself and the storage medium storing the program code can also realize the present invention.

The storage medium may be of any type. Examples of the storage medium for supplying the program code include a flexible disk, a hard disk, a magneto optical disk, a CD-ROM (compact disk-read only memory), a CD-R (CD recordable), a CD-RW (CD-rewritable), a DVD-ROM (DVD-read only memory), a DVD-RAM (DVD-random access memory), a DVD-RW (DVD-rewritable), a DVD+RW (DVD-rewritable), a magnetic tape, a nonvolatile memory card, a ROM or the like. Alternatively, the program code can be supplied by downloading via a network.

The functions of the above-described embodiments can be realized by another method in addition to executing the program code read out by the computer. For example, the functions of the above-described embodiments can be realized by a process in which an operating system (OS) running on the computer executes some of or all of the functions in the above-described embodiments under the control of the program code.

Furthermore, the present invention can also be achieved by loading the program code read out of the storage medium to a memory of an add-on expansion board of a computer or a memory of an add-on expansion unit connected to a computer. The functions of the above-described embodiments can be realized by a process in which, after the program code is loaded, a CPU in the add-on expansion board or in the add-on expansion unit executes some of or all of the functions in the above-described embodiments under the control of the program code.

In such a case, the program can be supplied directly from a storage medium storing the program code or by downloading the program code from another computer and a database connected to the Internet, a commercial network, or a local area network (not shown).

While an exemplary embodiment of the present invention has been described with reference to a digital multi-function printing apparatus using an electrophotography printing method, the present invention is not limited to the electrophotography printing method. For example, a variety of printing methods, such as an inkjet method, a thermal transfer method, a thermal method, an electrostatic method, and a discharge breakdown method, can be applied.

It is further noted that the program code may be of any format. For example, the formats of the program code include object code, program code executed by an interpreter, and a script data supplied to an OS.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-371434 filed Dec. 22, 2004, which is hereby incorporated by reference herein in its entirety.

What is claimed is:

1. A printing apparatus configured to execute a duplex print job which includes printing on both surfaces of a sheet, comprising:
an input unit adapted to input the duplex print job;
a printing unit adapted to print on both surfaces of the sheet on the basis of the duplex print job input by the input unit;

an inversion transport unit adapted to turn over the sheet printed by the printing unit and re-transport the sheet to the printing unit;

a feeder unit adapted to feed the sheet to the printing unit;

a sheet output unit adapted to stack the sheet subjected to the print process by the printing unit; and a control unit adapted to control the printing apparatus to perform printing in either one of an automatic duplex print mode and a manual duplex print mode, the automatic duplex print mode being a mode in which printing is performed on a first surface of a sheet, the sheet is turned over by the inversion transport unit, and printing is performed on a second surface of the sheet, the manual duplex print mode being a mode in which printing is performed on a first surface of a sheet, the sheet is output to the sheet output unit, the output sheet is fed from the feeder unit, and printing is performed on a second surface of the sheet;

wherein, when all of the pages of the duplex print job are to be printed on sheets of a first attribute, the control unit executes printing in the automatic duplex print mode, and wherein, when the duplex print job contains pages to be printed on sheets of the first attribute and pages to be printed on sheets of a second attribute different from the first attribute, the control unit executes printing in the manual duplex print mode.

2. The printing apparatus according to claim 1, further comprising:

a display unit adapted to display, when the duplex print job contains pages to be printed on sheets of the first attribute and pages to be printed on sheets of the second attribute, a screen to select whether a print operation of the duplex print job is to be performed in the manual duplex print mode;

wherein, when a print operation of the duplex print job in the manual duplex print mode is selected via the display unit, the control unit controls the printing apparatus to perform printing of the duplex print job in the manual duplex print mode.

3. The printing apparatus according to claim 1, wherein the first and second attributes are attributes about the type of the sheet and the second attribute is an attribute indicating the type of sheet that does not allow the inversion transport unit to turn over the sheet.

4. The printing apparatus according to claim 1, wherein the first and second attributes are attributes about the size of the sheet and the second attribute is an attribute indicating the size of sheet that does not allow the inversion transport unit to turn over the sheet.

5. The printing apparatus according to claim 1, further comprising:

an output unit adapted to output, when a print operation of the duplex print job is performed in the manual duplex print mode and the sheet with the first surface printed is loaded on the feeder unit, information about a loading direction of the sheet prior to performing a printing operation on a second surface of the sheet.

6. The printing apparatus according to claim 1, further comprising:

an image scanning unit adapted to scan an image of a document;

wherein the input unit receives image data of a plurality of pages scanned by the image scanning unit as the duplex print job.

7. The printing apparatus according to claim 1, further comprising:

a reception unit adapted to receive image data of a plurality of pages transmitted from an external apparatus;

wherein the input unit receives the image data of a plurality of pages received by the reception unit as the duplex print job.

8. The printing apparatus according to claim 1, wherein, when all of the pages of the duplex print job are to be printed on sheets of the second attribute, the control unit executes printing in the manual duplex print mode.

9. The printing apparatus according to claim 5, wherein the output unit outputs the information about a loading direction of the sheet by displaying the information on a display unit.

10. The printing apparatus according to claim 5, wherein the output unit outputs the information about a loading direction of the sheet by printing the information on a sheet using the printing unit.

11. The printing apparatus according to claim 5, further comprising:

a setting unit adapted to set whether or not the information about a loading direction of the sheet is output by the output unit.

12. The printing apparatus according to claim 10, wherein the output unit prints information for identifying the duplex print job on a sheet together with the information about a loading direction of the sheet.

13. A printing method in a printing apparatus for executing a duplex print job for printing on both surfaces of a sheet, the method comprising:

an inputting step of inputting the duplex print job;

a first printing step of printing on both surfaces of the sheet on the basis of the duplex print job input in the inputting step in an automatic duplex print mode in which a first surface of a sheet is printed, the sheet is turned over by a duplex transport mechanism of the printing apparatus, and a second surface of the sheet is printed;

a second printing step of printing on both surfaces of the sheet on the basis of the duplex print job input in the inputting step in a manual duplex print mode in which a first surface of the sheet is printed, the sheet is output to a sheet output unit of the printing apparatus, the output sheet is fed from a feed unit of the printing apparatus, and a second surface of the sheet is printed; and a controlling step of controlling the printing apparatus to print the duplex print job in the first printing step when all of the pages of the duplex print job are to be printed on sheets of a first attribute and controlling the printing apparatus to print the duplex print job in the second printing step when the duplex print job contains pages to be printed on sheets of the first attribute and pages to be printed on sheets of a second attribute different from the first attribute.

* * * * *